(12) United States Patent
Lee et al.

(10) Patent No.: US 11,197,013 B2
(45) Date of Patent: Dec. 7, 2021

(54) METHOD AND DEVICE FOR ENCODING OR DECODING IMAGE

(71) Applicant: SAMSUNG ELECTRONICS CO., LTD., Suwon-si (KR)

(72) Inventors: Jong-seok Lee, Suwon-si (KR); Jae-hwan Kim, Yongin-si (KR); Young-o Park, Seoul (KR); Jeong-hoon Park, Seoul (KR); Sun-young Jeon, Anyang-si (KR); Kwang-pyo Choi, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/625,461

(22) PCT Filed: Feb. 6, 2018

(86) PCT No.: PCT/KR2018/001552
§ 371 (c)(1),
(2) Date: Dec. 20, 2019

(87) PCT Pub. No.: WO2019/009491
PCT Pub. Date: Jan. 10, 2019

(65) Prior Publication Data
US 2021/0160522 A1  May 27, 2021

(30) Foreign Application Priority Data

Jul. 6, 2017 (KR) .................. 10-2017-0086136

(51) Int. Cl.
*H04N 19/50* (2014.01)
*H04N 19/105* (2014.01)
(Continued)

(52) U.S. Cl.
CPC ........... *H04N 19/50* (2014.11); *G06N 3/0454* (2013.01); *G06N 3/08* (2013.01); *H04N 19/105* (2014.11);
(Continued)

(58) Field of Classification Search
CPC .... H04N 19/50; H04N 19/119; H04N 19/105; H04N 19/117; H04N 19/184; H04N 19/176; G06N 3/0454; G06N 3/08
See application file for complete search history.

(56) References Cited

U.S. PATENT DOCUMENTS 9,319,715 B2   4/2016  Oh et al.
9,516,349 B2  12/2016  Gao et al.
(Continued)

FOREIGN PATENT DOCUMENTS

KR   10-2015-0093633 A   8/2015
KR   10-2017-0059040 A   5/2017
WO      2017036370 A1    3/2017

OTHER PUBLICATIONS

Woon-Sung Park et al. "CNN-Based In-Loop Filtering for Coding Efficiency Improvement" IEEE, 2016, (5 pages total).
(Continued)

*Primary Examiner* — Nam D Pham
(74) *Attorney, Agent, or Firm* — Sughrue Mion, PLLC

(57) ABSTRACT

Provided is a prediction image generating technology using a deep neural network (DNN). Provided is an image decoding method including: receiving a bitstream of an encoded image; determining at least one block split from the encoded image; determining neighboring blocks for predicting a current block among the at least one block; generating prediction data of the current block by applying the neighboring blocks to a DNN learning model configured to predict a block of an image by using at least one computer;
(Continued)

extracting residual data of the current block from the bitstream; and reconstructing the current block by using the prediction data and the residual data.

15 Claims, 40 Drawing Sheets

(51) Int. Cl.
  *H04N 19/117*  (2014.01)
  *H04N 19/119*  (2014.01)
  *H04N 19/176*  (2014.01)
  *H04N 19/184*  (2014.01)
  *G06N 3/04*  (2006.01)
  *G06N 3/08*  (2006.01)

(52) U.S. Cl.
  CPC ......... *H04N 19/117* (2014.11); *H04N 19/119* (2014.11); *H04N 19/176* (2014.11); *H04N 19/184* (2014.11)

(56) References Cited

U.S. PATENT DOCUMENTS

| | | |
|---|---|---|
| 9,578,345 B2 | 2/2017 | DeForest et al. |
| 9,615,104 B2 | 4/2017 | Wu et al. |
| 2009/0110070 A1 | 4/2009 | Takahashi et al. |
| 2016/0360202 A1 | 12/2016 | Xu et al. |
| 2019/0273948 A1* | 9/2019 | Yin .................... H04N 19/172 |
| 2020/0186796 A1* | 6/2020 | Mukherjee ........... H04N 19/107 |

OTHER PUBLICATIONS

Yuanying Dai et al. "A Convolutional Neural Network Approach for Post-Processing in HEVC Intra Coding" retrieved from [arXiv:1608.06690v2 [cs.MM]] Oct. 29, 2016 (12 pages total).

International Search Report and Written Opinion (PCT/ISA/210 and PCT/ISA/237), dated Apr. 6, 2018 by International Searching Authority in International Application No. PCT/KR2017/007270.

George Toderici et al. "Full Resolution Image Compression with Recurrent Neural Networks" Google Inc, Aug. 18, 2016, (61 pages total).

International Search Report and Written Opinion (PCT/ISA/210 and PCT/ISA/237), dated Jun. 5, 2018 by International Searching Authority in International Application No. PCT/KR2018/001552.

Jiang Wang et al. "CNN-RNN: A Unified Framework for Multi-label Image Classification" IEEE, Jun. 27-30, 2016, pp. 2285-2294 (13 pages total).

* cited by examiner

FIG. 20
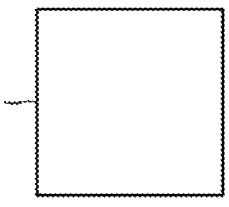
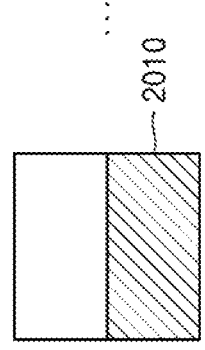
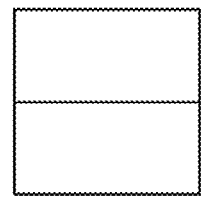
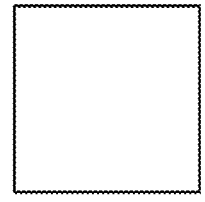
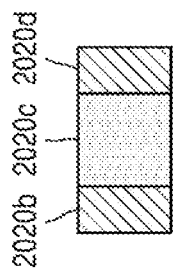
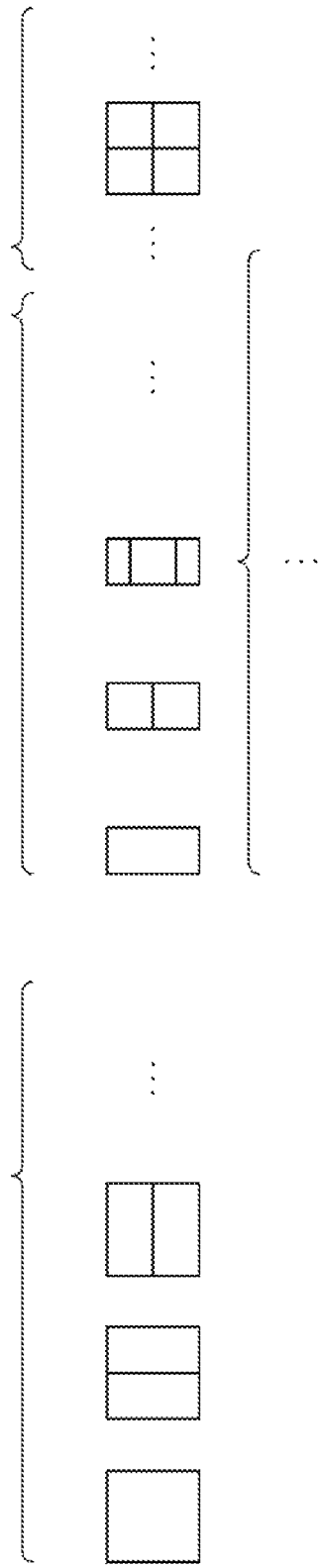

FIG. 28

| BLOCK SHAPE<br>DEPTH | 0: SQUARE | 1: NS_VER | 2: NS_HOR |
|---|---|---|---|
| DEPTH D | 2800 | 2810 | 2820 |
| DEPTH D+1 | 2802 | 2812 | 2822 |
| DEPTH D+2 | 2804 | 2814 | 2824 |
| ... | ... | ... | ... |

METHOD AND DEVICE FOR ENCODING OR DECODING IMAGE

TECHNICAL FIELD

The present disclosure relates to a method of processing an image by using artificial intelligence (AI) using a machine learning algorithm. More particularly, the present disclosure relates to a technique for generating a prediction image by using a deep neural network (DNN) in image encoding and decoding processes.

BACKGROUND ART

An artificial intelligence (AI) system is a computer system that may exhibit human-level intelligence, and is a system in which a machine trains and makes decisions by itself and has a determination rate improving as the system is being used.

An AI technology includes a machine learning (deep learning) technology using an algorithm of self-classifying and learning features of input data and element technologies that simulate functions of a human brain, such as recognition and decision making, by using the machine learning algorithm.

The element technologies may include, for example, at least one of linguistic understanding technology for recognizing human language/characters, visual understanding technology for recognizing an object as human vision, inference/prediction technology for logically inferring and predicting information by determining the information, knowledge expression technology for processing human experience information as knowledge data, or operation control technology for controlling autonomous driving of a vehicle or a movement of a robot.

In particular, visual understanding is a technology for recognizing and processing an object as in the manner of human vision, and includes object recognition, object tracking, image searching, person recognition, scene understanding, spatial understanding, and image enhancement.

DESCRIPTION OF EMBODIMENTS

Technical Problem

Provided are image encoding/decoding methods and apparatuses according to various embodiments. The technical problems to be achieved by the disclosure are not limited to the technical features described above, and other technical problems may be inferred from embodiments below.

Solution to Problem

An image decoding method according to an embodiment includes: receiving a bitstream of an encoded image; determining at least one block split from the encoded image; determining neighboring blocks for predicting a current block among the at least one block; generating prediction data of the current block by applying the neighboring blocks to a deep neural network (DNN) learning model configured to predict a block of an image by using at least one computer; extracting residual data of the current block from the bitstream, and reconstructing the current block by using the prediction data and the residual data.

The DNN learning model may be a network model trained to predict original data of the current block according to a connection relationship between a plurality of network nodes included in the DNN learning model and an operation based on weight of each of the plurality of network nodes.

The generating of the prediction data may include: generating first prediction data of the current block by applying the neighboring blocks to a first DNN learning model to perform first prediction; generating second prediction data of the current block by applying the neighboring blocks and the first prediction data to a second DNN learning model to perform second prediction; and generating the prediction data by using the first prediction data and the second prediction data.

The first prediction data may be for predicting original data of the current block, and the second prediction data may be for predicting a value obtained by subtracting the first prediction data from the original data of the current block.

The first DNN learning model may be a recurrent neural network (RNN) learning model and the second DNN learning model may be a convolutional neural network (CNN) learning model.

The generating of the first prediction data may include inputting a sequence of the neighboring blocks to the RNN learning model according to a predetermined direction per time step.

The determining of the neighboring blocks may include: determining adjacent blocks adjacent to the current block from among blocks reconstructed before the current block; and determining blocks located in each direction facing the adjacent blocks from the current block as the neighboring blocks.

The inputting may include inputting the block located in each direction to the RNN learning model in a clockwise direction based on a block located in a left direction of the current block.

When there are a plurality of blocks located in each direction, an input order of blocks located in a same direction may be an order from a block farthest from the current block to a block closest to the current block.

The inputting may include inputting the neighboring blocks to the RNN learning model in a Z-scan order.

The generating of the second prediction data may include performing a convolution operation using a plurality of filters by inputting the first prediction data and neighboring reconstruction data adjacent to the current block to a convolution layer of the CNN learning model.

The generating of the prediction data may include: determining at least one reference picture to which the current block refers and at least one reference block location; and generating the prediction data by inputting the at least one reference picture and the at least one reference block location to the DNN learning model.

Information about a structure of the DNN learning model may be obtained from at least one of a video parameter set, a sequence parameter set, and a picture parameter set of the bitstream.

An image decoding apparatus according to an embodiment includes: a receiver configured to receive a bitstream of an encoded image; a block determiner configured to determine at least one block split from the encoded image; a predictor configured to determine neighboring blocks for predicting a current block among the at least one block and generate prediction data of the current block by applying the neighboring blocks to a deep neural network (DNN) learning model configured to predict a block of an image by using at least one computer; and a reconstructor configured to extract residual data of the current block from the bitstream and reconstruct the current block by using the prediction data and the residual data.

An image encoding method according to an embodiment includes: determining at least one block for splitting an image; determining neighboring blocks for predicting a current block among the at least one block; generating prediction data of the current block by applying the neighboring blocks to a deep neural network (DNN) learning model configured to predict a block of an image by using at least one computer; generating residual data of the current block by using original data corresponding to the current block and the prediction data; and generating a bitstream in which the residual data is encoded.

Advantageous Effects of Disclosure

By performing prediction based on a trained deep neural network (DNN), signaling of prediction information may be omitted and encoding and decoding efficiencies may be increased.

BRIEF DESCRIPTION OF DRAWINGS

FIG. 20 illustrates a process of splitting a coding unit based on at least one of block shape information and split shape information, according to an embodiment.

FIG. 28 illustrates a process of determining a depth of a coding unit as a shape and size of the coding unit change, when the coding unit is recursively split such that a plurality of coding units are determined, according to an embodiment.

MODE OF DISCLOSURE

Figure 1:
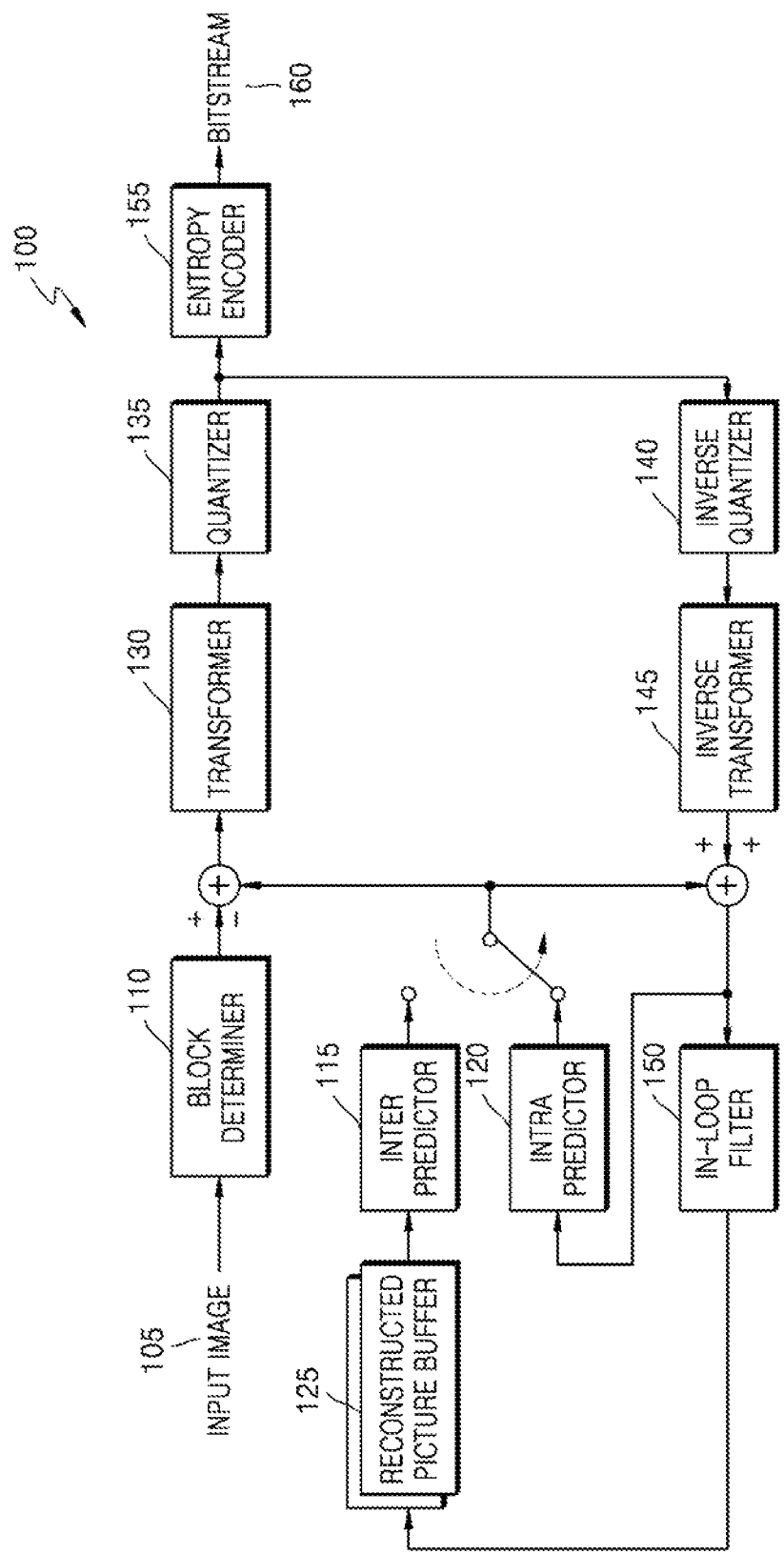
FIG. 1 is a detailed block diagram of an image encoding apparatus according to an embodiment.

Terms such as "unit" used in the specification indicate software or a hardware component such as a field-programmable gate array (FPGA) or an application-specific integrated circuit (ASIC), and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, embodiments will be described in detail with reference to the accompanying drawings such that one of ordinary skill in the art may easily implement the embodiments. However, the embodiments may be implemented in many different forms and are not limited to those described herein. In the drawings, parts irrelevant to the description are omitted to clearly describe the embodiments.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

The present disclosure relates to a method of processing an image by using artificial intelligence (AI) using a machine learning algorithm. In particular, the present disclosure relates to performing of intra prediction or inter prediction by using a deep neural network (DNN) during image encoding and decoding processes.

Hereinafter, overall operations related to encoding and decoding of an image are described with reference to FIGS. 1 and 2. Intra prediction and inter prediction are described with reference to FIGS. 3 and 4. A method of generating a prediction image to which AI is applied is described with reference to FIGS. 5 through 17. A method of determining a data unit of an image, according to an embodiment, is described with reference to FIGS. 18 through 31.

FIG. 1 is a detailed block diagram of an image encoding apparatus 100 according to an embodiment.

The image encoding apparatus 100 according to an embodiment includes a block determiner 110, an inter predictor 115, an intra predictor 120, a reconstructed picture buffer 125, a transformer 130, a quantizer 135, an inverse quantizer 140, an inverse transformer 145, an in-loop filter 150, and an entropy encoder 155.

The block determiner 110 according to an embodiment may split data of a current image into largest coding units, according to a largest size of a block for encoding an image. Each largest coding unit may include a block (i.e., a coding unit) split according to a block shape and a split shape. In the largest coding unit according to an embodiment, image data in a spatial domain included in the largest coding unit may be classified hierarchically according to the block shape and the split shape. The block shape of the coding unit may be a square or a rectangle or may be an arbitrary geometric shape, and thus is not limited to a data unit of a uniform size.

When the size of an encoded picture increases, an image may be encoded at a higher image compression rate when the image is encoded in a larger unit. However, when the coding unit is enlarged and the size is fixed, the image is unable to be efficiently encoded by reflecting continuously changing features of the image.

For example, when a flat area regarding the sea or sky is encoded, a compression rate may be improved when the coding unit is enlarged, but when a complex area regarding people or a building is encoded, the compression rate is improved when the coding unit is reduced.

In this regard, the block determiner 110 according to an embodiment may set the largest coding units of different sizes for each picture or slice, and set the block shape and the split shape of at least one coding unit split from the largest coding unit. The sizes of coding units included in the largest coding unit may be variably set according to the block shape and the split shape.

The block shape and the split shape of at least one coding unit may be determined based on rate-distortion (R-D) cost calculation. The block shape and the split shape may be determined differently for each picture or slice or for each largest coding unit. The determined block shape and split shape are output from the block determiner 110 together with image data for each coding unit.

According to an embodiment, the coding unit split from the largest coding unit may be characterized in the block shape and the split shape. A specific method of determining the coding unit in the block shape and the split shape will be described in more detail below with reference to FIGS. 18 through 31.

According to an embodiment, the coding units included in the largest coding unit may be predicted or transformed based on processing units of different sizes (for example, values of a pixel domain may be transformed to values of a frequency domain). In other words, the image encoding apparatus 100 may perform a plurality of processes for image encoding, based on processing units of various sizes and various shapes. To encode image data, processes such as prediction, transformation, and entropy encoding are performed, and processing units of the same size may be used throughout the processes or processing units of different sizes may be used for each process.

According to an embodiment, a prediction mode of the coding unit may be at least one of an intra mode, an inter mode, and a skip mode, and a particular prediction mode may be used only for a coding unit of a particular size or shape. According to an embodiment, prediction may be performed on each coding unit and a prediction mode with a smallest encoding error may be selected.

Also, the image encoding apparatus 100 may transform the image data based on a processing unit of a different size from the coding unit. To transform the coding unit, transformation may be performed based on a data unit of a smaller or same size as the coding unit.

According to an embodiment, the image encoding apparatus 100 may measure an encoding error of the coding unit by using Lagrangian multiplier-based R-D optimization.

The intra predictor 120 performs intra prediction on a block of an intra mode among an input image 105, and the inter predictor 115 performs inter prediction on a block of an inter mode by using the input image 105 and a reference picture obtained by the reconstructed picture buffer 125. Whether to perform the intra prediction or the inter prediction may be determined for each block unit. The image encoding apparatus 100 may encode information about whether to perform the intra prediction or the inter prediction.

As will be described below, the intra predictor 120 according to an embodiment may perform the intra prediction based on a DNN learning model and the inter predictor 115 may perform the inter prediction based on the DNN learning model.

Residual data is generated by calculating a difference between data regarding a block of the input image 105 and prediction data regarding each block output from the intra predictor 120 or the inter predictor 115. The residual data is output as a quantized transform coefficient for each block through the transformer 130 and the quantizer 135. The quantized transform coefficient is reconstructed to residual data of a spatial domain through the inverse quantizer 140 and the inverse transformer 145. The reconstructed residual data of the spatial domain is reconstructed to data of the spatial domain regarding the block of the input image 105 by being added to the prediction data regarding each block output from the intra predictor 120 or the inter predictor 115. The reconstructed data of the spatial domain is generated as a reconstructed image through the in-loop filter 150. The in-loop filter 150 may perform only deblocking and may perform sample adaptive offset (SAO) filtering after the deblocking. The generated reconstructed image is stored in the reconstructed picture buffer 125. Reconstructed pictures stored in the reconstructed picture buffer 125 may be used as a reference picture for inter prediction of another image. The transform coefficient quantized by the transformer 130 and the quantizer 135 may be output as a bitstream 160 through the entropy encoder 155.

The bitstream 160 output from the image encoding apparatus 100 may include an encoding result of the residual data. Also, the bitstream 160 may include an encoding result of information indicating the block shape, the split shape, and the size of a transform unit.

FIG. 1 is a detailed block diagram of an image decoding apparatus 200 according to an embodiment.

The image decoding apparatus 200 according to an embodiment performs operations for decoding an image. The image decoding apparatus 200 according to an embodiment includes a receiver 210, a block determiner 215, an entropy decoder 220, an inverse quantizer 225, an inverse transformer 230, an inter predictor 235, an intra predictor 240, a reconstructed picture buffer 245, and an in-loop filter 250.

Figure 2:
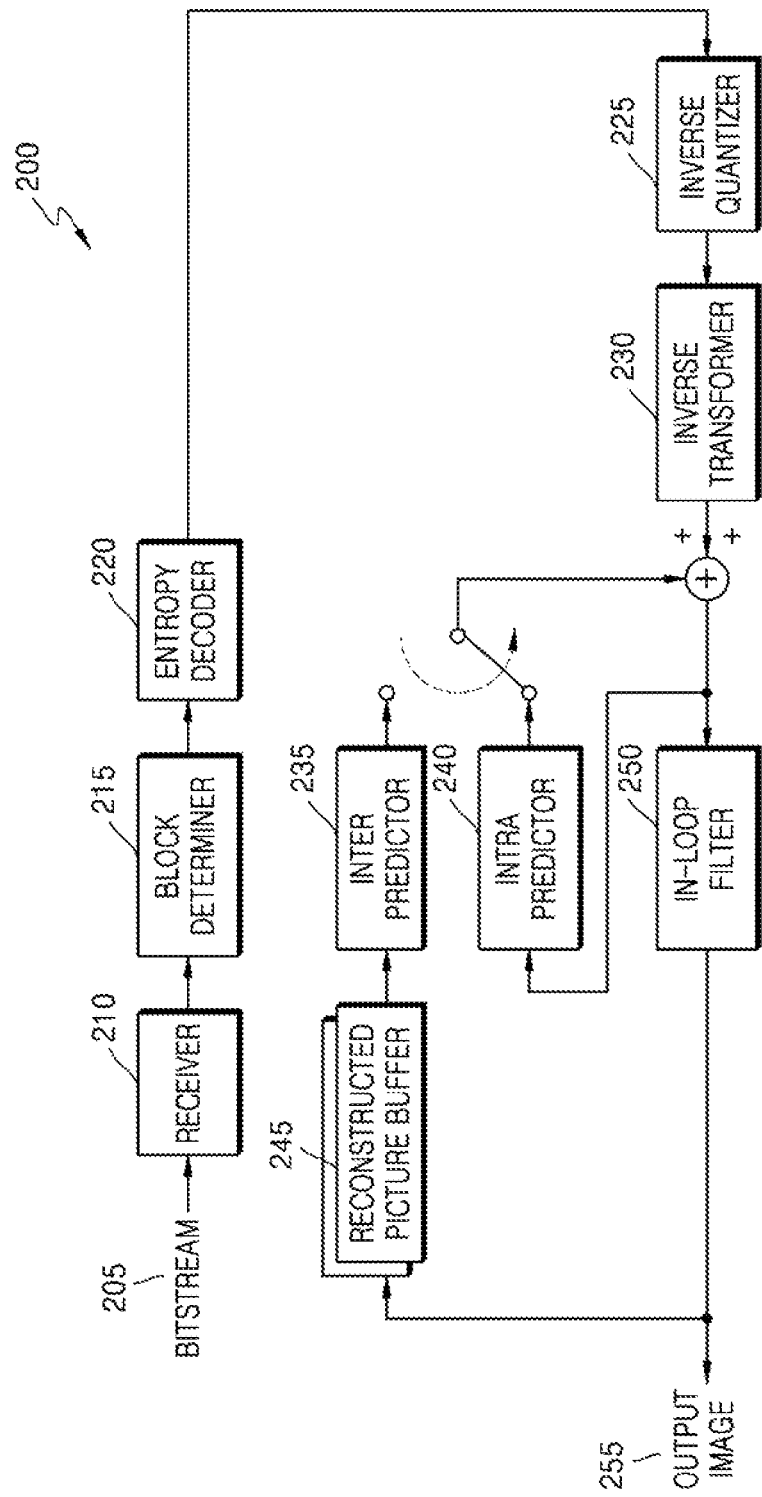
FIG. 2 is a detailed block diagram of an image decoding apparatus according to an embodiment.

The receiver 210 of FIG. 2 receives a bitstream 205 of an encoded image.

The block determiner 215 according to an embodiment may split image data of a current picture into largest coding units, according to a largest size of a block for decoding an image. Each largest coding unit may include a block (i.e., a coding unit) split according to a block shape and a split shape. The block determiner 215 according to an embodiment may hierarchically split image data of a spatial domain according to the block shape and the split shape by obtaining split information from the bitstream 205. Meanwhile, when blocks used for decoding have uniform shapes and sizes, the block determiner 215 may split the image data without using the split information. The block determiner 215 according to an embodiment may correspond to the block determiner 110 of FIG. 1.

The entropy decoder 220 obtains, from the bitstream 205, encoded image data that is to be decoded and encoding information required for decoding. The encoded image data is a quantized transform coefficient, and the inverse quantizer 225 and the inverse transformer 230 reconstructs residual data from the quantized transform coefficient.

The intra predictor 240 performs intra prediction on a block of an intra mode. The inter predictor 235 performs inter prediction on a block of an inter mode by using a reference picture obtained by the reconstructed picture buffer 245. Whether to perform the intra prediction or the inter prediction may be determined for each block unit. The image decoding apparatus 200 may obtain, from the bitstream 205, information about whether to perform the intra prediction or the inter prediction.

As will be described below, the intra predictor 240 according to an embodiment may perform the intra prediction based on a DNN learning model and the inter predictor 235 may perform the inter prediction based on the DNN learning model.

Data of the spatial domain regarding a block is reconstructed when residual data and prediction data regarding each block through the intra predictor 240 and the inter predictor 235 are added, and the reconstructed data of the spatial domain may be output as a reconstructed image through the intra predictor 240. The in-loop filter 250 may perform only deblocking or may perform SAO filtering after the deblocking.

As described above, the present disclosure includes a technology of applying a DNN learning model while performing intra prediction or inter prediction. A DNN will be briefly described before describing a prediction operation.

A neural network refers to a computational architecture that models a biological brain. The neural network is a recognition model implemented in software or hardware that emulates computing power of a biological system by using a large number of artificial neurons connected via connection lines. The artificial neurons referred to as nodes are connected to each other and operate collectively to process input data.

The neural network may include an input layer, a hidden layer, and an output layer. The input layer may receive and transmit an input for performing learning to the hidden layer and the output layer may generate an output of the neural network based on a signal received from nodes of the hidden layer. The hidden layer is located between the input layer and the output layer and may change training data received through the input layer to a value that is easily predictable. Nodes included in the input layer and the hidden layer may be connected to each other through connection lines having connection weights. Also, nodes included in the hidden layer and the output layer may be connected to each other through connection lines having connection weights. The input layer, the hidden layer, and the output layer may include a plurality of nodes.

The neural network may include a plurality of hidden layers. The neural network including the plurality of hidden layers is referred to as a DNN and training of the DNN is referred to as deep learning. The node included in the hidden layer is referred to as a hidden node.

The DNN has a multilayer perceptron structure including the plurality of hidden layers. A perceptron is a term that refers to a mathematical model y=Wx+b of each neuron, and multilayer perceptron may include the accuracy of prediction via learning through a back-propagation algorithm. A method by which the DNN learns through the back-propagation algorithm is a method of updating each W and b value according to a cost calculated by comparing a y value obtained through the output layer from the input layer with a reference label value (for example, data with the smallest error with original data or data indicating a correct answer) and when the y value is a wrong answer, transmitting the y value again from the output layer to the input layer.

When such a DNN is trained by providing particular input/output data sets, the DNN learns a data pattern of the provided input/output data sets in a high dimension thereby generating a model that infers a prediction image most similar to the original data. In case of the intra predictor 120 and 240 according to an embodiment, the input data set may be neighboring reconstruction data of the current block used for intra prediction and the output data set may be prediction data of the current block with the smallest error with the original data. In case of the inter predictor 115 and 235 according to an embodiment, the input data set may be data of a past and/or future reconstructed image to which the current block refers, and the output data set may be the prediction data of the current block with the smallest error with the original data. Meanwhile, an error between the original data and the prediction data may be measured based on an R-D cost.

As such, when prediction is performed by using the DNN trained to generate a prediction block with the smallest error with the original data, separate prediction information (for example, a prediction mode, a reference picture index, and the like) is not required to be transmitted from the image encoding apparatus 100 to the image decoding apparatus 200. Also, the image decoding apparatus 200 may generate the prediction block without using prediction information, by using a DNN having the same structure as that of the image encoding apparatus 100. According to an embodiment, information about a network structure of the DNN may be transmitted from the image encoding apparatus 100 to the image decoding apparatus 200.

However, the DNN according to an embodiment is not limited thereto and may be formed as a network of various structures.

Examples of various types of DNN include a convolutional neural network (CNN), a recurrent neural network (RNN), a deep belief network (DBN), and a restricted Boltzman machine (RBM), but are not limited thereto and may include a combination of at least one network.

As described above, the prediction based on the DNN learning model does not require signaling of the prediction information. Hereinafter, the prediction information will be described with reference to FIGS. 3 and 4.

Figure 3:
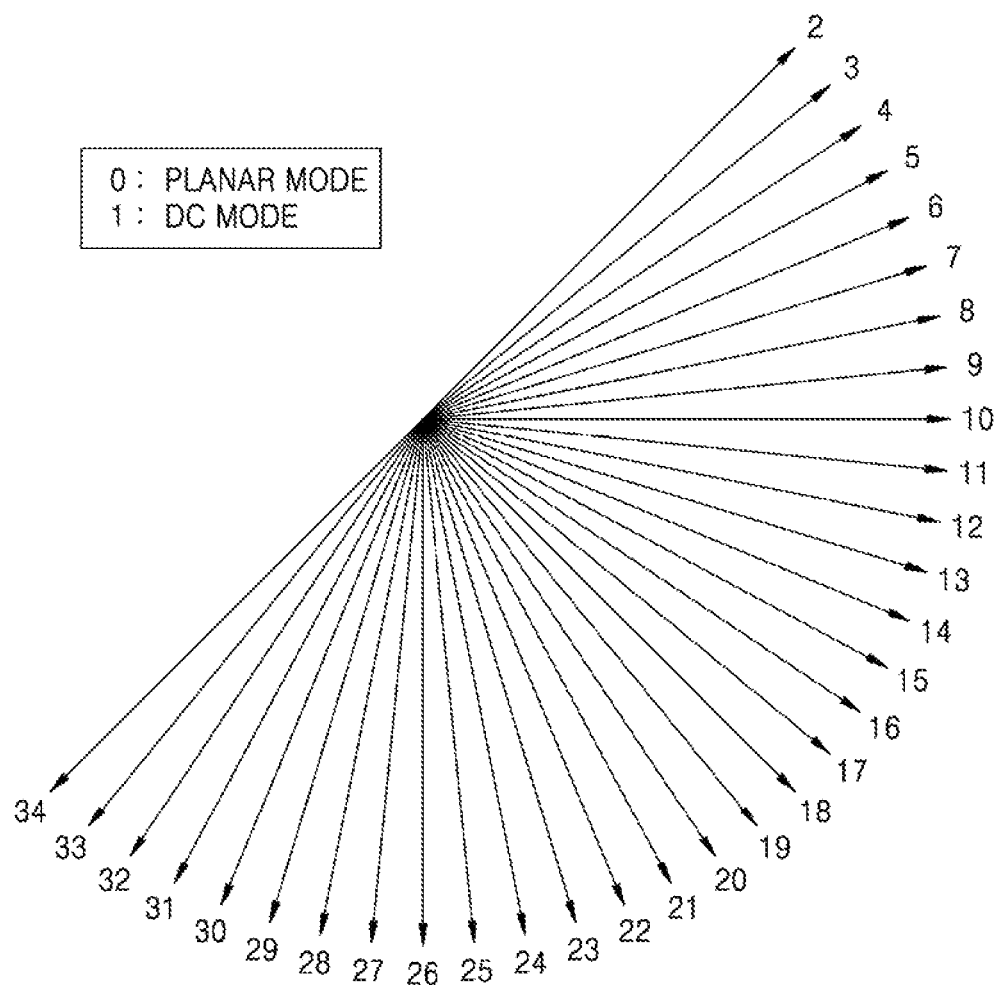
FIG. 3 illustrates an example of intra prediction information.

FIG. 3 illustrates an example of intra prediction information.

Intra prediction is a prediction technique that allows only spatial reference, and predicts a current block by using a pixel of a block adjacent to a block to be predicted. Information used during the intra prediction may include various prediction modes as shown in FIG. 3.

Intra prediction modes may be largely classified into non-directional modes (a planar mode and a direct current (DC) mode) and directional modes (an angular mode), and the directional modes have different directivities for each mode. Among the non-directional modes, the DC mode may indicate a method of filling prediction samples with an average value of neighboring reference samples of the current block. The directional mode may indicate a method of obtaining a prediction sample considering directivity while calculating the prediction sample from the reference samples.

With an example of FIG. 3, the intra prediction modes may include a vertical mode, a horizontal mode, a DC mode, a diagonal down-left mode, a diagonal down-right mode, a vertical right mode, a vertical left mode, a horizontal-up mode, and a horizontal-down mode. A prediction block generated through intra prediction of expanding a value of a neighboring pixel in a certain direction as such may have a uniform directivity along a prediction mode.

As described above, prediction information such as a prediction mode is signaled during a general intra prediction operation and the signaled prediction information is used to generate a prediction block.

However, the intra prediction based on the DNN learning model according to an embodiment does not require signaling of prediction information. This is because the trained DNN learning model has a generalization ability to generate a correct prediction image by analyzing an input pattern and finding features of the input pattern. The intra prediction based on the DNN learning model according to an embodiment uses a DNN model trained such that an error between data of the prediction block and data of an original image is the smallest.

A detailed description about an intra prediction method based on a DNN learning model will be described below with reference to FIGS. 6 through 11.

Figure 4:
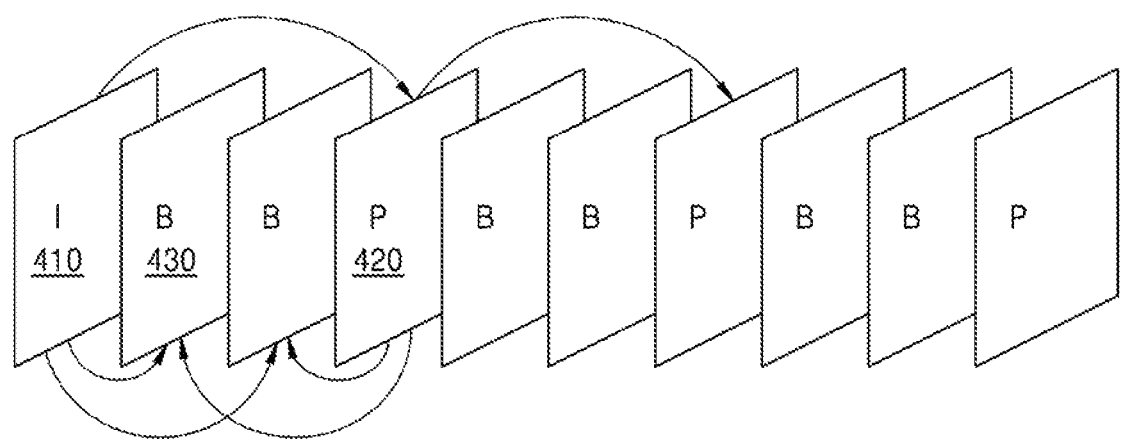
FIG. 4 illustrates an example of inter prediction information.

FIG. 4 illustrates an example of inter prediction information.

Inter prediction is based on a fact that a high correlation is present between adjacent pixels in one picture. Similarly, pictures forming a video have a high temporal correlation. Accordingly, a prediction value regarding a block in a current picture may be generated from a pre-reconstructed picture at a previous time. A technique for generating the prediction block from the reconstructed picture at the previous time as such is referred to as inter prediction.

For example, in case of an image including 30 pictures per second, it is difficult to distinguish a difference of the image between one picture and a neighboring picture with human eyes because the difference between the pictures is very small. Accordingly, when the image is output as 30 pictures per second, a person recognizes that each picture is continuous. The inter prediction focuses on a fact that, when images of a previous picture and a current picture are the same, an unknown pixel value of the current picture may be predicted from a known pixel value of the image forming the previous picture. Such inter prediction is performed based on a motion prediction technique. Motion prediction is performed by referring to a previous picture or both the previous picture and a future picture based on a time axis. A picture referred to encode or decode the current picture is referred to as a reference picture.

Referring to FIG. 4, the image includes a series of still images. The still images are classified in units of group of pictures (GOP). Each still image is referred to as a picture or a frame. One picture group includes an I picture 410, a P picture 420, and a B picture 430. The I picture is a picture self-encoded without using a reference picture, and the P picture 420 and the B picture 430 are pictures encoded by performing motion estimation and motion compensation by using a reference picture. In particular, the B picture 430 is a picture encoded by predicting a past picture and a future picture respectively in a forward direction and a reverse direction, i.e., in both directions.

Referring to FIG. 4, motion estimation and motion compensation for encoding the P picture 420 uses the I picture 410 as a reference picture. Motion estimation and motion compensation for encoding the B picture 430 uses the I picture 410 and the P picture 420 as reference pictures. As such, in the inter prediction, motion may be estimated and compensated for by using multiple pictures instead of using only one reference picture.

In other words, the inter prediction process is a process of finding an optimum prediction block among reference pictures through motion estimation and generating a prediction block through motion compensation. When the prediction block is generated through the inter prediction, a residual signal that is a difference value between the generated prediction block and an original block is transformed, quantized, and entropy-encoded. Here, in a general inter prediction technique, prediction information such as a motion vector, a prediction direction, and a reference picture index is signaled together with the residual signal. In other words, in a general inter prediction operation, the prediction information is signaled and the signaled prediction information is used to generate a prediction block.

However, the inter prediction based on the DNN learning model according to an embodiment does not require signaling of prediction information. This is because the trained DNN learning model has a generalization ability to generate a correct prediction image by analyzing an input pattern and finding features of the input pattern. The inter prediction based on the DNN learning model according to an embodiment uses a DNN model trained such that an error between data of the prediction block and data of an original image is the smallest.

A detailed description about an inter prediction method based on a DNN learning model will be described below with reference to FIG. 12.

Figure 5:
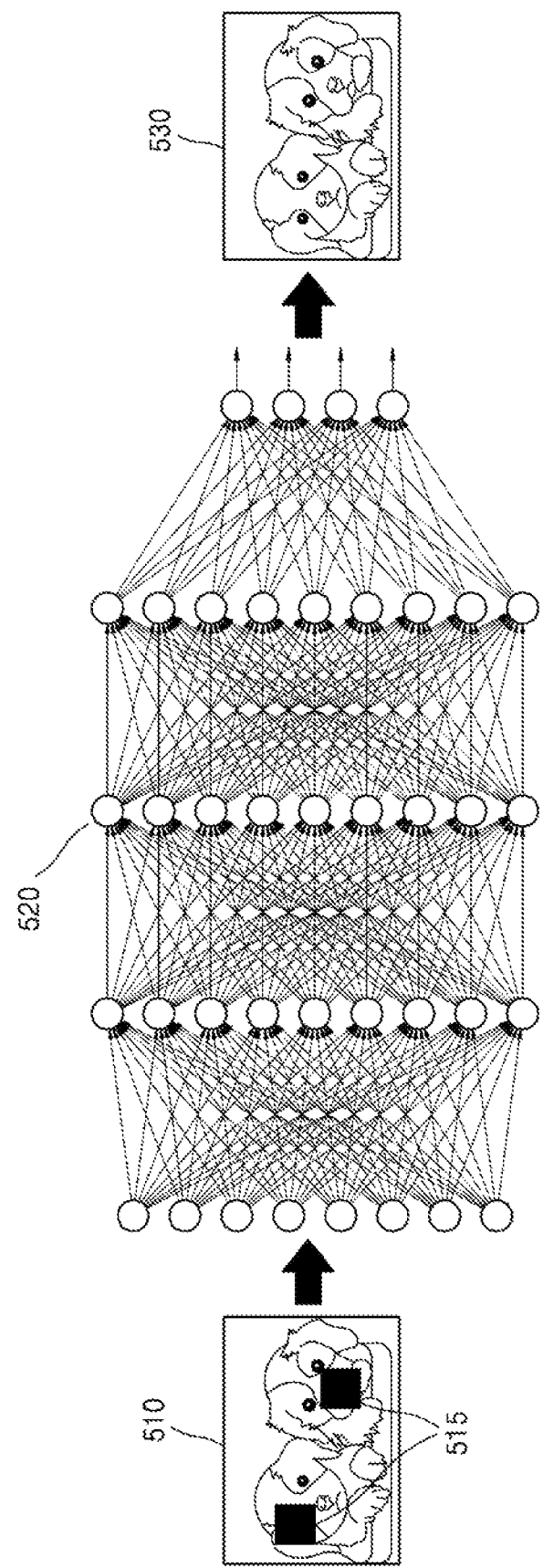
FIG. 5 is a diagram conceptually showing a prediction process based on a deep neural network (DNN) learning model, according to an embodiment.

FIG. 5 is a diagram conceptually showing a prediction process based on a DNN learning model, according to an embodiment.

Referring to FIG. 5, an input image 510, a DNN learning model 520, and a prediction image 530 are illustrated. The DNN learning model 520 is a network model trained to predict original data of a current block according to calculation based on a connection relationship between a plurality of network nodes included in the DNN learning model 520 and a weight of each of the plurality of network nodes.

The DNN learning model 520 may be designed to simulate a human brain structure on a computer. For example, the DNN learning model 520 may include the plurality of network nodes having weights and simulating neurons of a human neural network. The plurality of network nodes may each have a connection relationship to simulate synaptic activities in which neurons exchange signals through synapses.

The DNN learning model 520 may include, for example, an artificial intelligence (AI) neural network model or a deep learning network model developed from a network model.

When a region to be predicted is a current block 515, the input image 510 may be image data reconstructed before the current block 515. The input image 510 of FIG. 5 is illustrates as being present in the same picture as the current block 515, but the input image 510 may be a frame different from the picture to which the current block 515 belongs. For example, during intra prediction, reconstructed data belonging to the same picture as the current block 515 is used as the input image 510, and during the inter prediction, a picture reconstructed at a previous time is used as the input image 510.

The input image 510 may be input to an input layer of the DNN learning model 520 as training data. Data transmitted through the input layer of the DNN learning model 520 may be changed to a value easily predicted in a hidden layer. The hidden layer is connected through a connection line having a connection weight between the input layer and an output layer. The output layer of the DNN learning model 520 may generate an output, i.e., the prediction image 530, based on signals received from nodes of the hidden layer. The input layer, the hidden layer, and the output layer includes a plurality of nodes, and the DNN learning model 520 may generate mapping between the input image 510 and the prediction image 530 through an algorithm between the plurality of nodes. When the DNN learning model 520 is trained to output the prediction image 530 having the smallest error with respect to the input image 510, the DNN learning model 520 has a generalization ability to generate a relatively correct output with respect to an input pattern that was not used for training.

The DNN learning model 520 according to an embodiment may include a set of layers including a convolution pooling layer, a hidden layer, and fully connected layer. For example, an overall structure of the DNN learning model 520 may be configured such that the hidden layer is connected to the convolution pooling layer and the fully connected layer is connected to the hidden layer.

Also, the DNN learning model 520 according to an embodiment may be configured in a form of a CNN.

The CNN according to an embodiment has a structure suitable for image analysis, and may have a structure in which a feature extraction layer that self-learns a feature having the highest discriminative power from given image data and a prediction layer that learns a prediction model to exhibit the highest prediction performance based on an extracted feature are integrated.

The feature extraction layer may have a structure in which a convolution layer that generates feature maps by applying a plurality of filters to each region of an image and a pooling layer that extracts a feature invariable to changes in positions or rotations by spatially integrating the feature maps are alternately repeated a plurality of times. Accordingly, various levels of features may be extracted from low levels of features such as a point, a line, and a plane to high levels of complex and meaningful features.

The convolution layer obtains a feature map by applying a nonlinear activation function to an inner product of a local receptive field and a filter with respect to each patch of an input image, and compared with another network structure, the CNN is characterized in using a filter having a sparse connectivity and shared weights. Such a connection structure reduces the number of parameters to be learned and makes learning through a back-propagation algorithm more efficient, resulting in improved prediction performance.

The pooling layer or a sub-sampling layer generates a new feature map by using local information of a feature map obtained by a previous convolution layer. Generally, the feature map newly generated by the pooling layer has a size smaller than an original feature map, and a representative pooling method includes max pooling of selecting a maximum value of a corresponding region in the feature map and average pooling of obtaining an average value of the corresponding region in the feature map. The feature map of the pooling layer is generally less affected by an arbitrary structure or a location of a pattern present in an input image than a feature map of a previous layer. In other words, the pooling layer may extract a feature that is more robust to local changes such as noise or distortion in the input image or a previous feature map and such a feature may be important in classification performance. Another function of the pooling layer is to allow reflection of a feature in a wider region as the layer goes up to a higher learning layer on a deep structure, and as the feature extraction layers are stacked, the pooling layer may generate a feature map reflecting a local feature in a lower layer and reflecting an abstract overall image towards a higher layer.

As such, the features finally extracted through repetition of the convolution layer and the pooling layer may be used for classification model training and prediction as the classification model such as multi-layer perception (MLP) or a support vector machine (SVM) is combined in a form of a fully connected layer. Various structures of a CNN learning model will be described below with reference to FIGS. 10A through 10F.

Also, the DNN learning model 520 according to an embodiment may be configured in a form of an RNN.

According to an embodiment, an output of the hidden node in a previous time section in the structure of the DNN learning model 520 may be connected to hidden nodes in a current time section. Also, an output of the hidden node in the current time section may be connected to hidden nodes in a next time section. As such, a neural network having a recurrent connection between hidden nodes in different time sections is referred to as the RNN. The RNN according to an embodiment may recognize sequential data. The sequential data is data having temporality or an order, such as audio data, image data, biometric data, or handwriting data. For example, a determination model of the RNN may determine according to which pattern input image data changes.

When the RNN learning model is trained by providing input/output data sets for a certain period of time, the RNN learning model learns data patterns for the certain period of time in a high dimension and generates a model that infers the prediction image 530 most similar to original data. Various structures of the RNN learning model will be described below with reference to FIGS. 8A through 8C.

The DNN learning model 520 according to an embodiment may be configured in a combination of the CNN learning model and the RNN learning model.

Meanwhile, the DNN learning model 520 may be implemented as a software module. When implemented as the software module (for example, a program module including instructions), the DNN learning model 520 may be stored in a computer-readable recording medium.

Also, the DNN learning model 520 may be integrated in a form of a hardware chip and be a part of the image encoding apparatus 100 or the image decoding apparatus 200 described above. For example, the DNN learning model 520 may be manufactured in a form of a dedicated hardware chip for AI or may be manufactured as a part of an existing general-purpose processor (for example, a central processing unit (CPU) or an application processor) or a graphics dedicated processor (for example, a graphical processing unit (GPU)).

Also, the DNN learning model 520 may be provided in a form of downloadable software. A computer program product may include a product (for example, a downloadable application) in a form of a software program electronically distributed through a manufacturer of the image encoding apparatus 100 or the image decoding apparatus 200 or through an electronic market. For electronic distribution, at least a part of the software program may be stored in a storage medium or temporarily generated. At this time, the storage medium may be a storage medium of a server of the manufacturer or electronic market, or a relay server.

Figure 6:
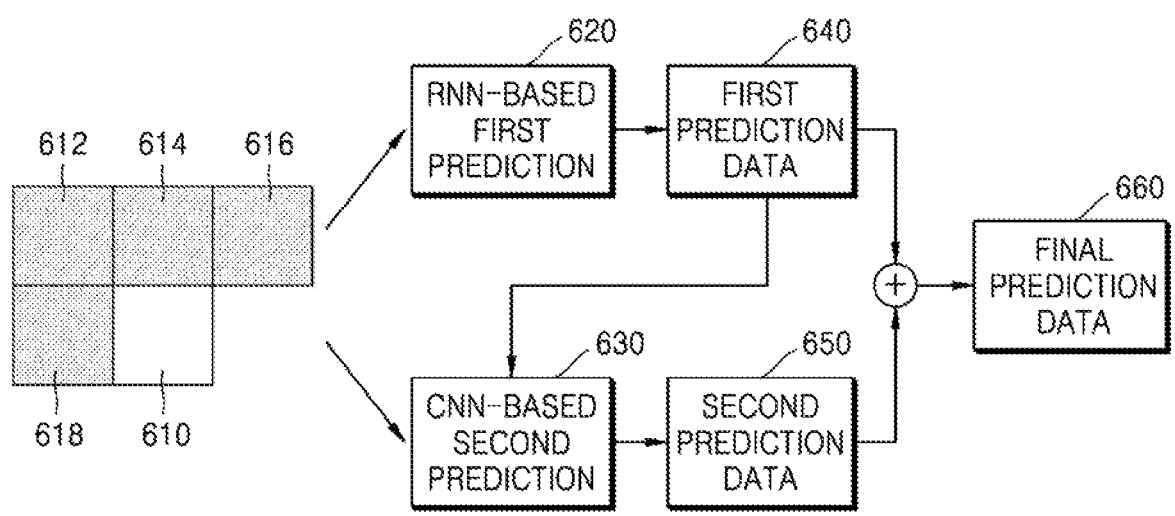
FIG. 6 is a diagram showing an intra prediction process based on a DNN learning model, according to an embodiment.

FIG. 6 is a diagram showing an intra prediction process based on a DNN learning model, according to an embodiment.

Intra prediction based on the DNN learning model according to an embodiment may be performed by the intra predictor 120 of the image encoding apparatus 100 or the intra predictor 240 of the image decoding apparatus 200.

The intra predictor 120 or 240 according to an embodiment may generate prediction data by performing prediction based on the DNN learning model on a current block 610 to be predicted. Here, the prediction based on the DNN learning model may include first prediction and second prediction processes. The prediction data generated by performing the prediction based on the DNN learning model may denote final prediction data 660 generated via the first prediction and the second prediction. The first prediction may be based on an RNN learning model and the second prediction may be based on a CNN learning model. Accordingly, the prediction based on the DNN learning model according to an embodiment may include RNN learning model-based first prediction 620 and CNN learning model-based second prediction 630.

Referring to FIG. 6, the intra predictor 120 or 240 according to an embodiment may generate first prediction data 640 by performing the RNN learning model-based first prediction 620 on the current block 610 to be predicted. Here, the RNN learning model may be a network trained such that the first prediction data 640 generated as an output of the RNN learning model becomes the same as original data of the current block 610. In other words, by using the trained RNN model, the first prediction data 640 having the smallest error with the original data of the current block 610 may be generated. A detailed structure of the RNN learning model will be described below.

The RNN learning model-based first prediction 620 according to an embodiment may use neighboring blocks 612 through 618 adjacent to the current block 610 as inputs. The neighboring blocks 612 through 618 may be blocks reconstructed before the current block 610. The neighboring blocks 612 through 618 shown in FIG. 6 are illustrated to be located at the top left, top, top right, and right of the current block 610, but the locations thereof may vary according to a block reconstruction order in a picture. For example, neighboring blocks may be blocks located in each direction facing adjacent blocks from the current block 610.

Meanwhile, the prediction is performed by using the neighboring blocks 612 through 618 during the intra prediction because the neighboring blocks 612 through 618 have continuity or directivity with respect to the current block 610. As such, in order to perform a task of interring a correlation through continuous input patterns, the RNN that enables previous information to be connected to a current task may be used. For example, an input order of the neighboring blocks 612 through 618 to the RNN learning model may affect predicting the current block 610.

Hereinafter, data input to the RNN learning model for the RNN learning model-based first prediction 620 is referred to as "first input data". The RNN learning model according to an embodiment may determine sequential data. An order of inputting the "first input data" to the RNN learning model will be described below with reference to FIGS. 9A through 9C.

The intra predictor 120 or 240 according to an embodiment may generate second prediction data 650 by performing the CNN learning model-based second prediction 630 on the generated first prediction data 640. Here, the CNN learning model may be a network trained such that the second prediction data 650 generated as an output of the CNN learning model becomes the same as a value obtained by subtracting the first prediction data 640 from the original data of the current block 610. As such, by using the trained CNN learning model, the second prediction data 650 having the smallest error with the value obtained by subtracting the first prediction data 640 from the original data of the current block 610 may be generated. In other words, a process of the CNN learning model-based second prediction 630 may be understood as a process of predicting the value obtained by subtracting the first prediction data 640 from the original data of the current block 610. A detailed structure of the CNN learning model will be described below.

The CNN learning model-based second prediction 630 according to an embodiment may use data of a region including the current block 610 and the neighboring blocks 612 through 618 as an input. The data of the region including the current block 610 and the neighboring blocks 612 through 618 may include the first prediction data 640 corresponding to the current block 610 and reconstructed data corresponding to the neighboring blocks 612 through 618. Hereinafter, data input to the CNN learning model for the CNN learning model-based second prediction 630 is referred to as "second input data".

The "second input data" will be described in detail below with reference to FIG. 11.

The intra predictor 120 or 240 according to an embodiment may generate the final prediction data 660 regarding the current block 610 by adding the first prediction data 640 and the second prediction data 650.

The image encoding apparatus 100 according to an embodiment may generate residual data by calculating a difference between the original data of the current block 610 and the final prediction data 660, generate a bitstream in which the generated residual data is encoded, and transmit the bitstream to the image decoding apparatus 200. The image encoding apparatus 100 according to an embodiment does not encode separate prediction information (for example, prediction mode information).

The image decoding apparatus 200 according to an embodiment may reconstruct data of the current block 610 by adding the residual data obtained from the bitstream with the final prediction data 660. Here, the image decoding apparatus 200 may generate the final prediction data 660 without having to obtain separate prediction information from the bitstream.

Figure 7:
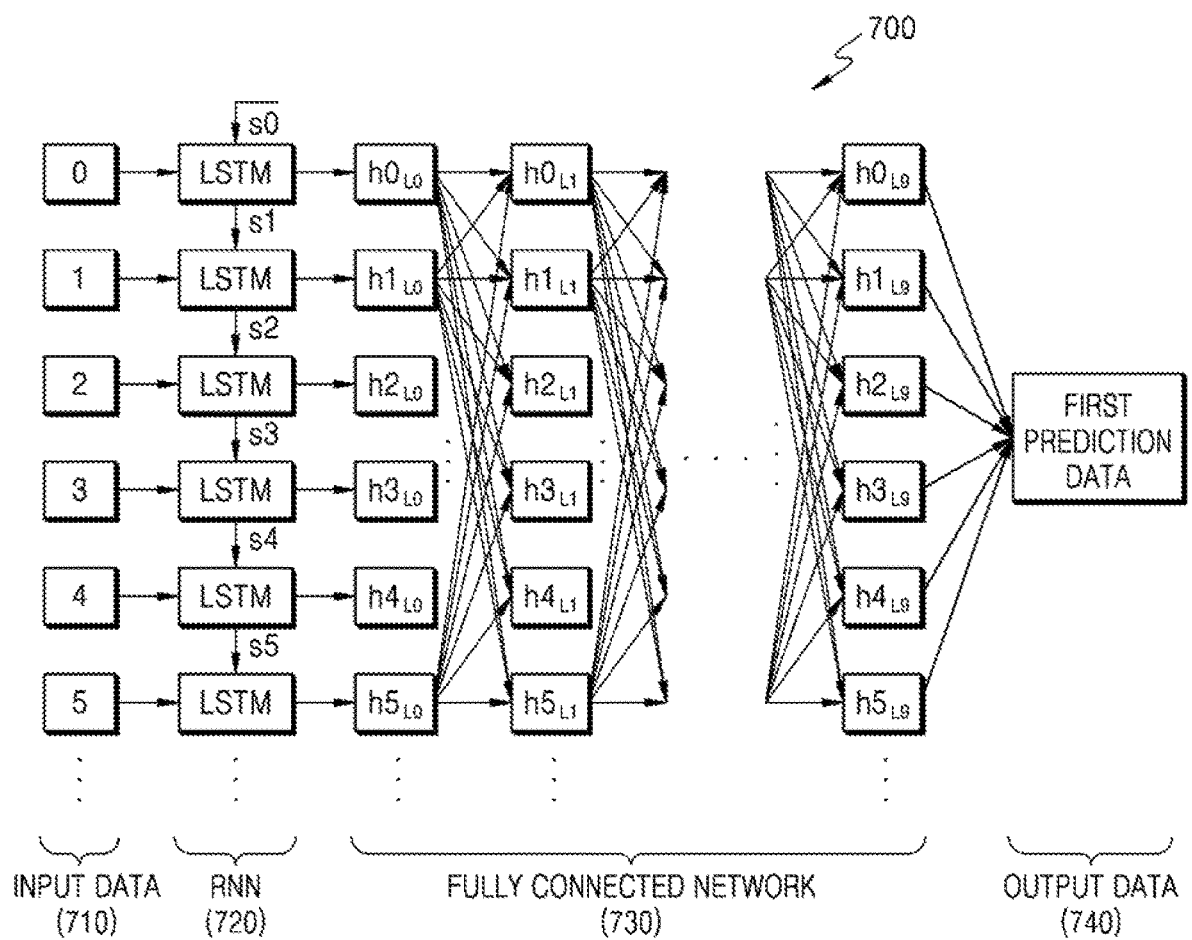
FIG. 7 is a diagram of a recurrent neural network (RNN) learning model as an example of a DNN learning model.

FIG. 7 is a diagram of a recurrent neural network (RNN) learning model as an example of a DNN learning model.

An RNN is a network in which connection between hidden nodes is present in different time sections, and the network may be trained through supervised learning. The supervised learning is a method of inputting training data to a neural network together with output data corresponding to the training data, and updating connection weights of connection lines such that the output data corresponding to the training data is output. For example, the RNN may update connection weights between neurons through a delta rule and error back-propagation learning.

The error back-propagation learning is a method of estimating an error with respect to given training data via forward computation, propagating the estimated error by moving backward in a direction to a hidden layer and an input layer from an output layer, and updating a connection weight in a direction of reducing an error. A process of a neural network is performed in a direction of an input layer, a hidden layer, and an output layer, but in the error back-propagation learning, a direction of updating the connection weight may be performed in a direction of the output layer, the hidden layer, and the input layer.

An RNN learning model 700 may define an objective function for measuring how close currently set connection weights are to the optimum, continuously change the connection weights based on a result of the objective function, and repeatedly perform learning. For example, the objective function may be an error function for the RNN learning model 700 to calculate an error between an output value that is actually output based on the training data and an expected value desired to be output. The RNN learning model 700 may update the connection weights in a direction of reducing a value of the error function.

The intra predictor 120 or 240 according to an embodiment may perform first prediction based on the RNN learning model 700 on the current block 610. Here, the RNN learning model 700 includes an RNN 720, wherein the RNN 720 may have a structure including a long short-term memory (LSTM) network and a gated recurrent unit (GRU). The LSTM is a type of RNN capable of long-term dependency learning. An RNN not including the LSTM network may connect previous information to a current task, but is difficult to connect information of a previous task that is temporally far to the current task. The LSTM has a structure designed to avoid such long-term dependency. A detailed structure of the LSTM will be described below with reference to FIG. 8B. The GRU has a structure modified from the LSTM and a detailed structure thereof will be described below with reference to FIG. 8C.

Referring to FIG. 7, the RNN learning model 700 may include the RNN 720 and a fully connected network 730.

The RNN 720 in the RNN learning model 700 may detect a feature value from input data 710. For example, the RNN 720 may extract, from the input data 710 as the feature value, a relative change amount that changes according to time. The RNN 720 may obtain enough feature values from the input data 710 and train a network by using the obtained feature values. Here, the input data 710 may be first input data.

The RNN 720 according to an embodiment may learn a changing trend of a block that changes in a certain direction. In this regard, neighboring blocks of a current block may be input to the RNN 720 according to a changing order. Here, blocks input to the RNN 720 are blocks in the same time frame.

According to an embodiment, the input data 710 may be input to the RNN 720 sequentially. According to an embodiment, the neighboring blocks adjacent to the current block may be input to the RNN 720 in an input order corresponding to the changing trend. For example, the neighboring blocks may be learned by being input to each RNN 720 according to time steps or time stamps. For example, the neighboring blocks may be input to the RNN 720 in an order such as 'no. 0' input data 710, 'no. 1' input data 710, and 'no. 2' input data 710, based on a predetermined direction.

In continuous time sections, an output value output from the RNN 720 of the RNN learning model 700 may be input to the RNN 720 in a next time step. For example, an output value "s1" of the RNN 720 that processed the 'no. 0' input data 710 may be input to the RNN 720 that processes the 'no. 1' input data 710. Also, an output value "s2" of the RNN 720 that processed the 'no. 1' input data 710 may be input to the RNN 720 that processes the 'no. 2' input data 710.

For example, referring to FIG. 7, when the RNN 720 that learns the 'no. 1' input data 710 indicates a learning pattern at a current time step T, the RNN 720 that learns the 'no. 0' input data 710 indicates a learning pattern at a previous time step T−1 and the RNN 720 that learns the 'no. 2' input data 710 indicates a learning pattern at a next time step T+1. As such, the RNN 720 uses a structure of all of a previous time step, a current time step, and a next time step for learning. Information of a current step in the RNN 720 may be transmitted to a next step to affect an output value.

The fully connected network 730 may classify learning results of the RNN 720 regarding sequential data, and output, from an output layer of the RNN learning model 700, output data 740. The output data 740 according to an embodiment may be first prediction data.

Learning processes of the RNN 720 may include processes of comparing an output value generated in each time step and a desired expected value and adjusting connection weights of nodes in a direction of reducing a difference between the output value and the expected value. For example, the input data 710 input to the RNN 720 may be multiplied and added with connection weights of the RNN 720 and the fully connected network 730. At this time, a difference may occur between the generated output data 740 of the RNN learning model 700 and expected output data, and the RNN learning model 700 may update the connection weights of the nodes in a direction of minimizing the difference.

Figure 8A:
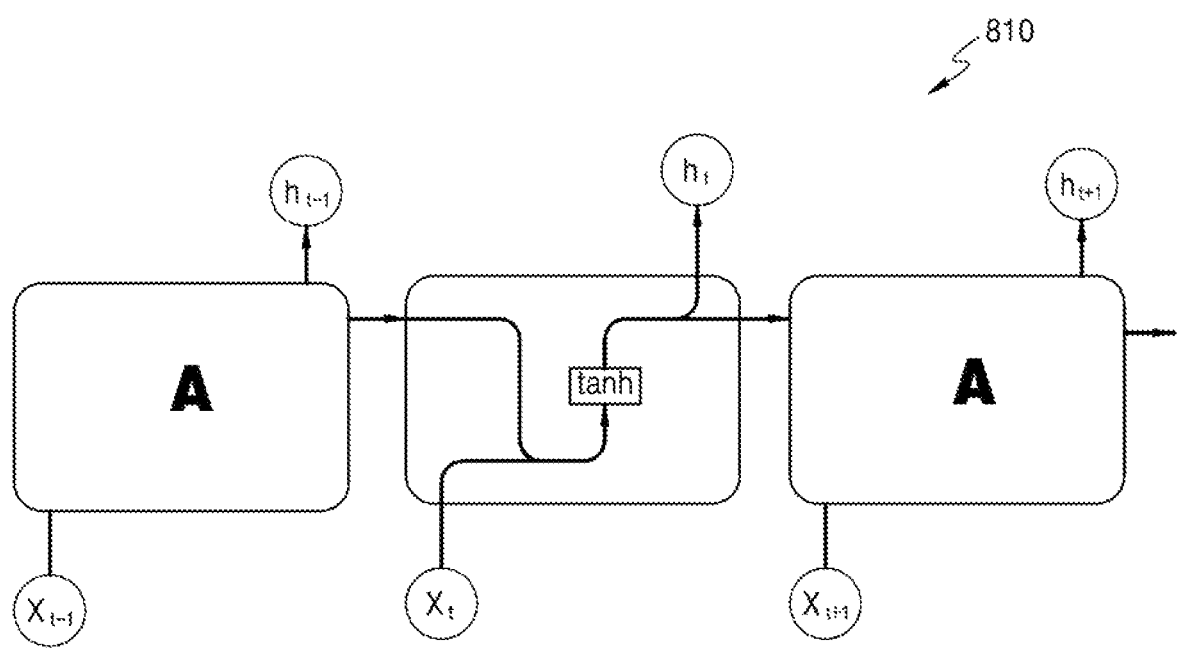
FIGS. 8A through 8C are diagrams of structures of various RNNs.
Figure 8B:
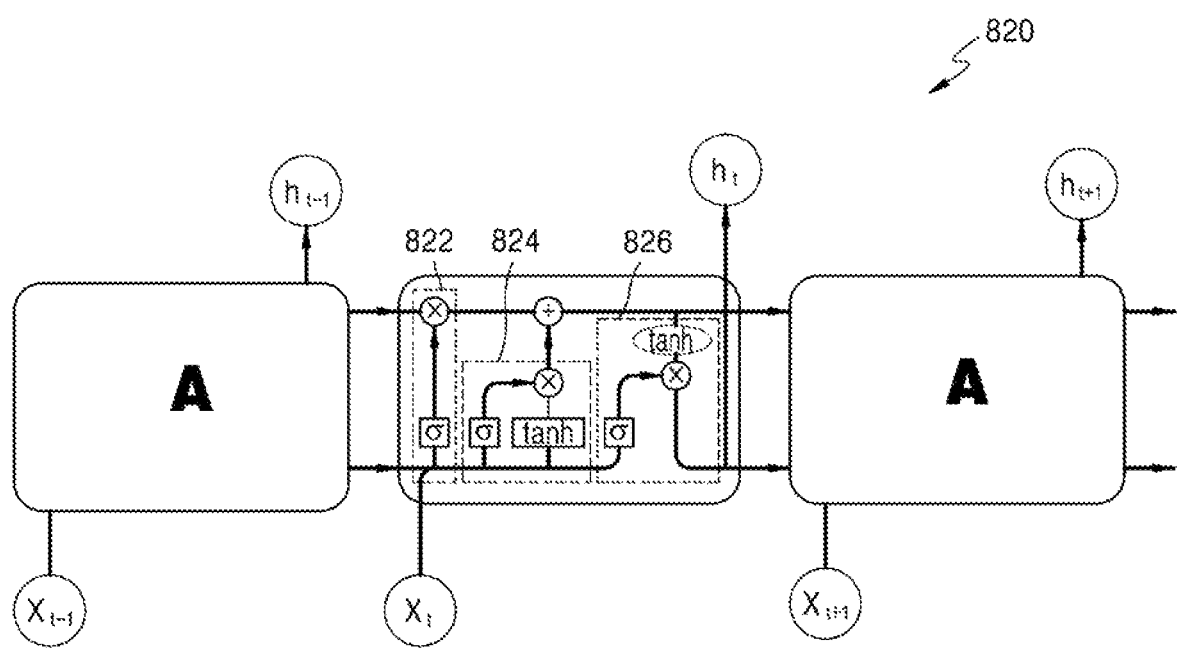
Figure 8C:
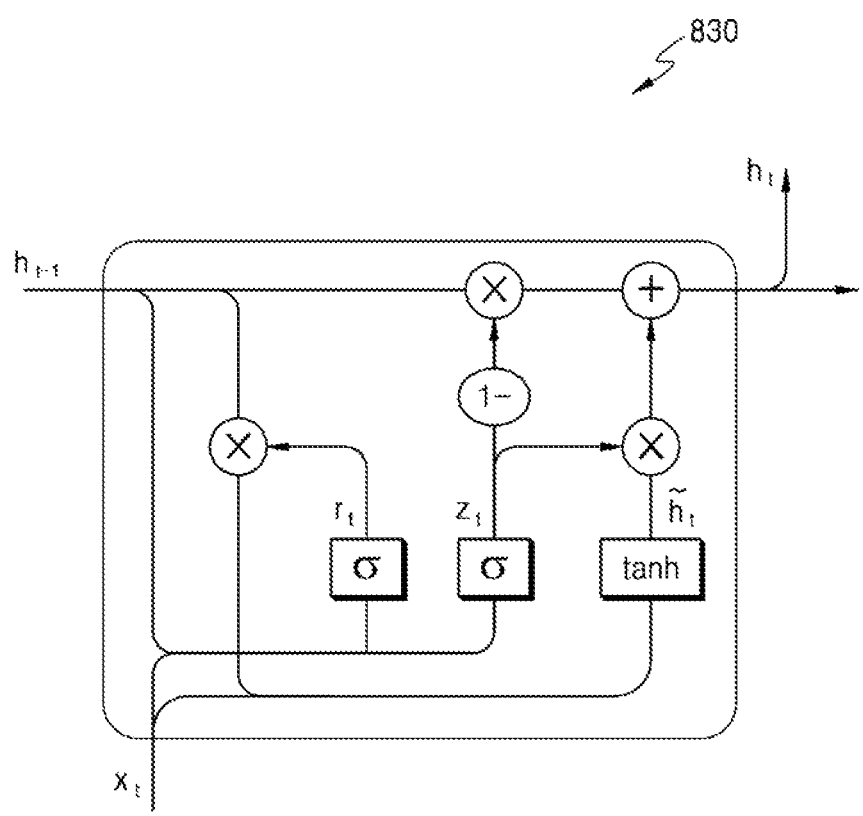

FIGS. 8A through 8C are diagrams of structures of various RNNs.

Referring to FIG. 8A, a basic structure of RNN 810 including a single layer is illustrated.

A result output from the RNN 810 is determined based on a previous state stored in a cell and an input Xt of the cell. A feed-forward neural network is trained through back-propagation whereas the RNN 810 may be trained through a back-propagation through time (BTPP) method for training throughout time steps. The RNN 810 is trained through the BTPP method because a gradient output from the cell of the RNN 810 is dependent not only on a current time step, but also on previous time steps. For example, in order to calculate a gradient when t=4, gradients from previous 3 time steps need to be all considered. As such, when training with data dependency of a long period of time is performed by using the RNN 810, the current state may be related to many previous states. Accordingly, when the RNN 810 performs calculation through BPTT, the length of connection by a chain rule is highly increased, and accordingly, a vanishing gradient may occur. When the training with high dependency is performed through a long period of time, an RNN structure including LSTM or GRU may be efficient.

Referring to FIG. 8B, a structure of LSTM 820 is illustrated.

The LSTM 820 separately includes a cell state and a hidden layer. The cell state is mainly responsible for storing information and performs a function of a long-term memory. The LSTM 820 includes 3 gates that adjust strength of connection. The 3 gates include a forget gate 822, an input gate 824, and an output gate 826. The forget gate 822 may delete information that is not largely important on a cell. Also, the hidden layer (tanh) may update the cell with only important information through the input gate 824. Referring to FIG. 8B, the LSTM 820 may adjust an effect of state information of a previous cell on a state of a current cell by adjusting a gate. Also, the LSTM 820 may add information related to a current input and determine a level of effect on an output.

Referring to FIG. 8C, a structure of GRU 830 is illustrated.

The GRU 830 has a deep learning structure of avoiding long-term dependency of an RNN learning model by selectively updating a cell state storing information.

The cell state of the GRU 830 may be added or deleted via a structure called a gate. Each cell may include 3 gates performing write, read, and keep operations, and each gate may have a value between 0 and 1. The value of each gate is a basis for determining whether to store, read, or keep information of the cell. As such, the gate of each cell selectively transmits information. Selective information transmitting processes may include a sigmoid layer, a tanh layer, and a pointwise multiplication operation. Meanwhile, the value between 0 and 1 of each gate may be leaned in the same principle as weights of a neural network.

The GRU 830 includes a plurality of interacting layers in each module. The GRU 830 may generate a new cell state and a new cell output by applying a plurality of gates on a current cell input and a current cell state for each time step.

A first sigmoid layer of the GRU 830 receives $h_{t-1}$ and $x_t$, and outputs $r_t$. It is determined whether to maintain or not maintain $h_{t-1}$ i.e., a cell state of a previous step, according to an output value of the first sigmoid layer. A value of '1' output from a sigmoid layer indicates "fully maintain" and a value of '0' indicates "fully remove". A function of the first sigmoid layer is shown in Equation 1.

$$z_t = \sigma(W_z \cdot [h_{t-1}, x_t])$$ [Equation 1]

A second sigmoid layer of the GRU 830 receives $h_{t-1}$ and $x_t$ and outputs $z_t$ according to Equation 2. Values to be updated may be determined through the second sigmoid layer.

$$r_t = \sigma(W_r \cdot [h_{t-1}, x_t])$$ [Equation 2]

The tanh layer of the GRU 830 generates a vector of new candidate values that may be added to the cell state. To generate the value for updating the cell state, an output value of the second sigmoid layer and an output value of the tanh layer may be added. A function of the tanh layer is shown in Equation 3.

$$\tilde{h}_t = \tanh(W \cdot [r_t * h_{t-1}, x_t])$$ [Equation 3]

Lastly, the GRU 830 may update a cell state $h_{t-1}$ of a previous step by using Equation 4. The updated new cell state is represented as $h_t$.

$$h_t = (1-z_t) * h_{t-1} + z_t * \tilde{h}_t$$ [Equation 4]

The new cell state derived according to Equation 4 may be a basis for determining whether to use data input to a corresponding cell during network training. As such, the GRU 830 may avoid the long-term dependency of RNN via selective updating of the cell state storing information.

Meanwhile, the RNN according to an embodiment is not limited to the structure described above, and may have a structure modified in various forms.

As described above, the RNN learning model 700 may be used to recognize the sequential data. In other words, a recognition model of the RNN learning model 700 may extract a feature value from the sequential data when the sequential data is input, and output a recognition result by classifying the extracted feature value. A method of inputting the sequential data of the RNN learning model 700 according to an embodiment will be described below.

Figure 9A:
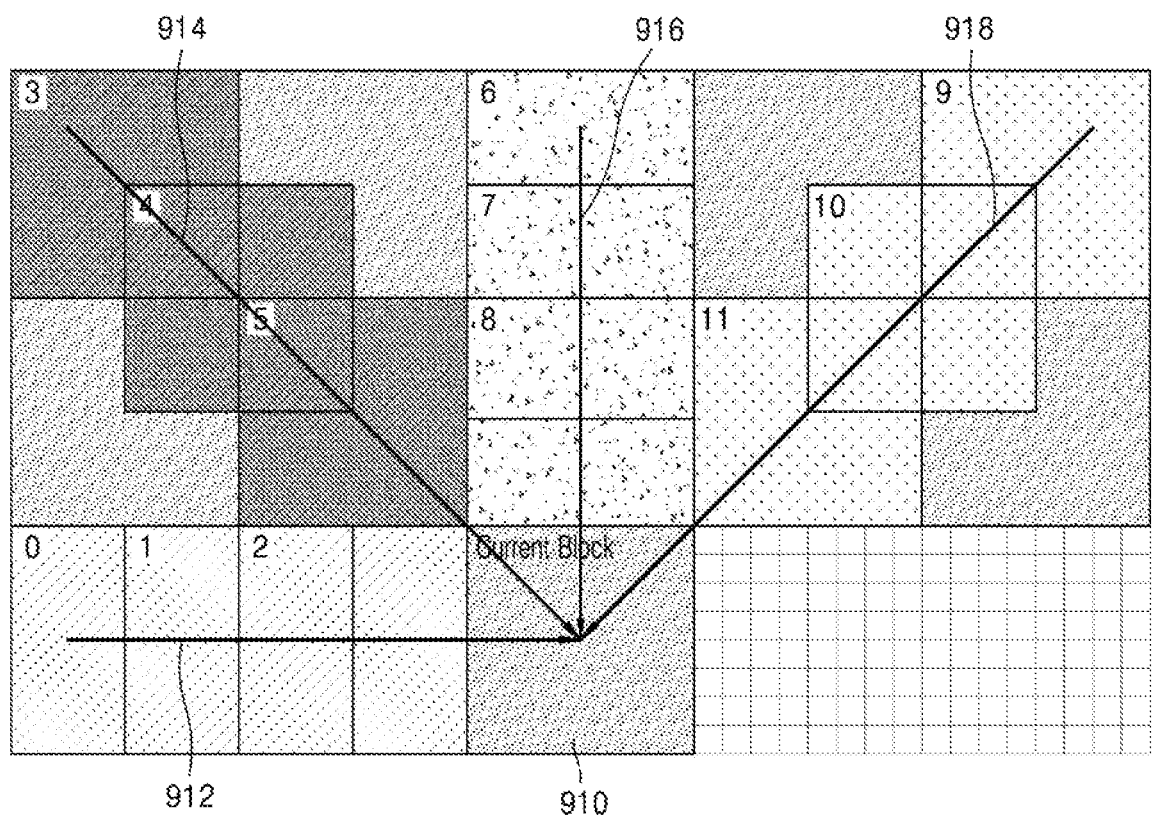
FIG. 9A is a diagram showing an example of RNN input data for generating first prediction data.

FIG. 9A is a diagram showing an example of RNN input data for generating first prediction data.

Because intra prediction is a process of predicting a current block depending on a pattern of neighboring blocks having uniform directivity, input data for training of an RNN may also be sequentially input in a uniform direction.

Referring to FIG. 9A, a current block 910 to be predicted and neighboring blocks (blocks '0' to '11') are illustrated. The intra predictor 120 or 240 according to an embodiment may use the neighboring blocks adjacent to the current block 910 as first input data to perform first prediction and input the neighboring blocks to an RNN learning model. The first input data is data reconstructed before the current block 910, and a location at which the first input data is distributed is not limited to a location shown in FIG. 9A.

According to an embodiment, the intra predictor 120 or 240 may determine one or more input angles 912 through 918 based on the current block 910. Here, the one or more input angles 912 through 918 may be pre-set. According to another embodiment, the one or more input angles 912 through 918 may be determined according to information signaled from the image encoding apparatus 100 to the image decoding apparatus 200.

According to an embodiment, the intra predictor 120 or 240 may determine the neighboring blocks (blocks '0' to '11') for each input angle located along each of the input angles 912 through 918. The neighboring block for each input angle may correspond to the first input data for generating first prediction data.

According to an embodiment, the intra predictor 120 or 240 may input the neighboring blocks (blocks '0' to '11') for each input angle to each cell of the RNN in a clockwise order. For example, the neighboring blocks at each input angle may be input to each cell of the RNN in an order of the input angle 912, the input angle 914, the input angle 916, and the input angle 918 according to the time step. However, an order of inputting the neighboring blocks for each input angle may not be necessarily the clockwise order, and may be a counterclockwise order or another predetermined direction order.

When there are a plurality of neighboring blocks for each input angle, an input order of the neighboring blocks located at the same input angle may be an order from a farthest location to a closest location to the current block. For example, referring to FIG. 9A, an input order of the neighboring blocks (blocks '0' to '2') located at the input angle 912 may be block '0', block '1', and block '2'. However, the input order of the neighboring blocks located at the same input angle is not limited thereto. For example, the input order of the neighboring blocks located at the same input angle may be an order from the closest location to the farthest location from the current block.

An order of the intra predictor 120 or 240 according to an embodiment inputting the neighboring blocks to the RNN learning model may be pre-set. Also, according to another embodiment, the input order of the neighboring blocks may be determined according to information signaled from the image encoding apparatus 100 to the image decoding apparatus 200. As a specific example, the first input data may be input to the RNN learning model according to an order described below. However, a following embodiment is only an example, and the input order of first input data may be variously modified.

According to an embodiment, first, the intra predictor 120 or 240 may input, to each cell of the RNN of the RNN learning model, each of left neighboring blocks in an order from a farthest location to a closest location to the current block 910 among the left neighboring blocks (blocks '0' to '2') located at the left of the current block 910.

Then, the intra predictor 120 or 240 may input, to each cell of the RNN of the RNN learning model, each of top left neighboring blocks in an order from a farthest location to a closest location to the current block 910 among the top left neighboring blocks (blocks '3' to '5') located at the top left of the current block 910.

Then, the intra predictor 120 or 240 may input, to each cell of the RNN of the RNN learning model, each of top neighboring blocks in an order from a farthest location to a closest location to the current block 910 among the top neighboring blocks (blocks '6' to '8') located at the top left of the current block 910.

Then, the intra predictor 120 or 240 may input, to each cell of the RNN of the RNN learning model, each of top right neighboring blocks in an order from a farthest location to a closest location to the current block 910 among the top right neighboring blocks (blocks '9' to '11') located at the top left of the current block 910.

Figure 9B:
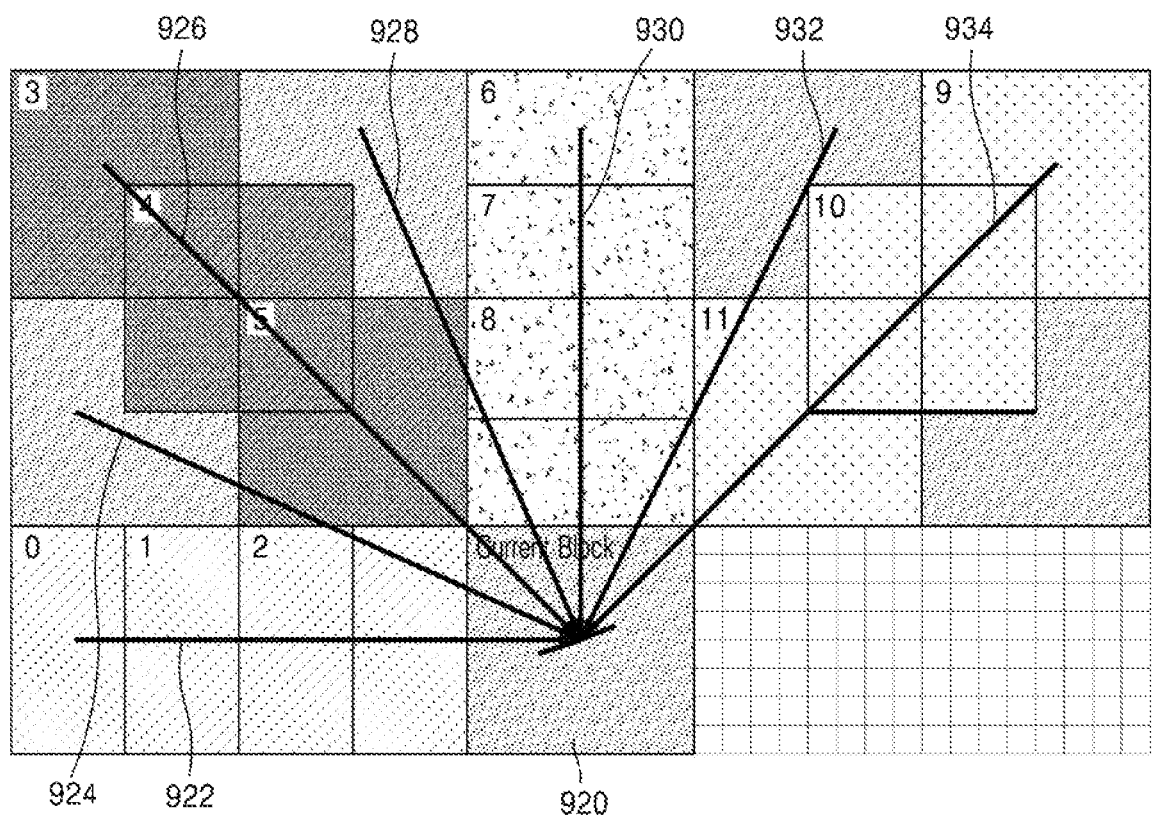
FIG. 9B is a diagram showing another example of RNN input data for generating first prediction data.

FIG. 9B is a diagram showing another example of RNN input data for generating first prediction data.

According to an embodiment, the intra predictor 120 or 240 may input neighboring blocks for each input angle to each cell of an RNN in a clockwise order. For example, the neighboring blocks at each input angle may be input to each cell of the RNN in an order of an input angle 922, an input angle 924, an input angle 926, an input angle 928, an input angle 930, an input angle 932, and an input angle 934 according to time steps. When there are a plurality of neighboring blocks for each input angle, an input order of the neighboring blocks located at the same input angle may be an order from a farthest location to a closest location to the current block. For example, referring to FIG. 9BA, an input order of the neighboring blocks (blocks '3' to '5') located at the input angle 926 may be block '3', block '4', and block '5'. However, the above input order is only an example and the neighboring blocks located at the same input angle may be input to the RNN in various input orders.

Figure 9C:
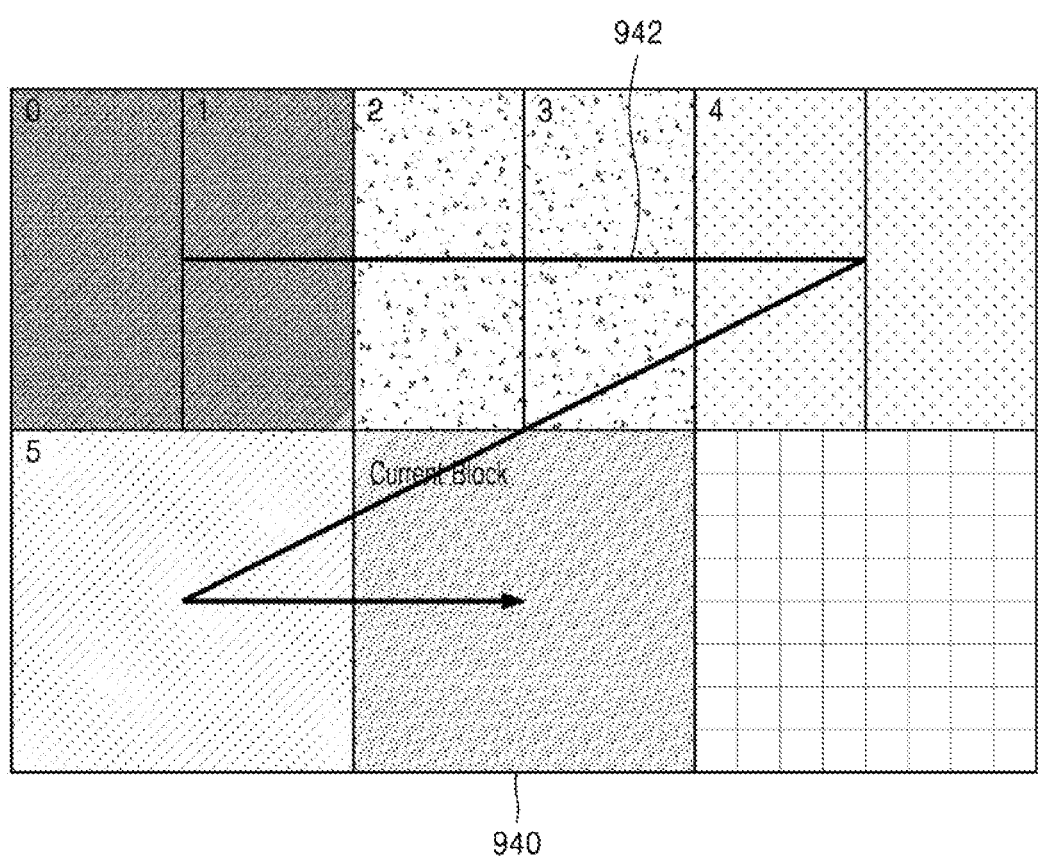
FIG. 9C is a diagram showing another example of RNN input data for generating first prediction data.

FIG. 9C is a diagram showing another example of RNN input data for generating first prediction data.

Referring to FIG. 9C, a current block 940 to be predicted and neighboring blocks (blocks '0' to '5') are illustrated. The intra predictor 120 or 240 according to an embodiment may use the neighboring blocks adjacent to the current block 940 as first input data to perform first prediction and input the neighboring blocks to an RNN learning model. The first input data is data reconstructed before the current block 940.

The intra predictor 120 or 240 according to an embodiment may input the neighboring blocks to each cell of the RNN in a Z-scan order.

For example, the intra predictor 120 or 240 may input the neighboring blocks to each cell of the RNN of the RNN learning model in an order from a top left location of the current block 940 to a top right location of the current block 940 and a left location of the current block 940 (i.e., in an order from block '0' to '5').

However, the above input order of the neighboring blocks is only an example and the neighboring blocks may be input to each cell of the RNN in various can orders (for example, a raster scan order, an N-scan order, an up-right diagonal scan order, a horizontal scan order, and a vertical scan order).

FIGS. 10A through 10F are diagrams of structures of various CNNs.

Figure 10A:
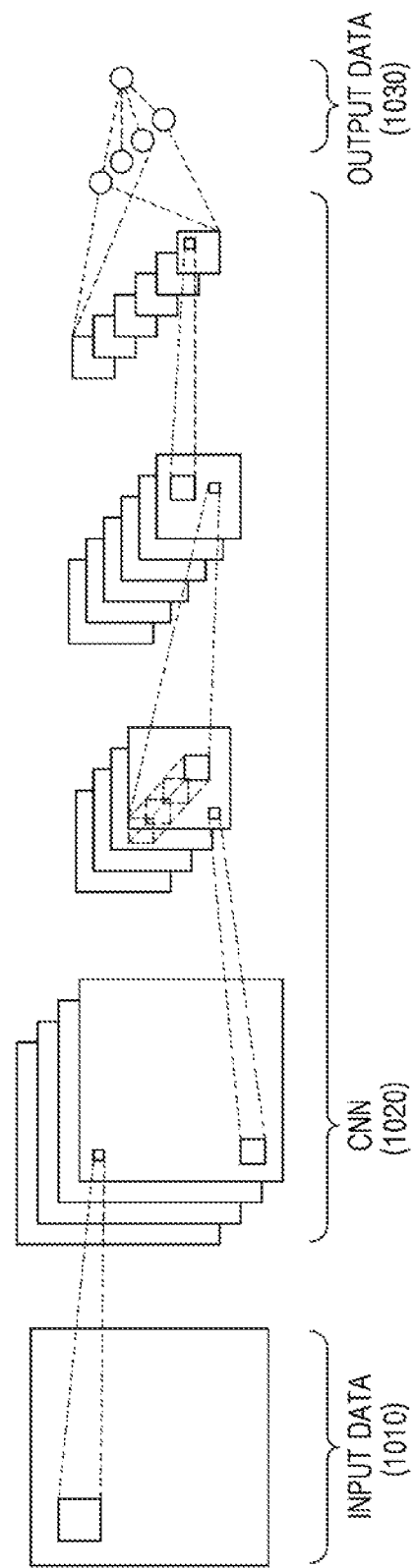
FIGS. 10A through 10F are diagrams of structures of various convolutional neural networks (CNNs).

Referring to FIG. 10A, a basic structure of a CNN learning model according to an embodiment is illustrated.

Referring to FIG. 10A, input data 1010 is input through an input layer of a CNN learning model 1020 and output data 1030 is output through an output layer of the CNN learning model 1020.

A plurality of hidden layers may be provided between the input layer and the output layer of the CNN learning model 1020. Each layer forming the hidden layer may include a convolution layer and a sub-sampling layer. The convolution layer performs a convolution operation on image data input to each layer by using a convolution filter and generates a feature map. Here, the feature map denotes image data expressing various features of the input data 1010. The sub-sampling layer reduces the size of the feature map via sampling or pooling. The output layer of the CNN learning model 1020 classifies a class of the image data by combining the various features expressed in the feature map. Here, the output layer may be configured as a fully connected layer.

A structure (for example, the number of hidden layers, the number and size of filters in each layer, and the like) of a CNN learning model according to an embodiment is pre-determined, and a weight matrix of a filter (in particular, a convolution filter) in each layer is calculated to a suitable value by using data for which an answer about to which class the data belongs is pre-known. As such, the data for which the answer is pre-known is used as 'training data'. Here, a process of determining the weight matrix of the filter is 'learning'.

For example, in the structure of the CNN learning model 1020, the number of filters per layer may be 64 and the size of each filter may be 3×3. Also, for example, in the structure of the CNN learning model 1020, the total number of layers may be 10. However, the above embodiment is only an example and the number of hidden layers, the number and size of filters in each layer, and the like may be modified in various forms.

As described above with reference to FIG. 6, the intra predictor 120 or 240 according to an embodiment may generate second prediction data (i.e., the output data 1030) by performing second prediction based on the CNN learning model 1020 on first prediction data generated through first prediction based on an RNN learning model. The CNN learning model 1020 according to an embodiment may be a network trained such that the second prediction data that is the output data 1030 becomes the same as a value obtained by subtracting the first prediction data from original data of a current block.

Here, the input data 1010 of the CNN learning model 1020 may be the first prediction data and neighboring reconstructed data adjacent to the current block, and the output data 1030 may be prediction data of the current block in which an error with the value obtained by subtracting the first prediction data from the original data of the current block is minimized. Meanwhile, the error may be measured based on an R-D cost.

Figure 10B:
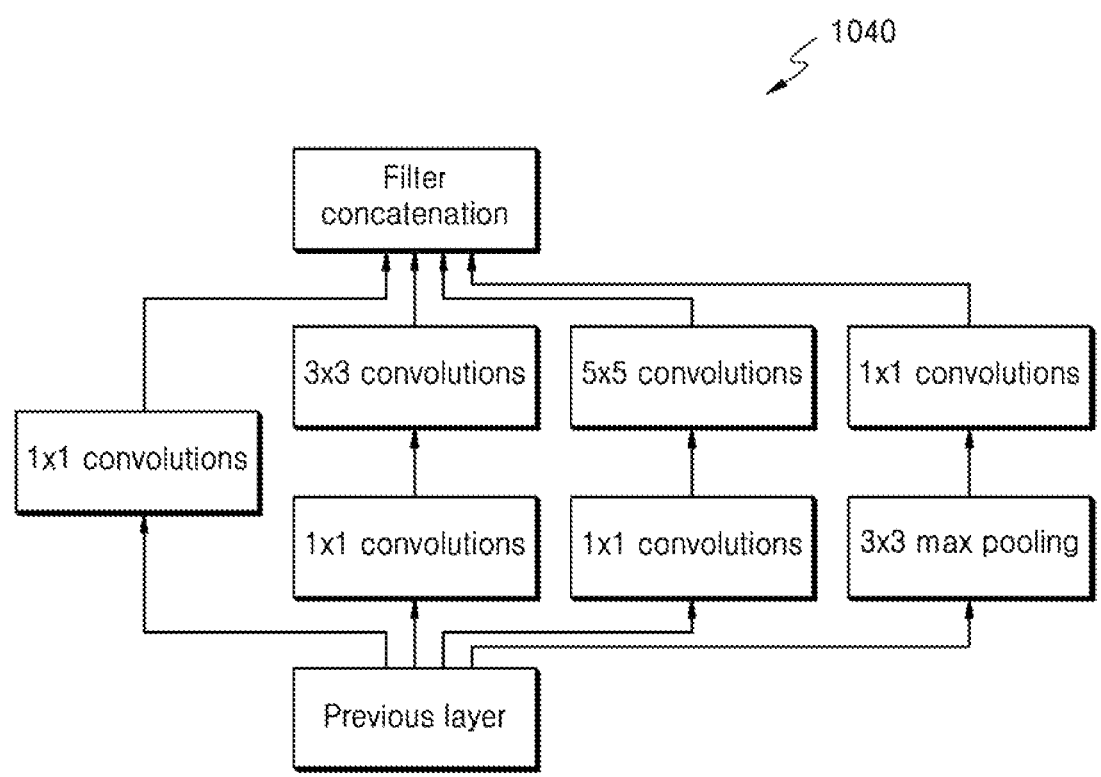

Referring to FIG. 10B, a structure of a CNN learning model according to another embodiment is illustrated.

A CNN learning model 1040 of FIG. 10B may be a network including a plurality of parallel layers. In other words, a plurality of convolution layers and a pooling layer may be arranged in parallel. A result output from a previous layer of the CNN learning model 1040 may be input to the separated plurality of parallel layers. The separated plurality of parallel layers may use different filters. For example, the separated plurality of parallel layers may use 3×3 convolutions, 5×5 convolutions, and the like after reducing a dimension to 1×1 convolutions. In other layers, convolutions may be applied after 3×3 max pooling is performed. A layer using only the 1×1 convolutions may function as an identity loop maintaining initial information. The plurality of parallel layers that performed convolutions may be finally concatenated and output a calculation result of a current layer. According to the CNN learning model 1040, layers of a CNN do not need to be sequentially stacked all the time. The structure of the CNN learning model 1040 is based on a fact that a network of a structure optimized non-sequentially may have a less error than a network of a sequential structure.

Figure 10C:
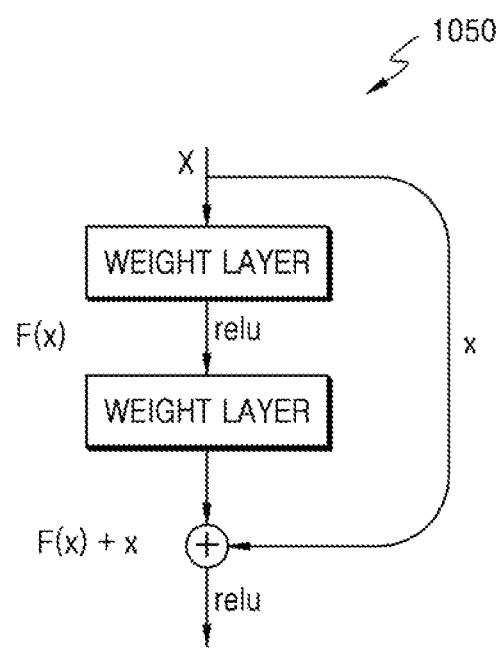

Referring to FIG. 10C, a structure of a CNN learning model according to another embodiment is illustrated.

A CNN learning model 1050 of FIG. 10C is a network model using a concept of skip layer. The CNN learning model 1050 has a structure in which an input of a past layer and an output of a current layer are added. A result of adding the output of the past layer and the output of the current layer in the CNN learning model 1050 may be an input of a next layer. In a general CNN structure, the size of a result value may be excessively decreased through convolution and pooling processes in a plurality of layers. In this case, detailed information of the result value may disappear. The CNN learning model 1050 reuses a past result during the convolution and pooling processes to reinforce the details.

Figure 10D:
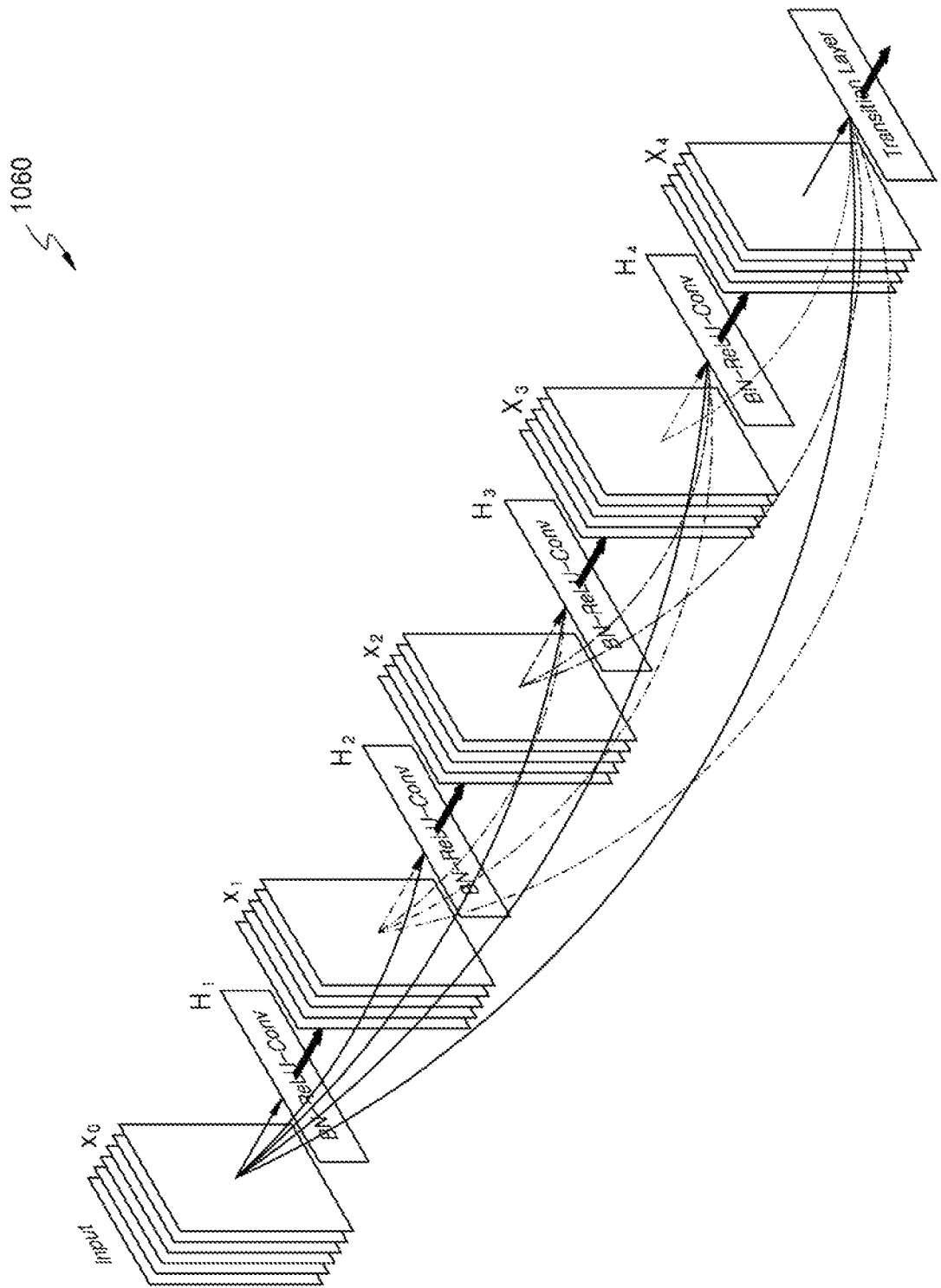

Referring to FIG. 10D, a structure of a CNN learning model according to another embodiment is illustrated.

A CNN learning model 1060 of FIG. 10D is a network model using a concept of skip layer like the CNN learning model 1050 of FIG. 10C. However, the CNN learning model 1060 has feature in which a relationship between layers is dense compared to the CNN learning model 1050, in that a past result may be added to an input of a layer at an arbitrary location. In addition, the CNN learning model 1060 may use a result calculated by a past layer through a convolution process as an input of a layer at an arbitrary location.

Figure 10E:
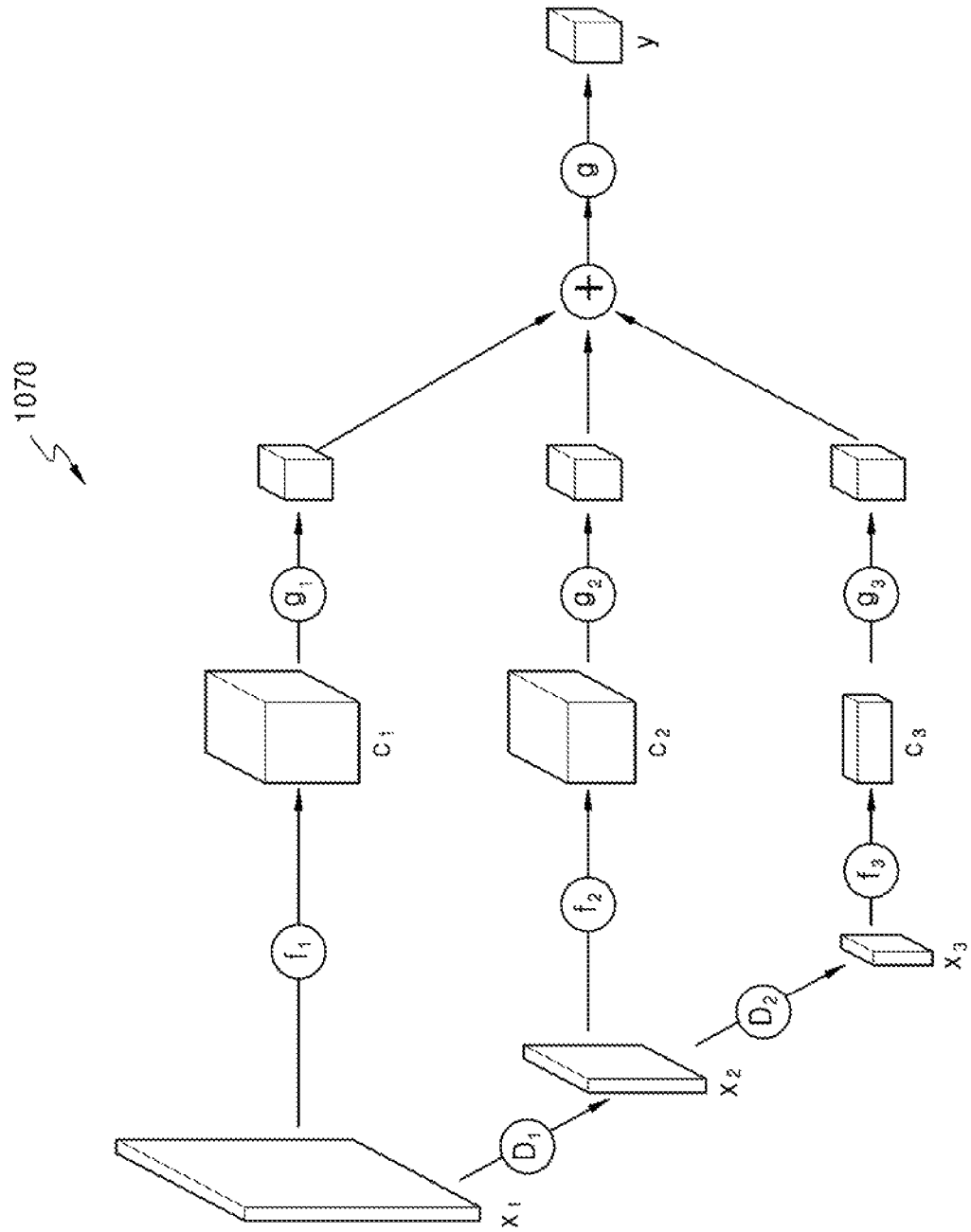

Referring to FIG. 10E, a structure of a CNN learning model according to another embodiment is illustrated.

A CNN learning model 1070 of FIG. 10E is a network model using a multi-resolution pyramid structure. The CNN learning model 1070 may divide a result of immediately previous convolution layer into several steps of pyramids. For example, in a first step, resolution may not be scaled, in a second step, resolution may be scaled to ½×½, and in a third step, resolution may be scaled to ¼×¼. Results of several steps obtained as such may be concatenated and used as an input of a fully connected layer. The convolution layer is not affected by the size of an image but the fully connected layer is restricted by the size of an input image, and thus the size of the input image needs to be fixed in a general network. However, the size of the image may be no longer restricted when features output from several steps of pyramid levels are used as an input of the fully connected layer and an output of the pyramid is pre-determined regardless of the size of an image as in the CNN learning model 1070.

Figure 10F:
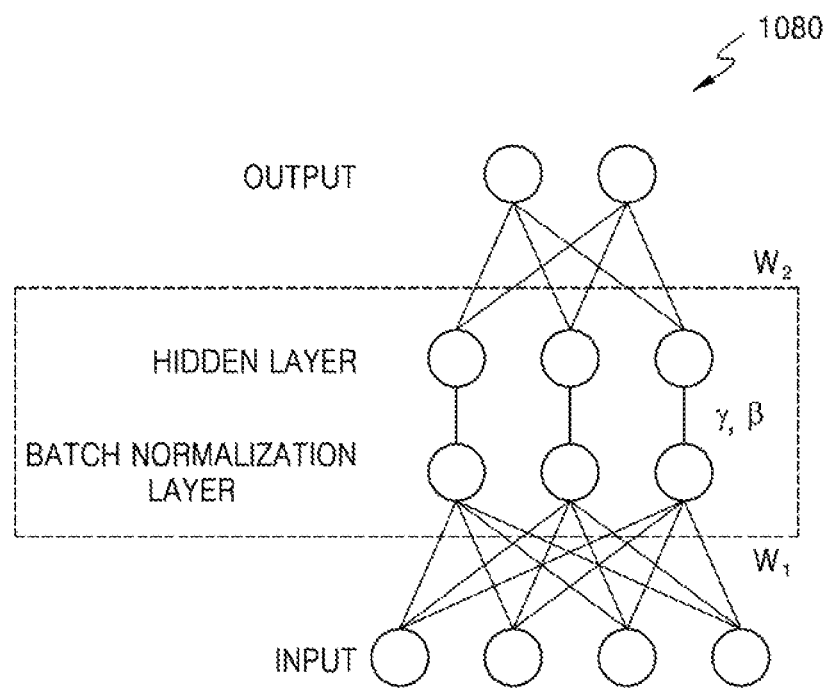

Referring to FIG. 10F, a structure of a CNN learning model according to another embodiment is illustrated.

A CNN learning model 1080 of FIG. 10F is a network model having a structure of performing batch normalization before or after a non-linear function (ReLu). A batch normalization layer adjusts distribution of inputs and is located in front of a hidden layer. Also, because the batch normalization layer is a layer absorbed in a network, the batch normalization layer may optimize a related variable (scale or shift) through back-propagation. A method of improving distribution of inputs may be a method of normalizing an average to 0 and distribution to 1 with respect to data input to each layer, multiplying a scale variable ($\gamma$), and adding a shift variable ($\beta$). Here, the scale and shift variables may be determined via learning. The CNN learning model 1080 may normalize a convolution result to prevent gradient vanishing or gradient exploding. Also, a learning time may be reduced via batch normalization and the accuracy of learning may be improved.

According to the embodiments, the CNN learning models of various structured described above with reference to FIGS. 10A through 10F may be applied, and in addition, possible combinations thereof or a combination with a known learning model may be applied. Accordingly, the CNN learning models of the various structures are only examples for convenience of description, and in the current embodiment, a CNN learning model having a structure modified in various manners may be used.

Figure 11:
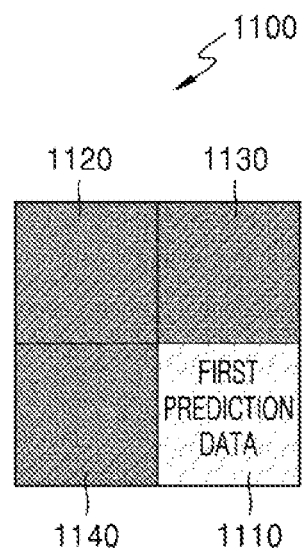
FIG. 11 is a diagram showing an example of CNN input data for generating second prediction data.

FIG. 11 is a diagram showing an example of CNN input data for generating second prediction data.

CNN input data 1100 according to an embodiment is second input data. The CNN input data 1100 corresponds to the input data 1010 of FIG. 10A.

Referring to FIG. 11, the CNN input data 1100 according to an embodiment may include first prediction data 1110 and neighboring reconstructed data 1120, 1130, and 1140. However, the above embodiment is only an example and the CNN input data 1100 may be modified in various forms.

The intra predictor 120 or 240 according to an embodiment may generate final prediction data regarding a current block by adding first prediction data output through a first prediction operation based on the RNN learning model of FIG. 7 and second prediction data output through a second prediction operation based on the CNN learning model of FIG. 11.

The image encoding apparatus 100 according to an embodiment may generate residual data by calculating a difference between original data of the current block and the final prediction data, generate a bitstream in which the generated residual data is encoded, and transmit the bitstream to the image decoding apparatus 200. The image encoding apparatus 100 according to an embodiment does not encode separate prediction information (for example, prediction mode information). This is because a DNN (i.e., an RNN and a CNN) model trained according to an embodiment has a generalization ability of analyzing an input pattern and generating a correct prediction image by finding features.

The image decoding apparatus 200 according to an embodiment may reconstruct data of the current block by adding the residual data obtained from the bitstream with the final prediction data. Here, the image decoding apparatus 200 may generate the final prediction data without having to obtain separate prediction information from the bitstream.

Figure 12:
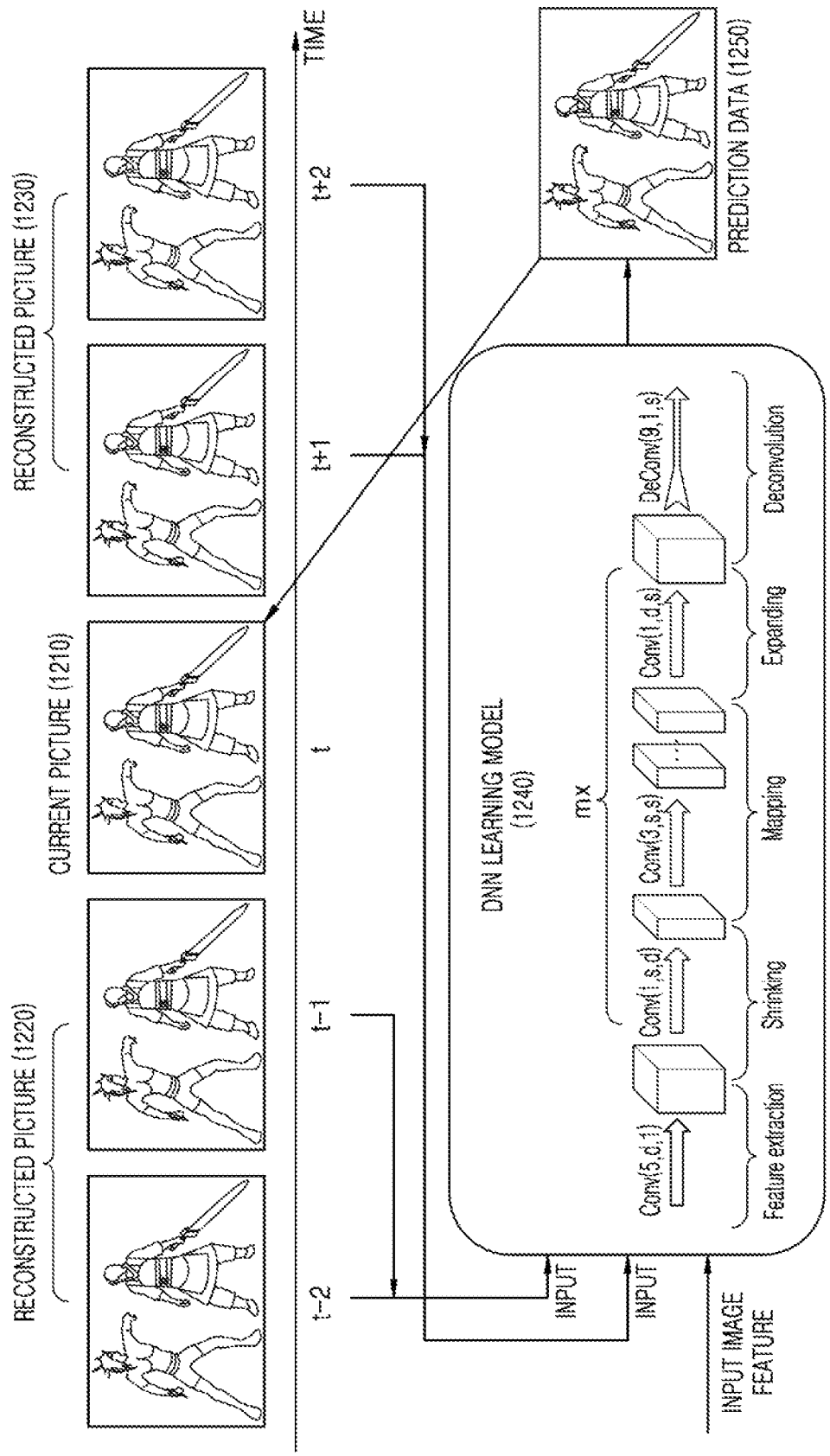
FIG. 12 is a diagram showing an inter prediction process based on a DNN learning model, according to an embodiment.

FIG. 12 is a diagram showing an inter prediction process based on a DNN learning model, according to an embodiment.

Inter prediction process is a process of finding an optimum prediction block among reference pictures through motion estimation and generating a prediction block through motion compensation. An image includes a series of still images and the still images are distinguished in units of picture groups. One picture group include an I picture, a P picture, and a B picture. Here, the P picture and the B picture are pictures encoded by performing motion estimation and motion compensation by using a reference picture.

Inter prediction based on a DNN learning mode according to an embodiment may be performed by the inter predictor 115 of the image encoding apparatus 100 or the inter predictor 235 of the image decoding apparatus 200. The inter prediction based on the DNN learning model according to an embodiment may be based on a RNN learning mode, a CNN learning model, or the like.

Referring to FIG. 12, processes of inputting reconstructed pictures 1220 and 1230 to a DNN learning model 1240 to predict a current picture 1210 are illustrated. Here, the current picture 1210 may be a P picture or a B picture. When the current picture 1210 is a picture corresponding to a time t, the reconstructed picture 1220 used for inter prediction may be a reconstructed picture corresponding to a past time (for example, t−1 or t−2) based on the time t, and the reconstructed picture 1230 may be a reconstructed picture corresponding to a future time (for example, t+1 or t+2) based on the time t. Also, the DNN learning model 1240 according to an embodiment may use information about features of an input image, such as a type of a current picture, to generate prediction data 1250.

The inter predictor 115 or 235 according to an embodiment may generate the prediction data 1250 by performing inter prediction based on the DNN learning model 1240 on a current block in the current picture 1210 to be predicted. Here, the DNN learning model 1240 may be a network trained such that the prediction data 1250 generated as an output becomes the same as original data of the current block in the current picture 1210. In other words, the prediction data 1250 having the smallest error with the original data of the current block may be generated by using the trained DNN learning model 1240. The DNN learning model has a generalization ability of analyzing an input pattern to find a feature and determining a correct reference picture and reference block location. Accordingly, the inter prediction based on the DNN learning model 1240 according to an embodiment does not require signaling of prediction information, such as a motion vector, a prediction direction, and a reference picture index.

The DNN learning model 1240 according to an embodiment may include a set of layers including a convolution pooling layer, a hidden layer, and a fully connected layer. For example, an overall structure of the DNN learning model 1240 may be configured such that the hidden layer is connected to the convolution pooling layer and the fully connected layer is connected to the hidden layer.

Because the structure of the DNN learning model 1240 according to an embodiment is the same as that described above with reference to FIG. 5, a detailed structure of the DNN learning model 1240 will be omitted.

The image encoding apparatus 100 according to an embodiment may generate residual data by calculating a difference between the original data of the current block in the current picture 1210 and the prediction data 1250, generate a bitstream in which the generated residual data is encoded, and transmit the bitstream to the image decoding apparatus 200. The image encoding apparatus 100 according to an embodiment does not encode separate prediction information (for example, a motion vector, a prediction direction, and a reference picture index).

The image decoding apparatus 200 according to an embodiment may reconstruct data of the current block in the current picture 1210 by adding the residual data obtained from the bitstream with the prediction data 1250. Here, the image decoding apparatus 200 may generate the prediction data 1250 without having to obtain separate prediction information from the bitstream.

Figure 13:
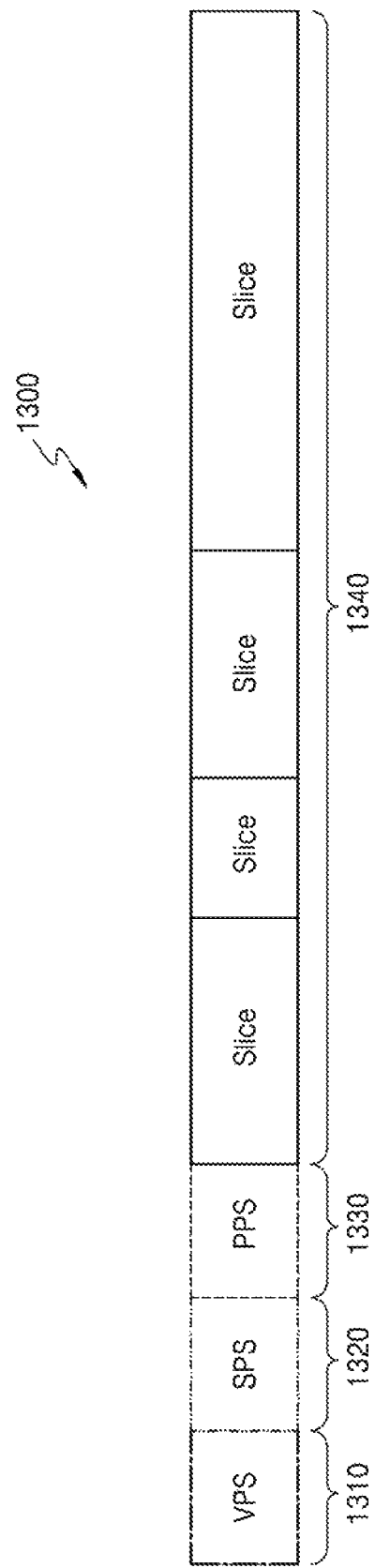
FIG. 13 is a diagram showing a structure of a bitstream, according to an embodiment.

FIG. 13 is a diagram showing a structure of a bitstream, according to an embodiment.

An encoded bitstream 1300 includes a plurality of network abstraction layers (NALs). The NAL unit may include not only encoded sample data such as an encoded slice 1340, but also high level syntax metadata such as parameter set data, slice header data (not shown), or supplemental enhancement information data (not shown).

A parameter set may have a high level syntax structure including an essential syntax element (for example, a video parameter set (VPS) 1310) that may be applied to a plurality of bitstream layers, an essential syntax element (for example, a sequence parameter set (SPS) 1320) that may be applied to an encoded video sequence in one layer, or an essential syntax element (for example, a picture parameter set (PPS) 1330) that may be applied to a plurality of pictures in one encoded video sequence. The parameter set may be transmitted together with an encoded picture of a bitstream or may be transmitted in another manner including a reliable channel, hard coding, or out-of-band transmission.

A slice header may have a high level syntax structure including picture-related information regarding slice or picture types.

An SEI message may not be essential for decoding processes, but may convey information usable for other various purposes, such as picture output timing, display, and loss detection and concealment.

According to an embodiment, the parameter set included in the bitstream 1300 may include additional information for performing prediction based on a DNN learning model. The additional information according to an embodiment may include information about a structure of the DNN learning model (for example, information about a filter set or the number of nodes) and information about a block to which the DNN learning model is applied (for example, a prediction block index). Also, the additional information may include information about an input angle and/or an input order to determine an order of inputting input data to an RNN learning model.

For example, the additional information may be signaled through the VPS 1310, the SPS 1320, or the PPS 1330 in the bitstream 1300.

Meanwhile, the additional information may be signaled through the bitstream 1300 or may be pre-shared between the image encoding apparatus 100 and the image decoding apparatus 200. Also, the additional information may be shared through a separate communicable server.

Figure 14:
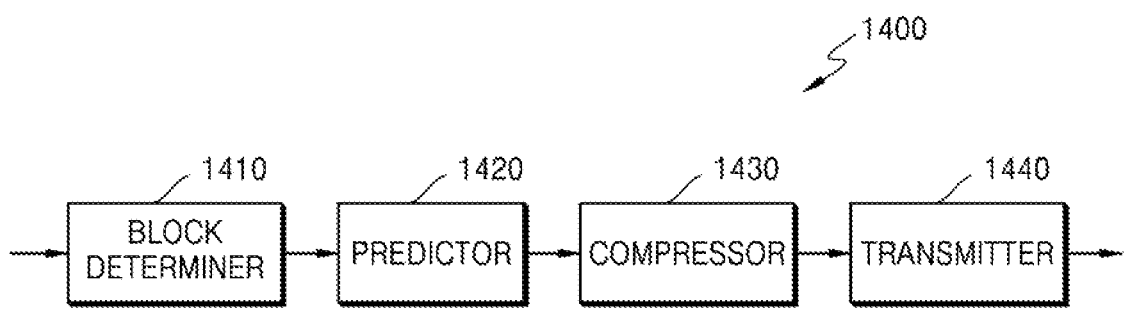
FIG. 14 is a schematic block diagram of an image encoding apparatus according to an embodiment.

FIG. 14 is a schematic block diagram of an image encoding apparatus 1400 according to an embodiment.

The image encoding apparatus 1400 according to an embodiment may correspond to the image encoding apparatus 100 of FIG. 1.

Referring to FIG. 14, the image encoding apparatus 1400 includes a block determiner 1410, a predictor 1420, a compressor 1430, and a transmitter 1440. The block determiner 1410 of FIG. 14 may correspond to the block determiner 110 of FIG. 1. The predictor 1420 of FIG. 14 may correspond to the intra predictor 120 or the inter predictor 115 of FIG. 1. The compressor 1430 of FIG. 14 may correspond to the transformer 130, the quantizer 135, and the entropy encoder 155 of FIG. 1.

The block determiner 1410 according to an embodiment may split image data of a current picture into largest coding units, according to a largest size of coding unit. Each largest coding unit may include a block (i.e., a coding unit) split according to a block shape and a split shape. In the largest coding unit according to an embodiment, image data in a spatial domain included in the largest coding unit may be classified hierarchically according to the block shape and the split shape. The block shape of the coding unit may be a square or a rectangle or may be an arbitrary geometric shape, and thus is not limited to a data unit of a uniform size. The block shape and split shape of at least one block may be determined based on R-D cost calculation.

According to an embodiment, the predictor 1420 performs prediction based on a DNN learning model on a current block among blocks determined by the block determiner 1410.

In case of intra prediction, the predictor 1420 may generate first prediction data by performing first prediction based on the DNN learning model on the current block, generate second prediction data by performing second prediction based on the DNN learning model on the first prediction data, and generate final prediction data regarding the current block by using the first prediction data and the second prediction data. Here, the first prediction may be based on an RNN learning model and the second prediction may be based on a CNN learning model. Because specific processes of the intra prediction according to an embodiment have been described above with reference to FIGS. 6 through 12, detailed descriptions thereof will be omitted.

In case of inter prediction, the predictor 1420 may determine at least one reference picture and at least one reference block location by performing inter prediction based on the DNN learning model on the current block among at least one block, and generate prediction data regarding the current block by using the at least one reference picture and the at least one reference block location. Because specific processes of the inter prediction according to an embodiment have been described above with reference to FIG. 13, detailed descriptions thereof will be omitted.

The compressor 1430 according to an embodiment generates residual data by calculating a difference between original data of each block and prediction data of each block output from the predictor 1420. The compressor 1430 generates a quantized transform coefficient for each block by transforming and quantizing the residual data. The compressor 1430 outputs a bitstream in which the quantized transform coefficient is entropy-encoded. The encoded bitstream may include an encoding result of the residual data. Also, the bitstream may include an encoding result of information indicating the block shape, the split shape, and the size of a transform unit.

The transmitter 1440 according to an embodiment transmits the bitstream output from the compressor 1430 to the image decoding apparatus 200.

Figure 15:
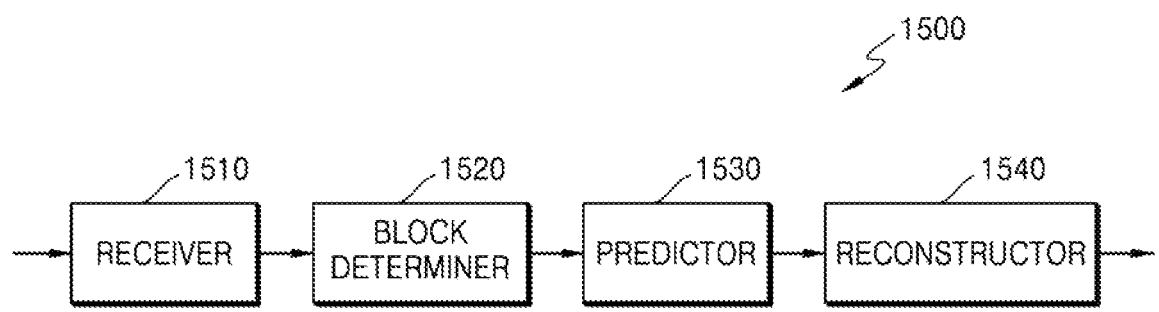
FIG. 15 is a schematic block diagram of an image decoding apparatus according to an embodiment.

FIG. 15 is a schematic block diagram of an image decoding apparatus 1500 according to an embodiment.

An image decoding apparatus 1500 according to an embodiment may correspond to the image decoding apparatus 200 of FIG. 2.

Referring to FIG. 15, the image decoding apparatus 1500 includes a receiver 1510, a block determiner 1520, a predictor 1530, and a reconstructor 1540. The receiver 1510 of FIG. 15 may correspond to the receiver 210 of FIG. 2. The block determiner 1520 of FIG. 15 may correspond to the block determiner 215 of FIG. 2. The predictor 1530 of FIG. 15 may correspond to the intra predictor 240 or the inter predictor 235 of FIG. 2. The reconstructor 1540 of FIG. 15 may correspond to the entropy decoder 220, the inverse quantizer 225, and the inverse transformer 230 of FIG. 2.

The receiver 1510 according to an embodiment receives an encoded bitstream.

The block determiner 1520 according to an embodiment may hierarchically split image data of a spatial domain according to a block shape and a split shape by obtaining split information from the bitstream. Meanwhile, when blocks used for decoding have uniform shapes and sizes, the block determiner 1520 may split the image data without using the split information.

According to an embodiment, the predictor 1530 performs prediction based on a DNN learning model on a current block among blocks determined by the block determiner 1520. Meanwhile, information about a structure of the DNN learning model may be obtained from the bitstream in a form of additional information.

In case of intra prediction, the predictor 1530 may generate first prediction data by performing first prediction based on the DNN learning model on the current block, generate second prediction data by performing second prediction based on the DNN learning model on the first prediction data, and generate final prediction data regarding the current block by using the first prediction data and the second prediction data. Here, the first prediction may be based on an RNN learning model and the second prediction may be based on a CNN learning model. Because specific processes of the intra prediction according to an embodiment have been described above with reference to FIGS. 6 through 11, detailed descriptions thereof will be omitted.

In case of inter prediction, the predictor 1530 may determine at least one reference picture and at least one reference block location by performing inter prediction based on the DNN learning model on the current block among at least one block, and generate prediction data regarding the current block by using the at least one reference picture and the at least one reference block location. Because specific processes of the inter prediction according to an embodiment have been described above with reference to FIG. 12, detailed descriptions thereof will be omitted.

The reconstructor 1540 according to an embodiment obtains residual data of each block by inverse-quantizing and inverse-transforming a quantized transform coefficient obtained by entropy-decoding the bitstream. Then, the reconstructor 1540 reconstructs an image by using the residual data of each block and prediction data of each block generated by the predictor 1530.

Figure 16:
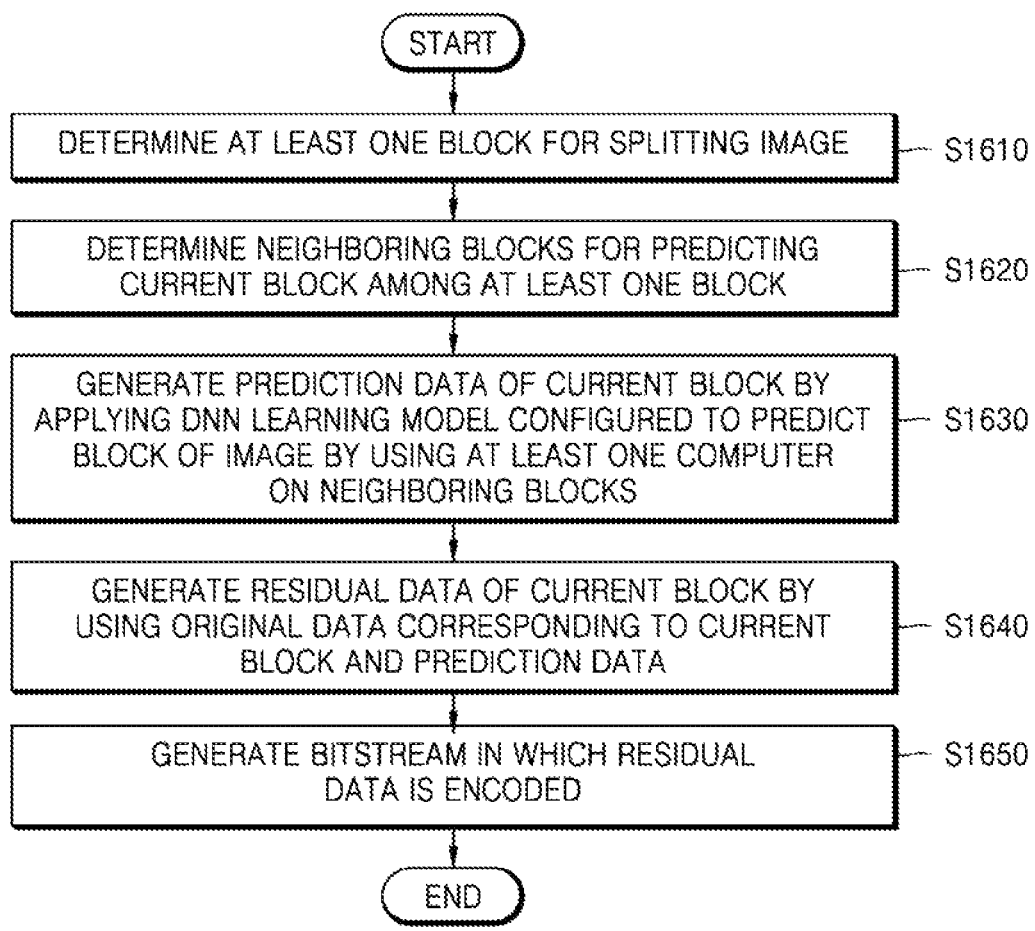
FIG. 16 is a flowchart of an image encoding method according to an embodiment.

FIG. 16 is a flowchart of an image encoding method according to an embodiment.

In operation S1610, the image encoding apparatus 100 determined at least one block for splitting an image.

In operation S1620, the image encoding apparatus 100 determines neighboring blocks for predicting a current block among the at least one block.

In operation S1630, the image encoding apparatus 100 generates prediction data of the current block by applying, to the neighboring blocks, a DNN learning model configured to predict a block of an image by using at least one computer.

In operation S1640, the image encoding apparatus 100 generates residual data of the current block by using original data corresponding to the current block and the prediction data.

In operation S1650, the image encoding apparatus 100 generates a bitstream in which the residual data is encoded.

Figure 17:
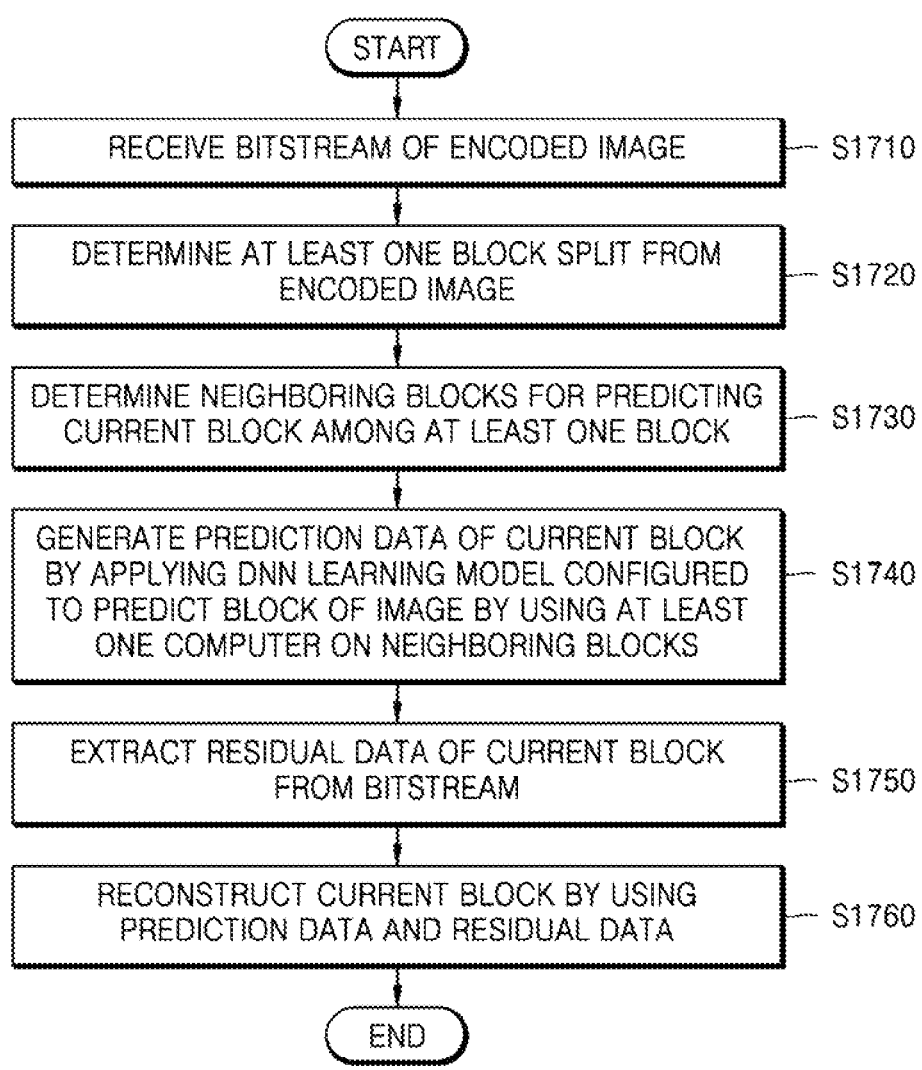
FIG. 17 is a flowchart of an image decoding method according to an embodiment.

FIG. 17 is a flowchart of an image decoding method according to an embodiment.

In operation S1710, the image decoding apparatus 200 receives a bitstream of an encoded image.

In operation S1720, the image decoding apparatus 200 determines at least one block split from the encoded image.

In operation S1730, the image decoding apparatus 200 determines neighboring blocks for predicting a current block among the at least one block.

In operation S1740, the image decoding apparatus 200 generates prediction data of the current block by applying, to the neighboring blocks, a DNN learning model configured to predict a block of an image by using at least one computer.

In operation S1750, the image decoding apparatus 200 extracts residual data of the current block from the bitstream.

In operation S1760, the image decoding apparatus 200 reconstructs the current block by using the prediction data and the residual data.

Hereinafter, a method of determining a data unit of an image, according to an embodiment, is described with reference to FIGS. 18 through 31. A split method regarding a coding unit described with reference to FIGS. 18 through 31 may be equally applied to a split method of a transform unit that is a basis of transform.

Figure 18:
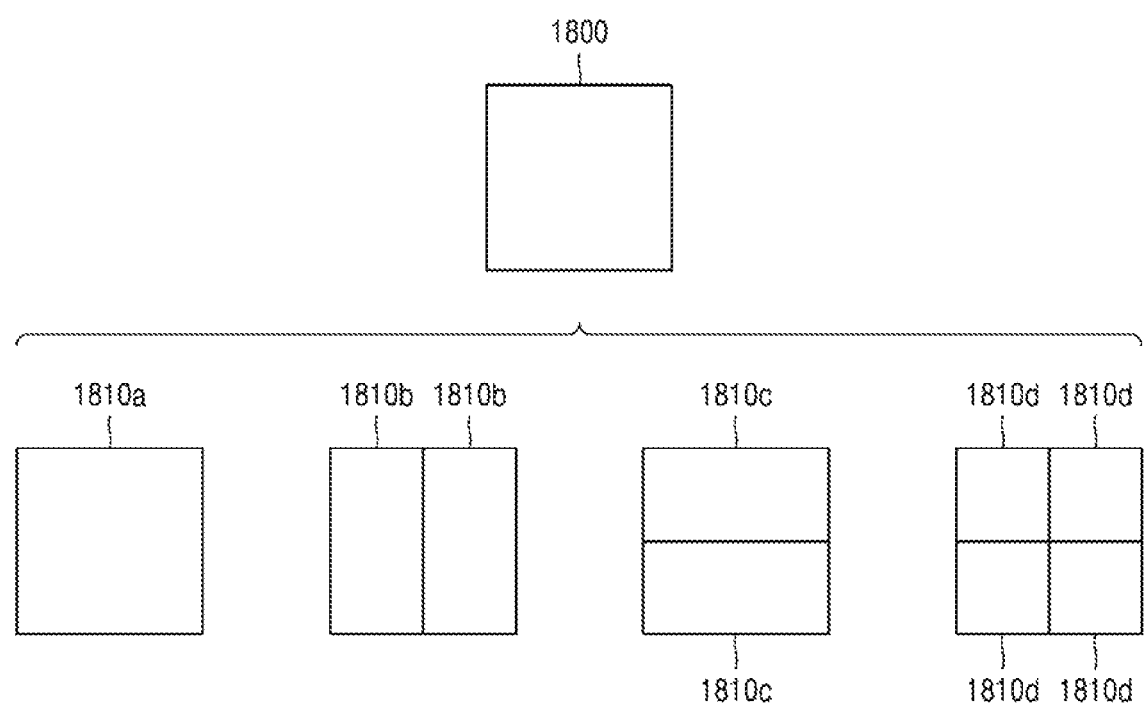
FIG. 18 illustrates a process of determining at least one coding unit by splitting a current coding unit, according to an embodiment.

FIG. 18 illustrates a process, performed by the image decoding apparatus 200, of determining at least one coding unit by splitting a current coding unit, according to an embodiment.

According to an embodiment, the image decoding apparatus 200 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 200.

According to an embodiment, the image decoding apparatus 200 may use the block shape information indicating that the current coding unit has a square shape. For example, the image decoding apparatus 200 may determine whether not to split a square coding unit, whether to vertically split the square coding unit, whether to horizontally split the square coding unit, or whether to split the square coding unit into four coding units, based on the split shape information. Referring to FIG. 18, when the block shape information of a current coding unit 1800 indicates a square shape, the image decoding apparatus 200 may determine that a coding unit 1810a having the same size as the current coding unit 1800 is not split, based on the split shape information indicating not to perform splitting, or may determine coding units 1810b, 1810c, or 1810d split based on the split shape information indicating a predetermined splitting method.

Referring to FIG. 18, according to an embodiment, the image decoding apparatus 200 may determine two coding units 1810b obtained by splitting the current coding unit 1800 in a vertical direction, based on the split shape information indicating to perform splitting in a vertical direction. The image decoding apparatus 200 may determine two coding units 1810c obtained by splitting the current coding unit 1800 in a horizontal direction, based on the split shape information indicating to perform splitting in a horizontal direction. The image decoding apparatus 200 may determine four coding units 1810d obtained by splitting the current coding unit 1800 in vertical and horizontal directions, based on the split shape information indicating to perform splitting in vertical and horizontal directions. However, splitting methods of the square coding unit are not limited to the above-described methods, and the split shape information may indicate various methods. Predetermined splitting methods of splitting the square coding unit will be described in detail below in relation to various embodiments.

Figure 19:
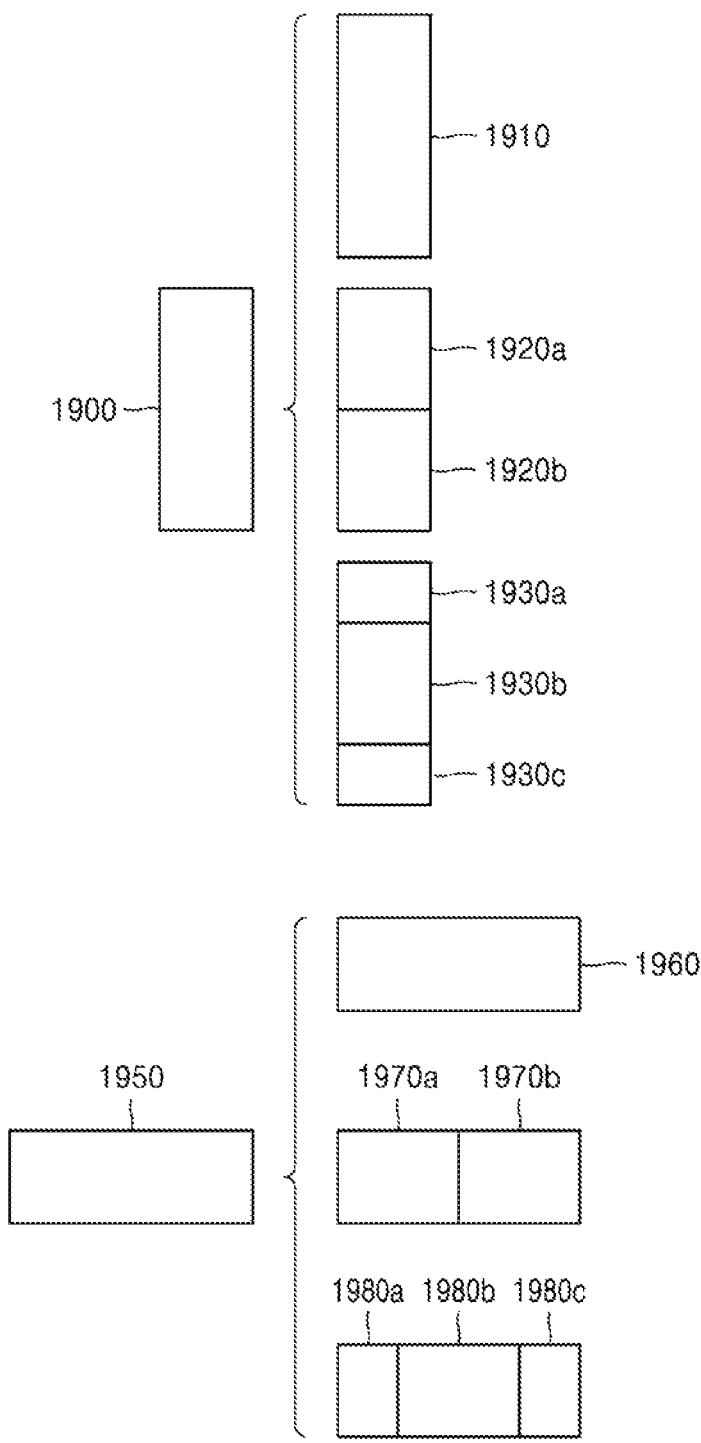
FIG. 19 illustrates a process of determining at least one coding unit by splitting a non-square coding unit, according to an embodiment.

FIG. 19 illustrates a process, performed by the image decoding apparatus 200, of determining at least one coding unit by splitting a non-square coding unit, according to an embodiment.

According to an embodiment, the image decoding apparatus 200 may use block shape information indicating that a current coding unit has a non-square shape. The image decoding apparatus 200 may determine whether not to split the non-square current coding unit or whether to split the non-square current coding unit by using a predetermined splitting method, based on split shape information. Referring to FIG. 19, when the block shape information of a current coding unit 1900 or 1950 indicates a non-square shape, the image decoding apparatus 200 may determine that a coding unit 1910 or 1960 having the same size as the current coding unit 1900 or 1950 is not split, based on the split shape information indicating not to perform splitting, or determine coding units 1920a and 1920b, 1930a to 1930c, 1970a and 1970b, or 1980a to 1980c split based on the split shape information indicating a predetermined splitting method. Predetermined splitting methods of splitting a non-square coding unit will be described in detail below in relation to various embodiments.

According to an embodiment, the image decoding apparatus 200 may determine a splitting method of a coding unit by using the split shape information and, in this case, the split shape information may indicate the number of one or more coding units generated by splitting a coding unit. Referring to FIG. 19, when the split shape information indicates to split the current coding unit 1900 or 1950 into two coding units, the image decoding apparatus 200 may determine two coding units 1920a and 1920b, or 1970a and 1970b included in the current coding unit 1900 or 1950, by splitting the current coding unit 1900 or 1950 based on the split shape information.

According to an embodiment, when the image decoding apparatus 200 splits the non-square current coding unit 1900 or 1950 based on the split shape information, the location of a long side of the non-square current coding unit 1900 or 1950 may be considered. For example, the image decoding apparatus 200 may determine a plurality of coding units by dividing a long side of the current coding unit 1900 or 1950, in consideration of the shape of the current coding unit 1900 or 1950.

According to an embodiment, when the split shape information indicates to split a coding unit into an odd number of blocks, the image decoding apparatus 200 may determine an odd number of coding units included in the current coding unit 1900 or 1950. For example, when the split shape information indicates to split the current coding unit 1900 or 1950 into three coding units, the image decoding apparatus 200 may split the current coding unit 1900 or 1950 into three coding units 1930a, 1930b, and 1930c, or 1980a, 1980b, and 1980c. According to an embodiment, the image decoding apparatus 200 may determine the odd number of coding units included in the current coding unit 1900 or 1950, and not all the determined coding units may have the same size. For example, a predetermined coding unit 1930b or 1980b from among the determined odd number of coding units 1930a, 1930b, and 1930c, or 1980a, 1980b, and 1980c may have a size different from the size of the other coding units 1930a and 1930c, or 1980a and 1980c. That is, coding units which may be determined by splitting the current coding unit 1900 or 1950 may have multiple sizes and, in some cases, all of the odd number of coding units 1930a, 1930b, and 1930c, or 1980a, 1980b, and 1980c may have different sizes.

According to an embodiment, when the split shape information indicates to split a coding unit into an odd number of blocks, the image decoding apparatus 200 may determine an odd number of coding units included in the current coding unit 1900 or 1950, and may put a predetermined restriction on at least one coding unit from among the odd number of coding units generated by splitting the current coding unit 1900 or 1950. Referring to FIG. 19, the image decoding apparatus 200 may allow a decoding method of the coding unit 1930b or 1980b to be different from that of the other coding units 1930a and 1930c, or 1980a and 1980c, wherein the coding unit 1930b or 1980b is at a center location from among the three coding units 1930a, 1930b, and 1930c, or 1980a, 1980b, and 1980c generated by splitting the current coding unit 1900 or 1950. For example, the image decoding apparatus 200 may restrict the coding unit 1930b or 1980b at the center location to be no longer split or to be split only a predetermined number of times, unlike the other coding units 1930a and 1930c, or 1980a and 1980c.

FIG. 20 illustrates a process, performed by the image decoding apparatus 200, of splitting a coding unit based on at least one of block shape information and split shape information, according to an embodiment.

According to an embodiment, the image decoding apparatus 200 may determine to split or not to split a square first coding unit 2000 into coding units, based on at least one of the block shape information and the split shape information. According to an embodiment, when the split shape information indicates to split the first coding unit 2000 in a horizontal direction, the image decoding apparatus 200 may determine a second coding unit 2010 by splitting the first coding unit 2000 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 200 may determine to split or not to split the determined second coding unit 2010 into coding units, based on at least one of the block shape information and the split shape information. Referring to FIG. 20, the image decoding apparatus 200 may or may not split the non-square second coding unit 2010, which is determined by splitting the first coding unit 2000, into one or more third coding units 2020a, or 2020b, 2020c, and 2020d based on at least one of the block shape information and the split shape information. The image decoding apparatus 200 may obtain at least one of the block shape information and the split shape information, and determine a plurality of various-shaped second coding units (e.g., 2010) by splitting the first coding unit 2000, based on the obtained at least one of the block shape information and the split shape information, and the second coding unit 2010 may be split by using the splitting method of the first coding unit 2000, based on at least one of the block shape information and the split shape information. According to an embodiment, when the first coding unit 2000 is split into the second coding units 2010 based on at least one of the block shape information and the split shape information of the first coding unit 2000, the second coding unit 2010 may also be split into the third coding units 2020a, or 2020b, 2020c, and 2020d based on at least one of the block shape information and the split shape information of the second coding unit 2010. That is, a coding unit may be recursively split based on at least one of the block shape information and the split shape information of each coding unit. Therefore, a square coding unit may be determined by splitting a non-square coding unit, and a non-square coding unit may be determined by recursively splitting the square coding unit. Referring to FIG. 20, a predetermined coding unit from among an odd number of third coding units 2020b, 2020c, and 2020d determined by splitting the non-square second coding unit 2010 (e.g., a coding unit at a center location or a square coding unit) may be recursively split. According to an embodiment, the square third coding unit 2020c from among the odd number of third coding units 2020b, 2020c, and 2020d may be split in a horizontal direction into a plurality of fourth coding units.

A method that may be used to recursively split a coding unit will be described below in relation to various embodiments.

According to an embodiment, the image decoding apparatus 200 may determine to split each of the third coding units 2020a, or 2020b, 2020c, and 2020d into coding units or not to split the second coding unit 2010, based on at least one of the block shape information and the split shape information. According to an embodiment, the image decoding apparatus 200 may split the non-square second coding unit 2010 into the odd number of third coding units 2020b, 2020c, and 2020d.

The image decoding apparatus 200 may put a predetermined restriction on a predetermined third coding unit from among the odd number of third coding units 2020b, 2020c, and 2020d. For example, the image decoding apparatus 200 may restrict the third coding unit 2020c at a center location from among the odd number of third coding units 2020b, 2020c, and 2020d to be no longer split or to be split a settable number of times. Referring to FIG. 5, the image decoding apparatus 200 may restrict the third coding unit 2020c, which is at the center location from among the odd number of third coding units 2020b, 2020c, and 2020d included in the non-square second coding unit 2010, to be no longer split, to be split by using a predetermined splitting method (e.g., split into only four coding units or split by using a splitting method of the second coding unit 2010), or to be split only a predetermined number of times (e.g., split only n times (where n>0)). However, the restrictions on the third coding unit 2020c at the center location are not limited to the above-described examples, and may include various restrictions for decoding the third coding unit 2020c at the center location differently from the other third coding units 2020b and 2020d.

According to an embodiment, the image decoding apparatus 200 may obtain at least one of the block shape information and the split shape information, which is used to split a current coding unit, from a predetermined location in the current coding unit.

Figure 21:
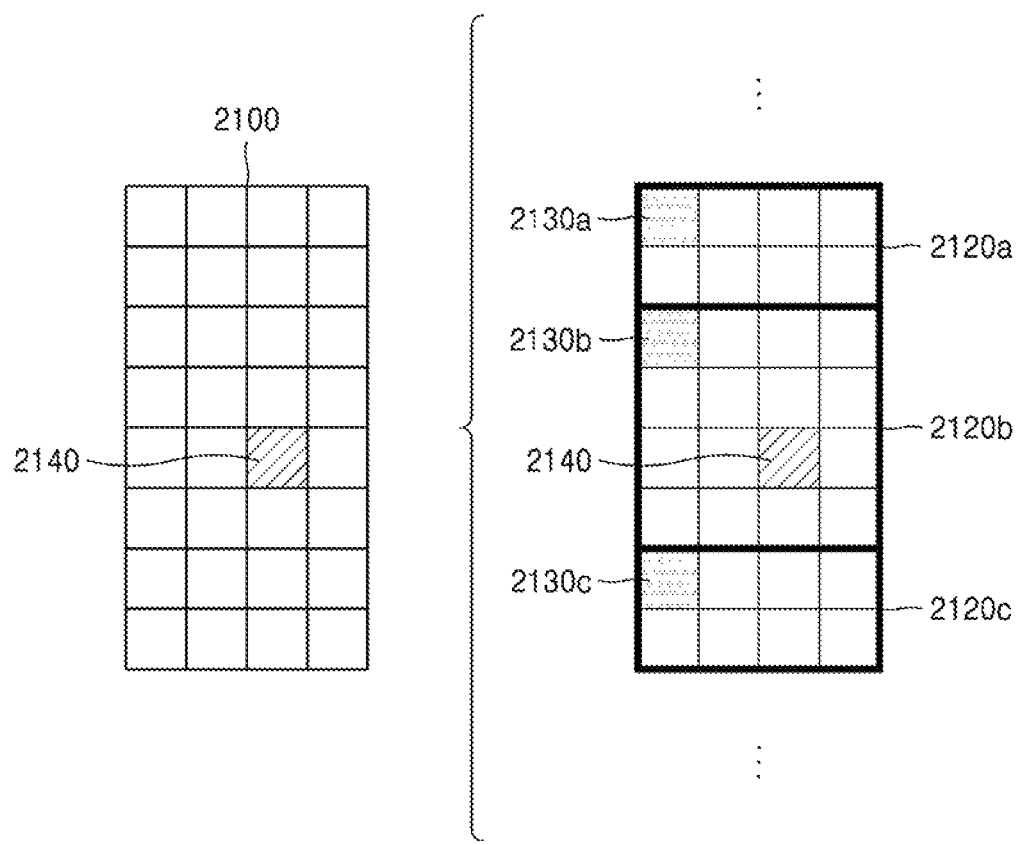
FIG. 21 illustrates a method of determining a predetermined coding unit from among an odd number of coding units, according to an embodiment.

FIG. 21 illustrates a method, performed by the image decoding apparatus 200, of determining a predetermined coding unit from among an odd number of coding units, according to an embodiment. Referring to FIG. 21, at least one of block shape information and split shape information of a current coding unit 2100 may be obtained from a sample of a predetermined location from among a plurality of samples included in the current coding unit 2100 (e.g., a sample 2140 of a center location). However, the predetermined location in the current coding unit 2100, from which at least one of the block shape information and the split shape information may be obtained, is not limited to the center location in FIG. 21, and may include various locations included in the current coding unit 2100 (e.g., top, bottom, left, right, top left, bottom left, top right, and bottom right locations). The image decoding apparatus 200 may obtain at least one of the block shape information and the split shape information from the predetermined location and determine to split or not to split the current coding unit into various-shaped and various-sized coding units.

According to an embodiment, when the current coding unit is split into a predetermined number of coding units, the image decoding apparatus 200 may select one of the coding units. Various methods may be used to select one of a plurality of coding units, as will be described below in relation to various embodiments.

According to an embodiment, the image decoding apparatus 200 may split the current coding unit into a plurality of coding units, and may determine a coding unit at a predetermined location.

FIG. 21 illustrates a method, performed by the image decoding apparatus 200, of determining a coding unit of a predetermined location from among an odd number of coding units, according to an embodiment.

According to an embodiment, image decoding apparatus 200 may use information indicating locations of the odd number of coding units, to determine a coding unit at a center location from among the odd number of coding units. Referring to FIG. 21, the image decoding apparatus 200 may determine an odd number of coding units 2120a, 2120b, and 2120c by splitting the current coding unit 2100. The image decoding apparatus 200 may determine a coding unit 2120b at a center location by using information about locations of the odd number of coding units 2120a, 2120b, and 2120c. For example, the image decoding apparatus 200 may determine the coding unit 2120b of the center location by determining the locations of the coding units 2120a, 2120b, and 2120c based on information indicating locations of predetermined samples included in the coding units 2120a, 2120b, and 2120c. In detail, the image decoding apparatus 200 may determine the coding unit 2120b at the center location by determining the locations of the coding units 2120a, 2120b, and 2120c based on information indicating locations of top left samples 2130a, 2130b, and 2130c of the coding units 2120a, 2120b, and 2120c.

According to an embodiment, the information indicating the locations of the top left samples 2130a, 2130b, and 2130c, which are included in the coding units 2120a, 2120b, and 2120c, respectively, may include information about locations or coordinates of the coding units 2120a, 2120b, and 2120c in a picture. According to an embodiment, the information indicating the locations of the top left samples 2130a, 2130b, and 2130c, which are included in the coding units 2120a, 2120b, and 2120c, respectively, may include information indicating widths or heights of the coding units 2120a, 2120b, and 2120c included in the current coding unit 2100, and the widths or heights may correspond to information indicating differences between the coordinates of the coding units 2120a, 2120b, and 2120c in the picture. That is, the image decoding apparatus 200 may determine the coding unit 2120b at the center location by directly using the information about the locations or coordinates of the coding units 2120a, 2120b, and 2120c in the picture, or by using the information about the widths or heights of the coding units, which correspond to the difference values between the coordinates.

According to an embodiment, information indicating the location of the top left sample 2130a of the upper coding unit 2120a may include coordinates (xa, ya), information indicating the location of the top left sample 2130b of the middle coding unit 2120b may include coordinates (xb, yb), and information indicating the location of the top left sample 2130c of the lower coding unit 2120c may include coordinates (xc, yc). The image decoding apparatus 200 may determine the middle coding unit 2120b by using the coordinates of the top left samples 2130a, 2130b, and 2130c which are included in the coding units 2120a, 2120b, and 2120c, respectively. For example, when the coordinates of the top left samples 2130a, 2130b, and 2130c are sorted in an ascending or descending order, the coding unit 2120b including the coordinates (xb, yb) of the sample 2130b at a center location may be determined as a coding unit at a center location from among the coding units 2120a, 2120b, and 2120c determined by splitting the current coding unit 2100. However, the coordinates indicating the locations of the top left samples 2130a, 2130b, and 2130c may include coordinates indicating absolute locations in the picture, or may use coordinates (dxb, dyb) indicating a relative location of the top left sample 2130b of the middle coding unit 2120b and coordinates (dxc, dyc) indicating a relative location of the top left sample 2130c of the lower coding unit 2120c with reference to the location of the top left sample 2130a of the upper coding unit 2120a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 200 may split the current coding unit 2100 into a plurality of coding units 2120a, 2120b, and 2120c, and may select one of the coding units 2120a, 2120b, and 2120c based on a predetermined criterion. For example, the image decoding apparatus 200 may select the coding unit 2120b, which has a size different from that of the others, from among the coding units 2120a, 2120b, and 2120c.

According to an embodiment, the image decoding apparatus 200 may determine the width or height of each of the coding units 2120a, 2120b, and 2120c by using the coordinates (xa, ya) that is the information indicating the location of the top left sample 2130a of the upper coding unit 2120a, the coordinates (xb, yb) that is the information indicating the location of the top left sample 2130b of the middle coding unit 2120b, and the coordinates (xc, yc) that is the information indicating the location of the top left sample 2130c of the lower coding unit 2120c. The image decoding apparatus 200 may determine the respective sizes of the coding units 2120a, 2120b, and 2120c by using the coordinates (xa, ya), (xb, yb), and (xc, yc) indicating the locations of the coding units 2120a, 2120b, and 2120c.

According to an embodiment, the image decoding apparatus 200 may determine the width of the upper coding unit 2120a to be xb-xa and determine the height thereof to be yb-ya. According to an embodiment, the image decoding apparatus 200 may determine the width of the middle coding unit 2120b to be xc-xb and determine the height thereof to be yc-yb. According to an embodiment, the image decoding apparatus 200 may determine the width or height of the lower coding unit 2120c by using the width or height of the current coding unit 2100 or the widths or heights of the upper and middle coding units 2120a and 2120b. The image decoding apparatus 200 may determine a coding unit, which has a size different from that of the others, based on the determined widths and heights of the coding units 2120a, 2120b, and 2120c. Referring to FIG. 21, the image decoding apparatus 200 may determine the middle coding unit 2120b, which has a size different from the size of the upper and lower coding units 2120a and 2120c, as the coding unit of the predetermined location. However, the above-described method, performed by the image decoding apparatus 200, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 200 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 200 may determine the coding unit at the predetermined location in a horizontal direction. That is, the image decoding apparatus 200 may determine one of coding units at different locations in a horizontal direction and put a restriction on the coding unit. When the current coding unit has a non-square shape, a height of which is longer than a width, the image decoding apparatus 200 may determine the coding unit at the predetermined location in a vertical direction. That is, the image decoding apparatus 200 may determine one of coding units at different locations in a vertical direction and may put a restriction on the coding unit.

According to an embodiment, the image decoding apparatus 200 may use information indicating respective locations of an even number of coding units, to determine the coding unit at the predetermined location from among the even number of coding units. The image decoding apparatus 200 may determine an even number of coding units by splitting the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 21, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 200 may use at least one of block shape information and split shape information, which is stored in a sample included in a coding unit at a center location, in a splitting operation to determine the coding unit at the center location from among the plurality of coding units determined by splitting the current coding unit.

Referring to FIG. 13, the image decoding apparatus 200 may split the current coding unit 2100 into a plurality of coding units 2120a, 2120b, and 2120c based on at least one of the block shape information and the split shape information, and may determine a coding unit 2120b at a center location from among the plurality of the coding units 2120a, 2120b, and 2120c. Furthermore, the image decoding apparatus 200 may determine the coding unit 2120b at the center location, in consideration of a location from which at least one of the block shape information and the split shape information is obtained. That is, at least one of the block shape information and the split shape information of the current coding unit 2100 may be obtained from the sample 2140 at a center location of the current coding unit 2100 and, when the current coding unit 2100 is split into the plurality of coding units 2120a, 2120b, and 2120c based on at least one of the block shape information and the split shape information, the coding unit 2120b including the sample 2140 may be determined as the coding unit at the center location. However, information used to determine the coding unit at the center location is not limited to at least one of the block shape information and the split shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the image decoding apparatus 200 may use at least one of the block shape information and the split shape information, which is obtained from a sample at a predetermined location in the current coding unit 2100 (e.g., a sample at a center location of the current coding unit 2100) to determine a coding unit at a predetermined location from among the plurality of the coding units 2120a, 2120b, and 2120c determined by splitting the current coding unit 2100 (e.g., a coding unit at a center location from among a plurality of split coding units). That is, the image decoding apparatus 200 may determine the sample at the predetermined location by considering a block shape of the current coding unit

2100, determine the coding unit 2120*b* including a sample, from which predetermined information (e.g., at least one of the block shape information and the split shape information) may be obtained, from among the plurality of coding units 2120*a*, 2120*b*, and 2120*c* determined by splitting the current coding unit 2100, and may put a predetermined restriction on the coding unit 2120*b*. Referring to FIG. 21, according to an embodiment, the image decoding apparatus 200 may determine the sample 2140 at the center location of the current coding unit 2100 as the sample from which the predetermined information may be obtained, and may put a predetermined restriction on the coding unit 2120*b* including the sample 2140, in a decoding operation. However, the location of the sample from which the predetermined information may be obtained is not limited to the above-described location, and may include arbitrary locations of samples included in the coding unit 2120*b* to be determined fora restriction.

According to an embodiment, the location of the sample from which the predetermined information may be obtained may be determined based on the shape of the current coding unit 2100. According to an embodiment, the block shape information may indicate whether the current coding unit has a square or non-square shape, and the location of the sample from which the predetermined information may be obtained may be determined based on the shape. For example, the image decoding apparatus 200 may determine a sample located on a boundary for splitting at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 200 may determine one of samples adjacent to a boundary for splitting a long side of the current coding unit in half, as the sample from which the predetermined information may be obtained.

According to an embodiment, when the current coding unit is split into a plurality of coding units, the image decoding apparatus 200 may use at least one of the block shape information and the split shape information to determine a coding unit at a predetermined location from among the plurality of coding units. According to an embodiment, the image decoding apparatus 200 may obtain at least one of the block shape information and the split shape information from a sample at a predetermined location in a coding unit, and split the plurality of coding units, which are generated by splitting the current coding unit, by using at least one of the split shape information and the block shape information, which is obtained from the sample of the predetermined location in each of the plurality of coding units. That is, a coding unit may be recursively split based on at least one of the block shape information and the split shape information, which is obtained from the sample at the predetermined location in each coding unit. An operation of recursively splitting a coding unit has been described above in relation to FIG. 20, and thus detailed descriptions thereof will not be provided here.

According to an embodiment, the image decoding apparatus 200 may determine one or more coding units by splitting the current coding unit, and may determine an order of decoding the one or more coding units, based on a predetermined block (e.g., the current coding unit).

Figure 22:
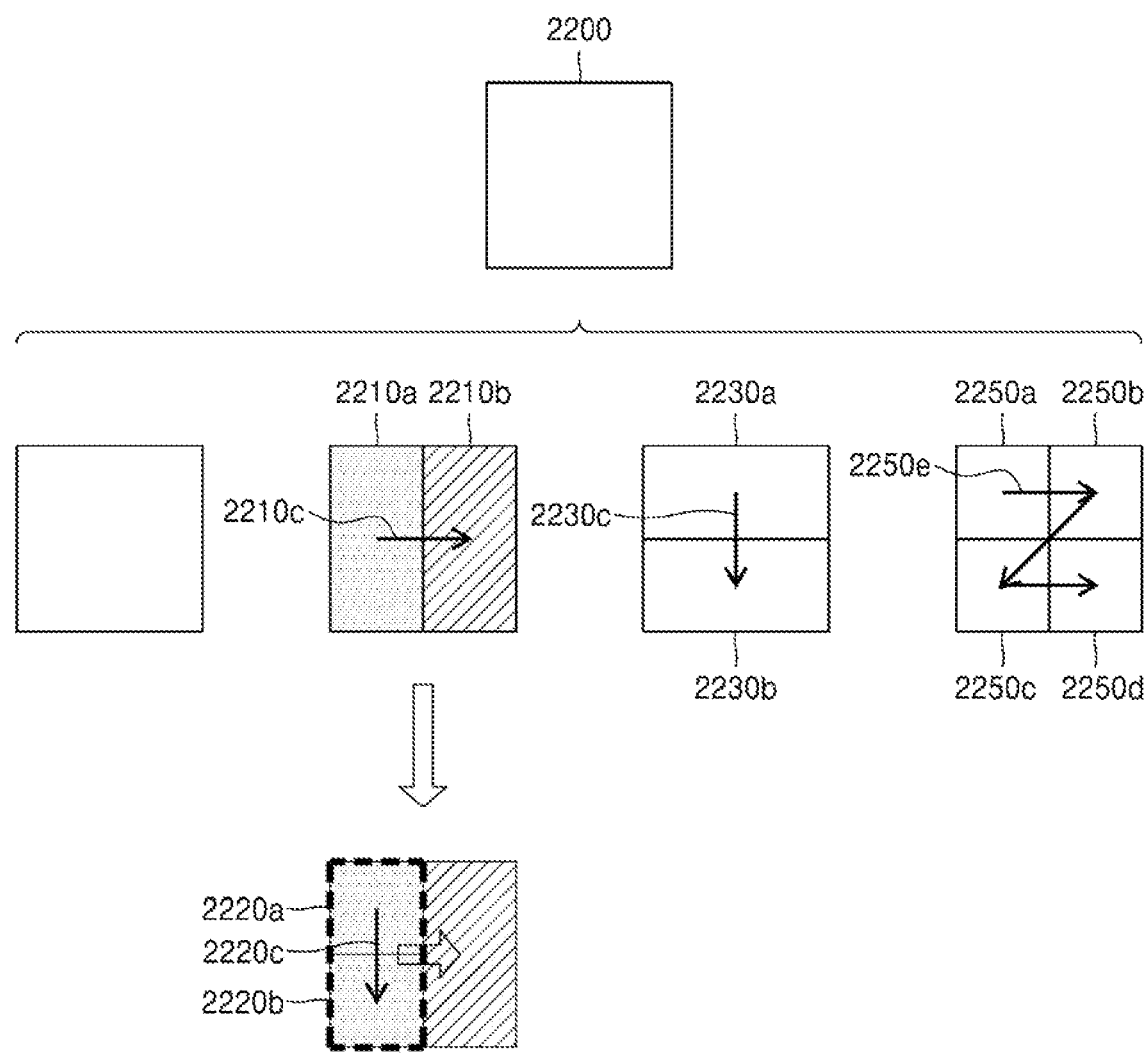
FIG. 22 illustrates an order of processing a plurality of coding units when the plurality of coding units are determined by splitting a current coding unit, according to an embodiment.

FIG. 22 illustrates an order of processing a plurality of coding units when the image decoding apparatus 200 determines the plurality of coding units by splitting a current coding unit, according to an embodiment.

According to an embodiment, the image decoding apparatus 200 may determine second coding units 2210*a* and 2210*b* by splitting a first coding unit 2200 in a vertical direction, determine second coding units 2230*a* and 2230*b* by splitting the first coding unit 2200 in a horizontal direction, or determine second coding units 2250*a* to 2250*d* by splitting the first coding unit 2200 in vertical and horizontal directions, based on block shape information and split shape information.

Referring to FIG. 22, the image decoding apparatus 200 may determine to process the second coding units 2210*a* and 2210*b*, which are determined by splitting the first coding unit 2200 in a vertical direction, in a horizontal direction order 2210*c*. The image decoding apparatus 200 may determine to process the second coding units 2230*a* and 2230*b*, which are determined by splitting the first coding unit 2200 in a horizontal direction, in a vertical direction order 2230*c*. The image decoding apparatus 200 may determine to process the second coding units 2250*a* to 2250*d*, which are determined by splitting the first coding unit 2200 in vertical and horizontal directions, in a predetermined order for processing coding units in a row and then processing coding units in a next row (e.g., in a raster scan order or Z-scan order 2250*e*).

According to an embodiment, the image decoding apparatus 200 may recursively split coding units. Referring to FIG. 22, the image decoding apparatus 200 may determine the plurality of coding units 2210*a* and 2210*b*, 2230*a* and 2230*b*, or 2250*a* to 2250*d* by splitting the first coding unit 2200, and recursively split each of the determined plurality of coding units 2210*a* and 2210*b*, 2230*a* and 2230*b*, or 2250*a* to 2250*d*. A splitting method of the plurality of coding units 2210*a*, 2210*b*, 2230*a*, 2230*b*, 2250*a*, 2250*b*, 2250*c*, and 2150*d* may correspond to a splitting method of the first coding unit 2200. As such, each of the plurality of coding units 2210*a*, 2210*b*, 2230*a*, 2230*b*, 2250*a*, 2250*b*, 2250*c*, and 2250*d* may be independently split into a plurality of coding units. Referring to FIG. 22, the image decoding apparatus 200 may determine the second coding units 2210*a* and 2210*b* by splitting the first coding unit 2200 in a vertical direction, and may determine to independently split or not to split each of the second coding units 2210*a* and 2210*b*.

According to an embodiment, the image decoding apparatus 200 may determine third coding units 2220*a* and 2220*b* by splitting the left second coding unit 2210*a* in a horizontal direction, and may not split the right second coding unit 2210*b*.

According to an embodiment, a processing order of coding units may be determined based on an operation of splitting a coding unit. In other words, a processing order of split coding units may be determined based on a processing order of coding units immediately before being split. The image decoding apparatus 200 may determine a processing order of the third coding units 2220*a* and 2220*b* determined by splitting the left second coding unit 2210*a*, independently of the right second coding unit 2210*b*. Because the third coding units 2220*a* and 2220*b* are determined by splitting the left second coding unit 2210*a* in a horizontal direction, the third coding units 2220*a* and 2220*b* may be processed in a vertical direction order 2220*c*. Because the left and right second coding units 2210*a* and 2210*b* are processed in the horizontal direction order 2210*c*, the right second coding unit 2210*b* may be processed after the third coding units 2220*a* and 2220*b* included in the left second coding unit 2210*a* are processed in the vertical direction order 2220*c*. An operation of determining a processing order of coding units based on a coding unit before being split is not limited to the above-described example, and various methods may be used to independently process coding units, which are split and determined to various shapes, in a predetermined order.

Figure 23:
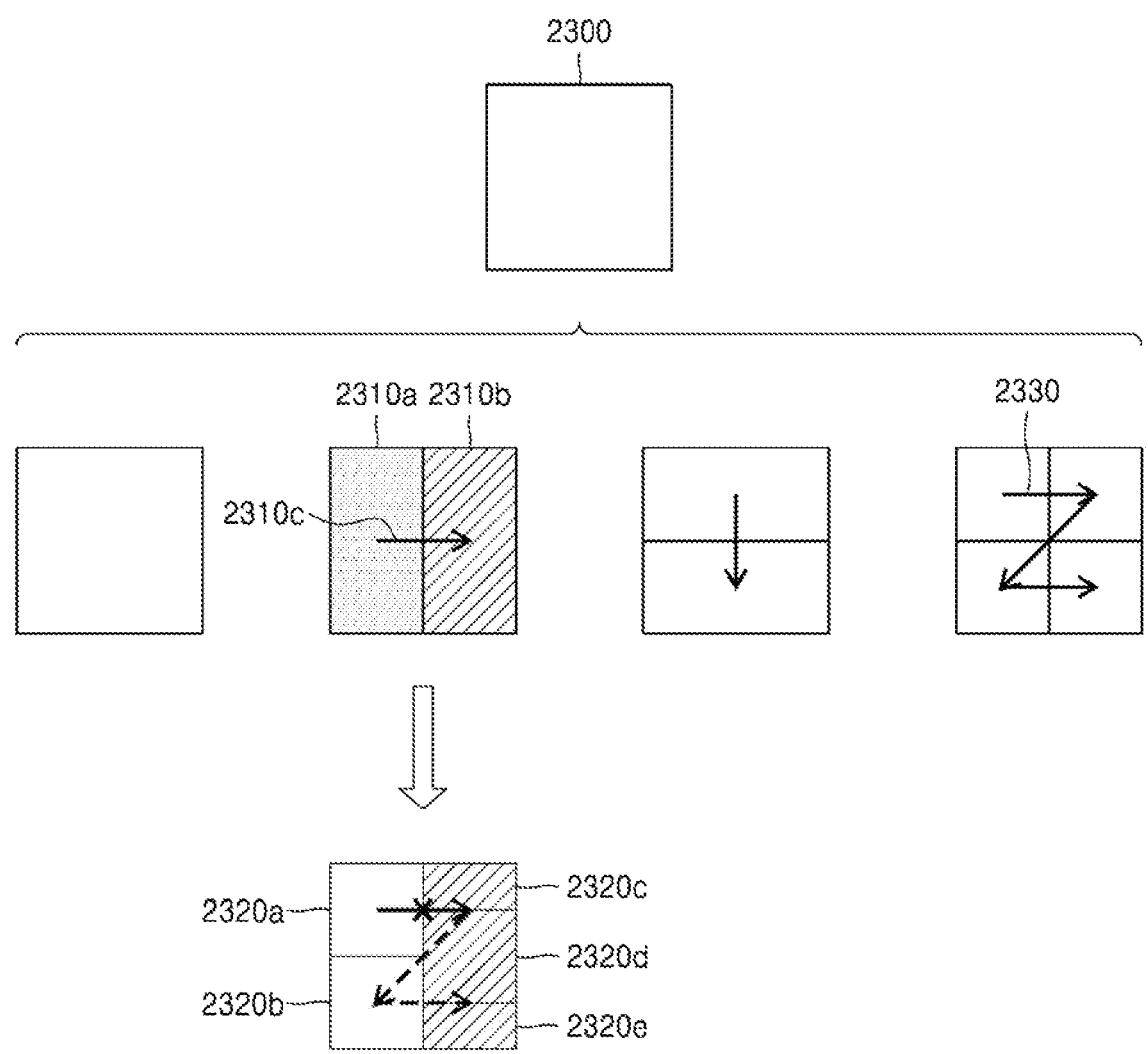
FIG. 23 illustrates a process of determining that a current coding unit is to be split into an odd number of coding units, when the coding units are not processable in a predetermined order, according to an embodiment.

FIG. 23 illustrates a process, performed by the image decoding apparatus 200, of determining that a current coding unit is to be split into an odd number of coding units, when the coding units are not processable in a predetermined order, according to an embodiment.

According to an embodiment, the image decoding apparatus 200 may determine whether the current coding unit is split into an odd number of coding units, based on obtained block shape information and split shape information. Referring to FIG. 23, a square first coding unit 2300 may be split into non-square second coding units 2310a and 2310b, and the second coding units 2310a and 2310b may be independently split into third coding units 2320a and 2320b, and 2320c to 2320e. According to an embodiment, the image decoding apparatus 200 may determine the plurality of third coding units 2320a and 2320b by splitting the left second coding unit 2310a in a horizontal direction, and may split the right second coding unit 2310b into the odd number of third coding units 2320c to 2320e.

According to an embodiment, the image decoding apparatus 200 may determine whether any coding unit is split into an odd number of coding units, by determining whether the third coding units 2320a and 2320b, and 2320c to 2320e are processable in a predetermined order. Referring to FIG. 23, the image decoding apparatus 200 may determine the third coding units 2320a and 2320b, and 2320c to 2320e by recursively splitting the first coding unit 2300. The image decoding apparatus 200 may determine whether any of the first coding unit 2300, the second coding units 2310a and 2310b, and the third coding units 2320a and 2320b, and 2320c to 2320e are split into an odd number of coding units, based on at least one of the block shape information and the split shape information. For example, a right coding unit among the second coding units 2310a and 2310b may be split into an odd number of third coding units 2320c to 2320e. A processing order of a plurality of coding units included in the first coding unit 2300 may be a predetermined order (e.g., a Z-scan order 2330), and the image decoding apparatus 200 may determine whether the third coding units 2320c to 2320e, which are determined by splitting the right second coding unit 2310b into an odd number of coding units, satisfy a condition for processing in the predetermined order.

According to an embodiment, the image decoding apparatus 200 may determine whether the third coding units 2320a and 2320b, and 2320c to 2320e included in the first coding unit 2300 satisfy the condition for processing in the predetermined order, and the condition relates to whether at least one of a width and height of the second coding units 2310a and 2310b is split in half along a boundary of the third coding units 2320a and 2320b, and 2320c to 2320e. For example, the third coding units 2320a and 2320b determined by dividing the height of the non-square left second coding unit 2310a in half satisfy the condition. However, because boundaries of the third coding units 2320c to 2320e determined by splitting the right second coding unit 2310b into three coding units do not divide the width or height of the right second coding unit 2310b in half, it may be determined that the third coding units 2320c to 2320e do not satisfy the condition. When the condition is not satisfied as described above, the image decoding apparatus 200 may decide disconnection of a scan order, and determine that the right second coding unit 2310b is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

Figure 24:
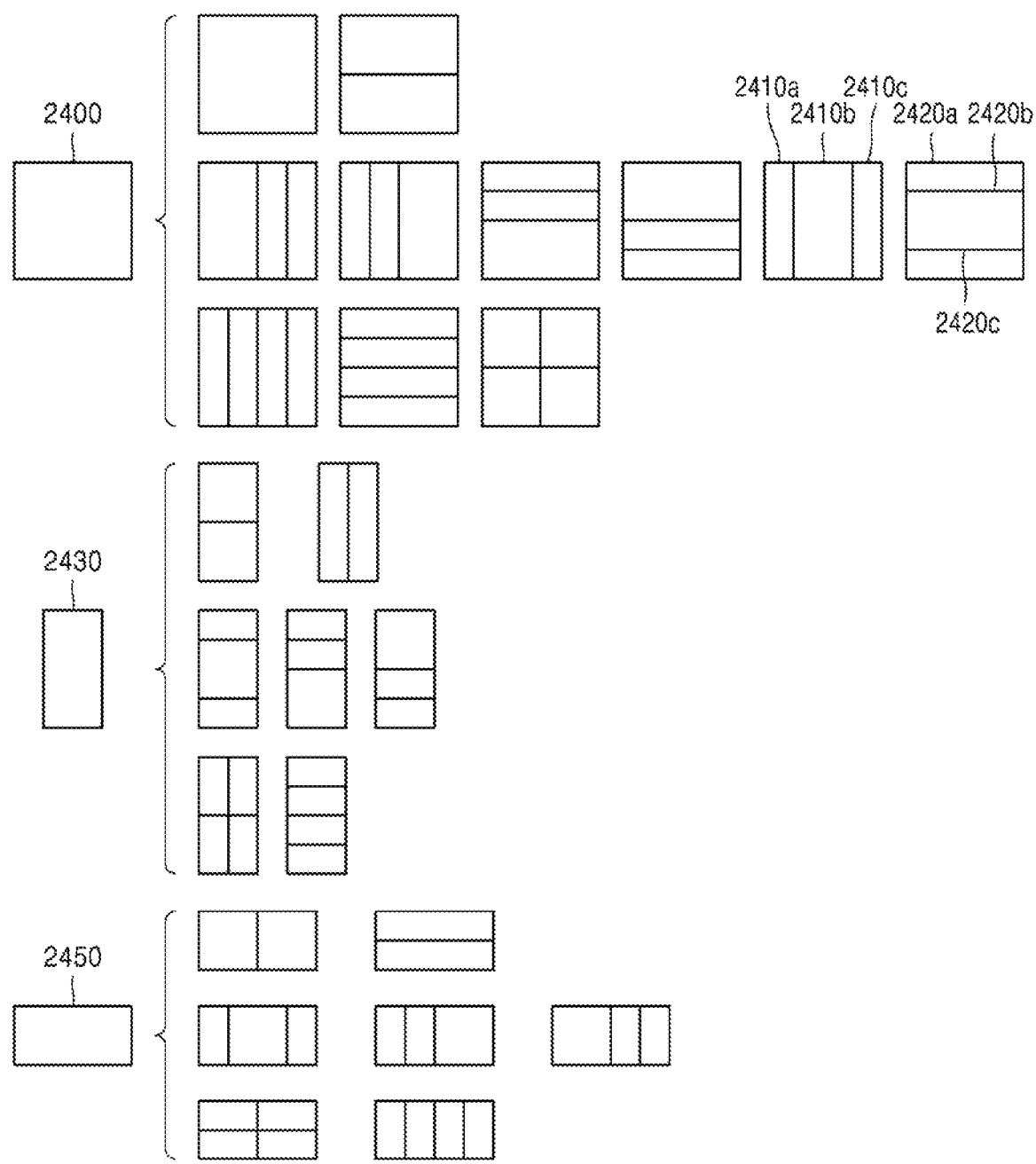
FIG. 24 illustrates a process of determining at least one coding unit by splitting a first coding unit, according to an embodiment.

FIG. 24 illustrates a process, performed by the image decoding apparatus 200, of determining at least one coding unit by splitting a first coding unit 2400, according to an embodiment. According to an embodiment, the image decoding apparatus 200 may split the first coding unit 2400, based on at least one of block shape information and split shape information, which is obtained by the receiver 210. The square first coding unit 2400 may be split into four square coding units, or may be split into a plurality of non-square coding units. For example, referring to FIG. 24, when the block shape information indicates that the first coding unit 2400 has a square shape and the split shape information indicates to split the first coding unit 2400 into non-square coding units, the image decoding apparatus 200 may split the first coding unit 2400 into a plurality of non-square coding units. In detail, when the split shape information indicates to determine an odd number of coding units by splitting the first coding unit 2400 in a horizontal direction or a vertical direction, the image decoding apparatus 200 may split the square first coding unit 2400 into an odd number of coding units, e.g., second coding units 2410a, 2410b, and 2410c determined by splitting the square first coding unit 2400 in a vertical direction or second coding units 2420a, 2420b, and 2420c determined by splitting the square first coding unit 2400 in a horizontal direction.

According to an embodiment, the image decoding apparatus 200 may determine whether the second coding units 2410a, 2410b, 2410c, 2420a, 2420b, and 2420c included in the first coding unit 2400 satisfy a condition for processing in a predetermined order, and the condition relates to whether at least one of a width and height of the first coding unit 2400 is split in half along a boundary of the second coding units 2410a, 2410b, 2410c, 2420a, 2420b, and 2420c. Referring to FIG. 24, because boundaries of the second coding units 2410a, 2410b, and 2410c determined by splitting the square first coding unit 2400 in a vertical direction do not divide the width of the first coding unit 2400 in half, it may be determined that the first coding unit 2400 does not satisfy the condition for processing in the predetermined order. In addition, because boundaries of the second coding units 2420a, 2420b, and 2420c determined by splitting the square first coding unit 2400 in a horizontal direction do not divide the width of the first coding unit 2400 in half, it may be determined that the first coding unit 2400 does not satisfy the condition for processing in the predetermined order. When the condition is not satisfied as described above, the image decoding apparatus 200 may decide disconnection of a scan order, and may determine that the first coding unit 2400 is split into an odd number of coding units, based on a result of the decision. According to an embodiment, when a coding unit is split into an odd number of coding units, the image decoding apparatus 200 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 200 may determine various-shaped coding units by splitting a first coding unit.

Referring to FIG. 24, the image decoding apparatus 200 may split the square first coding unit 2400 or a non-square first coding unit 2430 or 2450 into various-shaped coding units.

Figure 25:
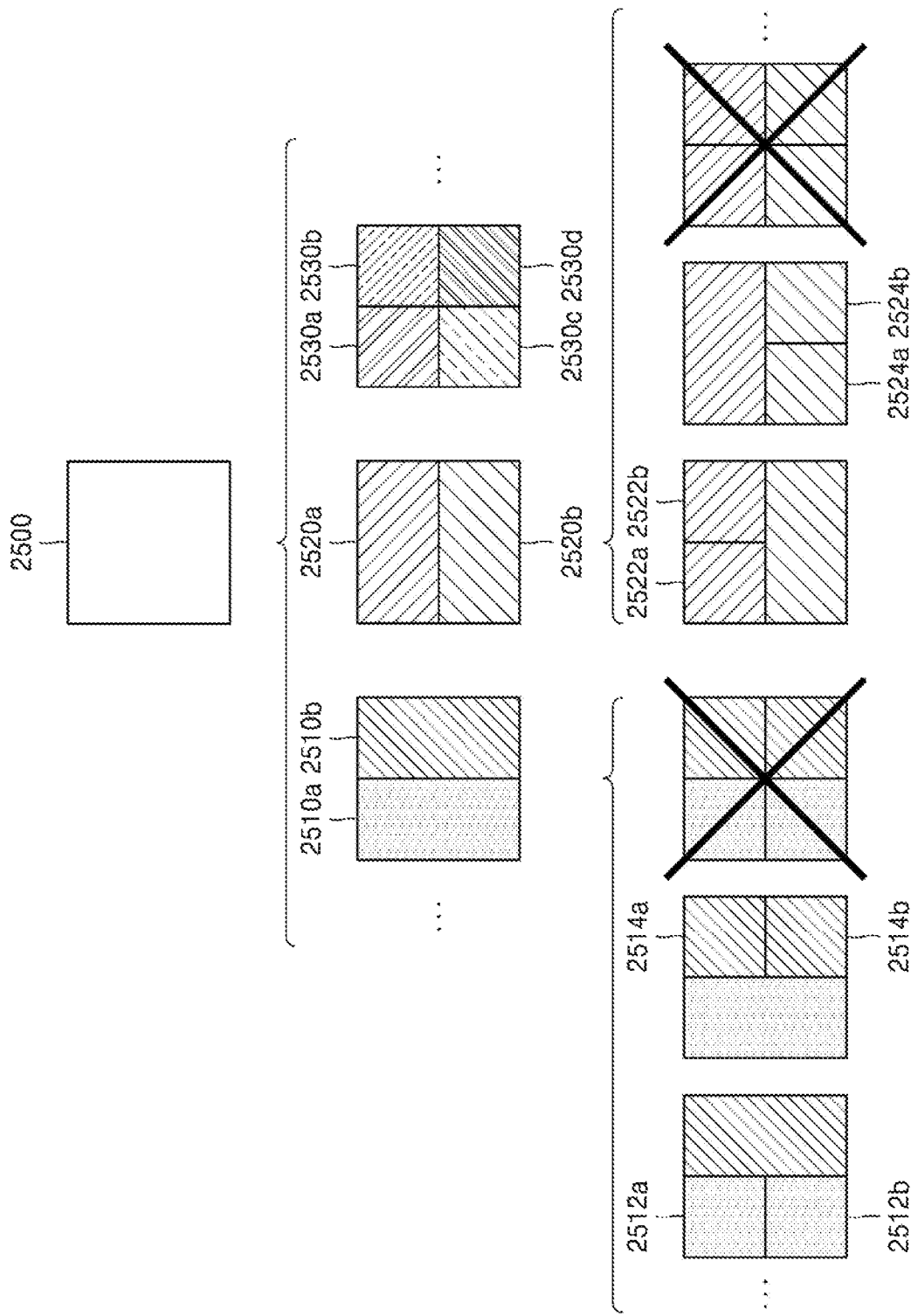
FIG. 25 illustrates that a shape into which a second coding unit is splittable is restricted when the second coding unit having a non-square shape, which is determined by splitting a first coding unit, satisfies a predetermined condition, according to an embodiment.

FIG. 25 illustrates that a shape into which a second coding unit is splittable is restricted when the second coding unit having a non-square shape, which is determined as the image decoding apparatus 200 splits a first coding unit 2500, satisfies a predetermined condition, according to an embodiment.

According to an embodiment, the image decoding apparatus 200 may determine to split the square first coding unit 2500 into non-square second coding units 2510a, 2510b, 2520a, and 2520b, based on at least one of block shape information and split shape information, which is obtained by the receiver 210. The second coding units 2510a, 2510b, 2520a, and 2520b may be independently split. As such, the image decoding apparatus 200 may determine to split or not to split the second coding units 2510a, 2510b, 2520a, and 2520b into a plurality of coding units, based on at least one of the block shape information and the split shape information of each of the second coding units 2510a, 2510b, 2520a, and 2520b. According to an embodiment, the image decoding apparatus 200 may determine third coding units 2512a and 2512b by splitting the non-square left second coding unit 2510a, which is determined by splitting the first coding unit 2500 in a vertical direction, in a horizontal direction. However, when the left second coding unit 2510a is split in a horizontal direction, the image decoding apparatus 200 may restrict the right second coding unit 2510b to not be split in a horizontal direction in which the left second coding unit 2510a is split. When third coding units 2514a and 2514b are determined by splitting the right second coding unit 2510b in a same direction, because the left and right second coding units 2510a and 2510b are independently split in a horizontal direction, the third coding units 2512a, 2512b, 2514a, and 2514b may be determined. However, this case serves equally as a case in which the image decoding apparatus 200 splits the first coding unit 2500 into four square second coding units 2530a, 2530b, 2530c, and 2530d, based on at least one of the block shape information and the split shape information, and may be inefficient in terms of image decoding.

According to an embodiment, the image decoding apparatus 200 may determine third coding units 2522a and 2522b or 2524a and 2524b by splitting the non-square second coding unit 2520a or 2520b, which is determined by splitting the first coding unit 2500 in a horizontal direction, in a vertical direction. However, when a second coding unit (e.g., the upper second coding unit 2520a) is split in a vertical direction, for the above-described reason, the image decoding apparatus 200 may restrict the other second coding unit (e.g., the lower second coding unit 2520b) to not be split in a vertical direction in which the upper second coding unit 2520a is split.

Figure 26:
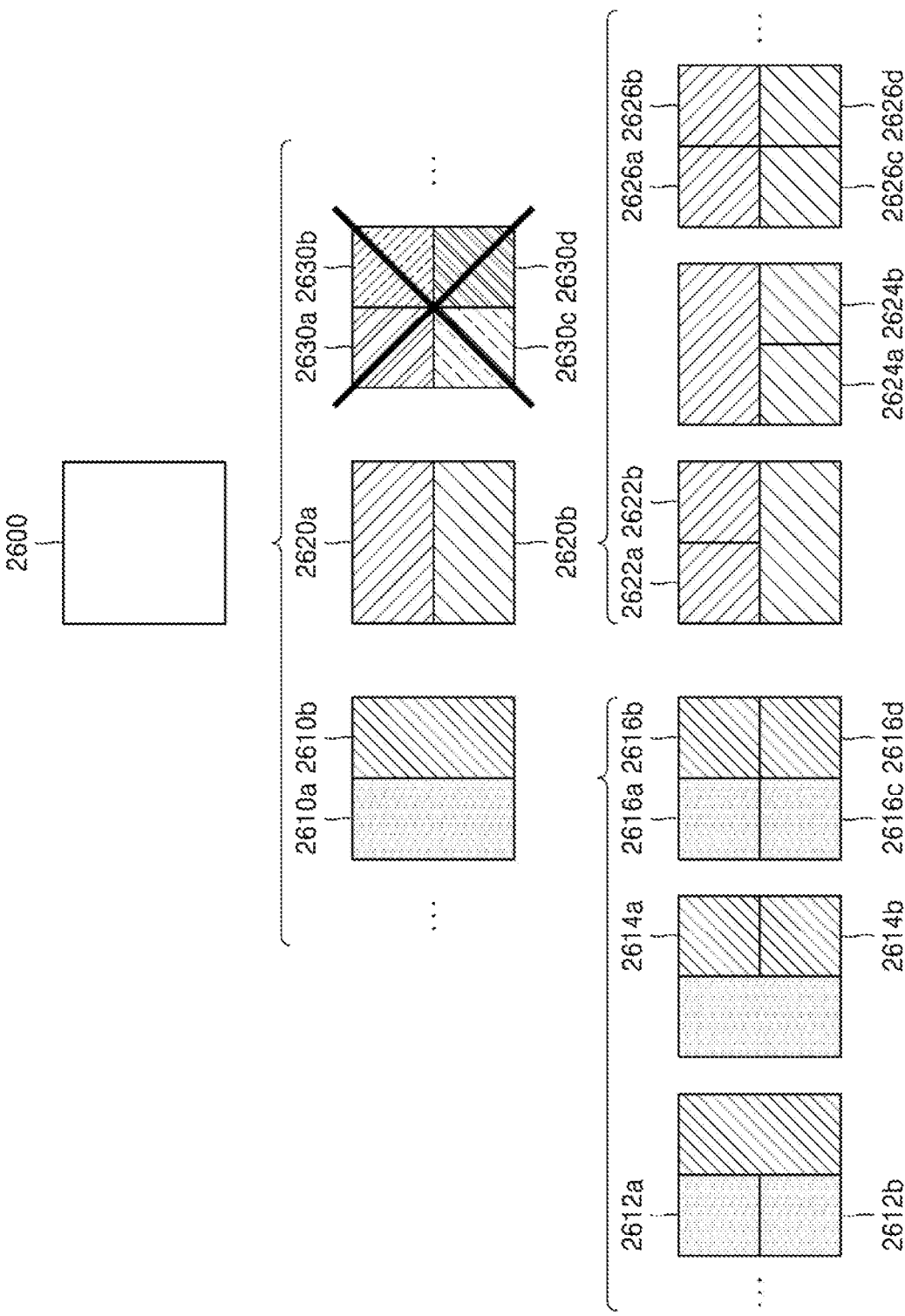
FIG. 26 illustrates a process of splitting a square coding unit when split shape information indicates that the square coding unit is not to be split into four square coding units, according to an embodiment.

FIG. 26 illustrates a process, performed by the image decoding apparatus 200, of splitting a square coding unit when split shape information indicates that the square coding unit is not to be split into four square coding units, according to an embodiment.

According to an embodiment, the image decoding apparatus 200 may determine second coding units 2610a, 2610b, 2620a, 2620b, etc. by splitting a first coding unit 2600, based on at least one of block shape information and split shape information. The split shape information may include information about various methods of splitting a coding unit but, the information about various splitting methods may not include information for splitting a coding unit into four square coding units. According to such split shape information, the image decoding apparatus 200 may not split the square first coding unit 2600 into four square second coding units 2630a, 2630b, 2630c, and 2630d. The image decoding apparatus 200 may determine the non-square second coding units 2610a, 2610b, 2620a, 2620b, etc., based on the split shape information.

According to an embodiment, the image decoding apparatus 200 may independently split the non-square second coding units 2610a and 2610b or 2620a and 2620b, etc. Each of the second coding units 2610a, 2610b, 2620a, 2620b, etc. may be recursively split in a predetermined order, and this splitting method may correspond to a method of splitting the first coding unit 2600, based on at least one of the block shape information and the split shape information.

For example, the image decoding apparatus 200 may determine square third coding units 2612a and 2612b by splitting the left second coding unit 2610a in a horizontal direction, and may determine square third coding units 2614a and 2614b by splitting the right second coding unit 2610b in a horizontal direction. Furthermore, the image decoding apparatus 200 may determine square third coding units 2616a, 2616b, 2616c, and 2616d by splitting both of the left and right second coding units 2610a and 2610b in a horizontal direction. In this case, coding units having the same shape as the four square second coding units 2630a, 2630b, 2630c, and 2630d split from the first coding unit 2600 may be determined.

As another example, the image decoding apparatus 200 may determine square third coding units 2622a and 2622b by splitting the upper second coding unit 2620a in a vertical direction, and may determine square third coding units 2624a and 2624b by splitting the lower second coding unit 2620b in a vertical direction. Furthermore, the image decoding apparatus 200 may determine square third coding units 2626a, 2626b, 2626c, and 2626d by splitting both of the upper and lower second coding units 2620a and 2620b in a vertical direction. In this case, coding units having the same shape as the four square second coding units 2630a, 2630b, 2630c, and 2630d split from the first coding unit 2600 may be determined.

Figure 27:
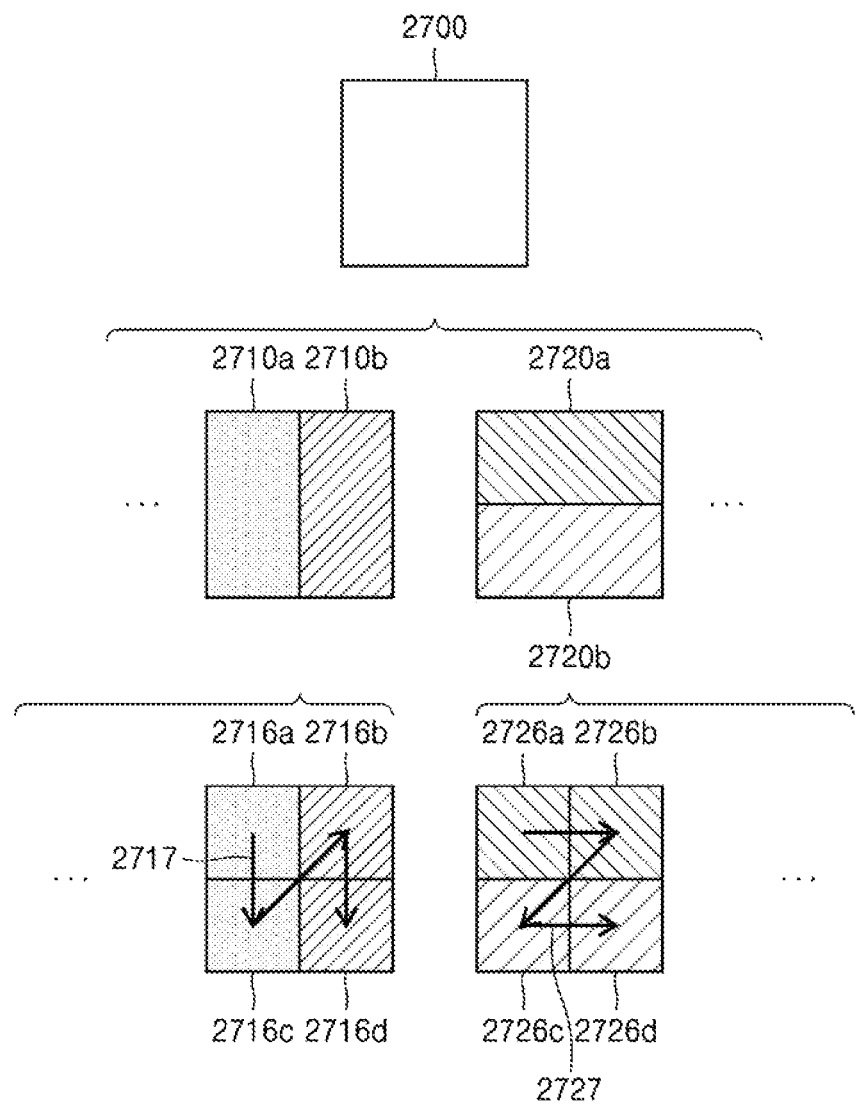
FIG. 27 illustrates that a processing order between a plurality of coding units may be changed depending on a process of splitting a coding unit, according to an embodiment.

FIG. 27 illustrates that a processing order between a plurality of coding units may be changed depending on a process of splitting a coding unit, according to an embodiment.

According to an embodiment, the image decoding apparatus 200 may split a first coding unit 2700, based on block shape information and split shape information. When the block shape information indicates a square shape and the split shape information indicates to split the first coding unit 2700 in at least one of horizontal and vertical directions, the image decoding apparatus 200 may determine second coding units 2710a and 2710b or 2720a and 2720b, etc. by splitting the first coding unit 2700. Referring to FIG. 27, the non-square second coding units 2710a, 2710b, 2720a, and 2720b determined by splitting the first coding unit 2700 in only a horizontal direction or vertical direction may be independently split based on the block shape information and the split shape information of each coding unit. For example, the image decoding apparatus 200 may determine third coding units 2716a, 2716b, 2716c, and 2716d by splitting the second coding units 2710a and 2710b, which are generated by splitting the first coding unit 2700 in a vertical direction, in a horizontal direction, and may determine third coding units 2726a, 2726b, 2726c, and 2726d by splitting the second coding units 2720a and 2720b, which are generated by splitting the first coding unit 2700 in a horizontal direction, in a vertical direction. An operation of splitting the second coding units 2710a, 2710b, 2720a, and 2720b has been described above in relation to FIG. 25, and thus detailed descriptions thereof will not be provided herein.

According to an embodiment, the image decoding apparatus 200 may process coding units in a predetermined order. An operation of processing coding units in a predetermined order has been described above in relation to FIG. 22, and thus detailed descriptions thereof will not be provided herein. Referring to FIG. 27, the image decoding apparatus 200 may determine four square third coding units 2716a, 2716b, 2716c, and 2716d, and 2726a, 2726b, 2726c, and 2726d by splitting the square first coding unit 2700. According to an embodiment, the image decoding apparatus 200 may determine processing orders of the third coding units 2716a, 2716b, 2716c, and 2716d, and 2726a, 2726b, 2726c, and 2726d based on a splitting method of the first coding unit 2700.

According to an embodiment, the image decoding apparatus 200 may determine the third coding units 2716a, 2716b, 2716c, and 2716d by splitting the second coding units 2710a and 2710b generated by splitting the first coding unit 2700 in a vertical direction, in a horizontal direction, and may process the third coding units 2716a, 2716b, 2716c, and 2716d in a processing order 2717 for initially processing the third coding units 2716a and 2716c, which are included in the left second coding unit 2710a, in a vertical direction and then processing the third coding unit 2716b and 2716d, which are included in the right second coding unit 2710b, in a vertical direction.

According to an embodiment, the image decoding apparatus 200 may determine the third coding units 2726a, 2726b, 2726c, and 2726d by splitting the second coding units 2720a and 2720b generated by splitting the first coding unit 2700 in a horizontal direction, in a vertical direction, and may process the third coding units 2726a, 2726b, 2726c, and 2726d in a processing order 2727 for initially processing the third coding units 2726a and 2726b, which are included in the upper second coding unit 2720a, in a horizontal direction and then processing the third coding unit 2726c and 2726d, which are included in the lower second coding unit 2720b, in a horizontal direction.

Referring to FIG. 27, the square third coding units 2716a, 2716b, 2716c, and 2716d, and 2726a, 2726b, 2726c, and 2726d may be determined by splitting the second coding units 2710a, 2710b, 2720a, and 2720b, respectively. Although the second coding units 2710a and 2710b are determined by splitting the first coding unit 2700 in a vertical direction differently from the second coding units 2720a and 2720b which are determined by splitting the first coding unit 2700 in a horizontal direction, the third coding units 2716a, 2716b, 2716c, and 2716d, and 2726a, 2726b, 2726c, and 2726d split therefrom eventually show same-shaped coding units split from the first coding unit 2700. As such, by recursively splitting a coding unit in different manners based on at least one of the block shape information and the split shape information, the image decoding apparatus 200 may process a plurality of coding units in different orders even when the coding units are eventually determined to be the same shape.

FIG. 28 illustrates a process of determining a depth of a coding unit as a shape and size of the coding unit change, when the coding unit is recursively split such that a plurality of coding units are determined, according to an embodiment.

According to an embodiment, the image decoding apparatus 200 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 200 may determine that a depth of the current coding unit is increased from a depth of the coding unit before being split, by n. In the following description, a coding unit having an increased depth is expressed as a coding unit of a deeper depth.

Referring to FIG. 28, according to an embodiment, the image decoding apparatus 200 may determine a second coding unit 2802 and a third coding unit 2804 of deeper depths by splitting a square first coding unit 2800 based on block shape information indicating a square shape (for example, the block shape information may be expressed as '0: SQUARE'). Assuming that the size of the square first coding unit 2800 is 2N×2N, the second coding unit 2802 determined by dividing a width and height of the first coding unit 2800 to $½^1$ may have a size of N×N. Furthermore, the third coding unit 2804 determined by dividing a width and height of the second coding unit 2802 to ½ may have a size of N/2×N/2. In this case, a width and height of the third coding unit 2804 are $½^2$ times those of the first coding unit 2800. When a depth of the first coding unit 2800 is D, a depth of the second coding unit 2802, the width and height of which are $½^1$ times those of the first coding unit 2800, may be D+1, and a depth of the third coding unit 2804, the width and height of which are $½^2$ times those of the first coding unit 2800, may be D+2.

According to an embodiment, the image decoding apparatus 200 may determine a second coding unit 2812 or 2822 and a third coding unit 2814 or 2824 of deeper depths by splitting a non-square first coding unit 2810 or 2820 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 200 may determine a second coding unit 2802, 2812, or 2822 by dividing at least one of a width and height of the first coding unit 2810 having a size of N×2N. That is, the image decoding apparatus 200 may determine the second coding unit 2802 having a size of N×N or the second coding unit 2822 having a size of N×N/2 by splitting the first coding unit 2810 in a horizontal direction, or may determine the second coding unit 2812 having a size of N/2×N by splitting the first coding unit 2810 in horizontal and vertical directions.

According to an embodiment, the image decoding apparatus 200 may determine the second coding unit 2802, 2812, or 2822 by dividing at least one of a width and height of the first coding unit 2820 having a size of 2N×N. That is, the image decoding apparatus 200 may determine the second coding unit 2802 having a size of N×N or the second coding unit 2812 having a size of N/2×N by splitting the first coding unit 2820 in a vertical direction, or may determine the second coding unit 2822 having a size of N×N/2 by splitting the first coding unit 2820 in horizontal and vertical directions.

According to an embodiment, the image decoding apparatus 200 may determine a third coding unit 2804, 2814, or 2824 by dividing at least one of a width and height of the second coding unit 2802 having a size of N×N. That is, the image decoding apparatus 200 may determine the third coding unit 2804 having a size of N/2×N/2, the third coding unit 2814 having a size of N/$2^2$×N/2, or the third coding unit 2824 having a size of N/2×N/$2^2$ by splitting the second coding unit 2802 in vertical and horizontal directions.

According to an embodiment, the image decoding apparatus 200 may determine the third coding unit 2804, 2814, or 2824 by dividing at least one of a width and height of the second coding unit 2812 having a size of N/2×N. That is, the image decoding apparatus 200 may determine the third coding unit 2804 having a size of N/2×N/2 or the third coding unit 2824 having a size of N/2×N/$2^2$ by splitting the second coding unit 2812 in a horizontal direction, or may determine the third coding unit 2814 having a size of N/$2^2$×N/2 by splitting the second coding unit 2812 in vertical and horizontal directions.

According to an embodiment, the image decoding apparatus 200 may determine the third coding unit 2804, 2814, or 2824 by dividing at least one of a width and height of the second coding unit 2822 having a size of N×N/2. That is, the image decoding apparatus 200 may determine the third coding unit 2804 having a size of N/2×N/2 or the third coding unit 2814 having a size of N/$2^2$×N/2 by splitting the second coding unit 2822 in a vertical direction, or may determine the third coding unit 2824 having a size of N/2×N/$2^2$ by splitting the second coding unit 2822 in vertical and horizontal directions.

According to an embodiment, the image decoding apparatus 200 may split the square coding unit 2800, 2802, or 2804 in a horizontal or vertical direction. For example, the image decoding apparatus 200 may determine the first coding unit 2810 having a size of N×2N by splitting the first coding unit 2800 having a size of 2N×2N in a vertical direction, or may determine the first coding unit 2820 having a size of 2N×N by splitting the first coding unit 2800 in a horizontal direction. According to an embodiment, when a depth is determined based on the length of the longest side of a coding unit, a depth of a coding unit determined by splitting the first coding unit 2800, 2802 or 2804 having a size of 2N×2N in a horizontal or vertical direction may be the same as the depth of the first coding unit 2800, 2802 or 2804.

According to an embodiment, a width and height of the third coding unit 2814 or 2824 may be ½$^2$ times those of the first coding unit 2810 or 2820. When a depth of the first coding unit 2810 or 2820 is D, a depth of the second coding unit 2812 or 2022, the width and height of which are ½ times those of the first coding unit 2810 or 2820, may be D+1, and a depth of the third coding unit 2814 or 2824, the width and height of which are ½$^2$ times those of the first coding unit 2810 or 2820, may be D+2.

Figure 29:
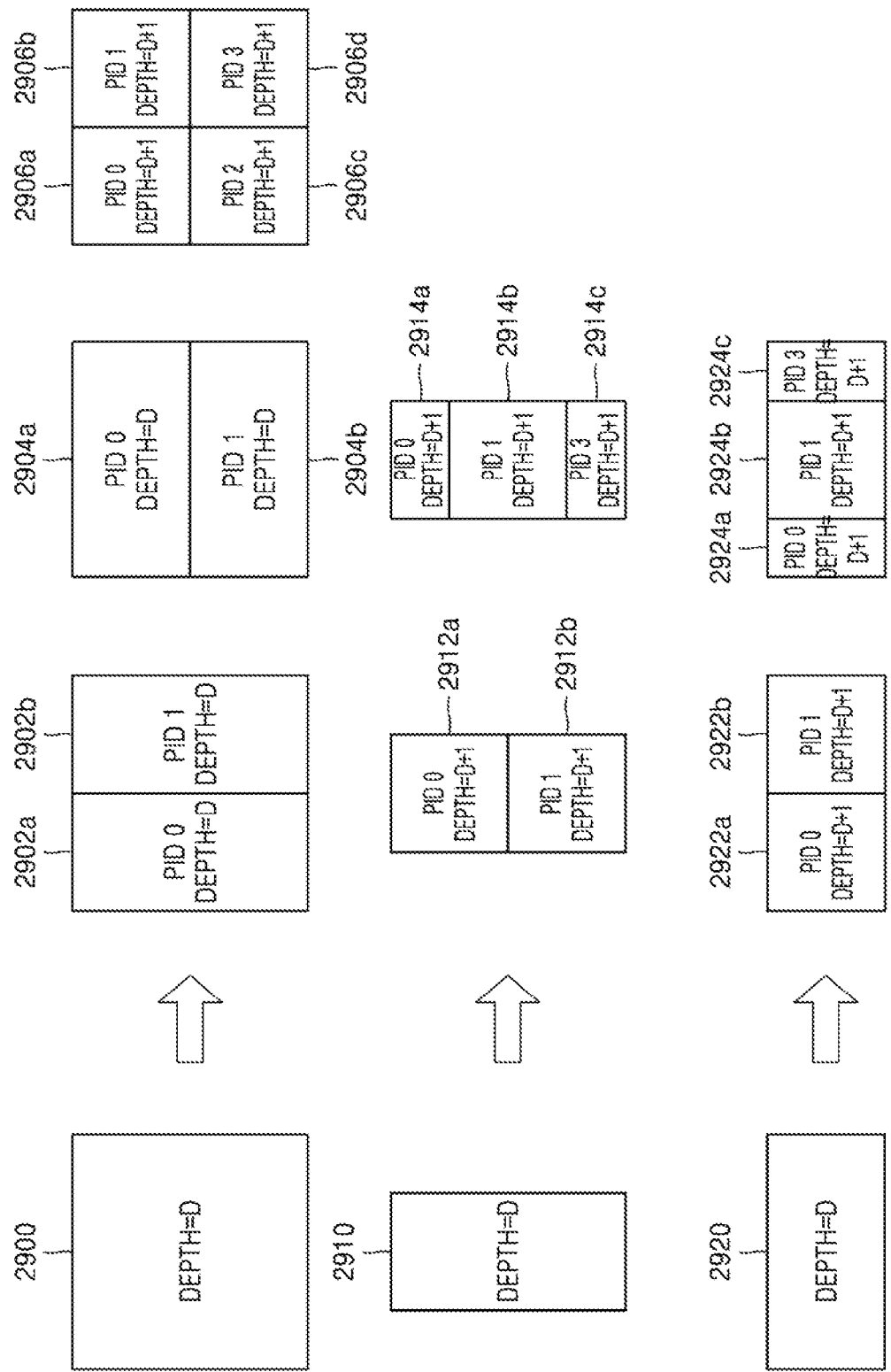
FIG. 29 illustrates depths that are determinable based on shapes and sizes of coding units, and part indexes (PIDs) that are for distinguishing the coding units, according to an embodiment.

FIG. 29 illustrates depths that are determinable based on shapes and sizes of coding units, and part indexes (PIDs) that are for distinguishing the coding units, according to an embodiment.

According to an embodiment, the image decoding apparatus 200 may determine various-shape second coding units by splitting a square first coding unit 2900. Referring to FIG. 29, the image decoding apparatus 200 may determine second coding units 2902*a* and 2902*b*, 2904*a* and 2904*b*, and 2906*a*, 2906*b*, 2906*c*, and 2906*d* by splitting the first coding unit 2900 in at least one of vertical and horizontal directions based on split shape information. That is, the image decoding apparatus 200 may determine the second coding units 2902*a* and 2902*b*, 2904*a* and 2904*b*, and 2906*a*, 2906*b*, 2906*c*, and 2906*d*, based on the split shape information of the first coding unit 2900.

According to an embodiment, a depth of the second coding units 2902*a* and 2902*b*, 2904*a* and 2904*b*, and 2906*a*, 2906*b*, 2906*c*, and 2906*d*, which are determined based on the split shape information of the square first coding unit 2900, may be determined based on the length of a long side thereof. For example, because the length of a side of the square first coding unit 2900 equals the length of a long side of the non-square second coding units 2902*a* and 2902*b*, and 2904*a* and 2904*b*, the first coding unit 2900 and the non-square second coding units 2902*a* and 2902*b*, and 2904*a* and 2904*b* may have the same depth, e.g., D. However, when the image decoding apparatus 200 splits the first coding unit 2900 into the four square second coding units 2906*a*, 2906*b*, 2906*c*, and 2906*d* based on the split shape information, because the length of a side of the square second coding units 2906*a*, 2906*b*, 2906*c*, and 2906*d* is ½ times the length of a side of the first coding unit 2900, a depth of the second coding units 2906*a*, 2906*b*, 2906*c*, and 2906*d* may be D+1 which is deeper than the depth D of the first coding unit 2900 by 1.

According to an embodiment, the image decoding apparatus 200 may determine a plurality of second coding units 2912*a* and 2912*b*, and 2914*a*, 2914*b*, and 2914*c* by splitting a first coding unit 2910, a height of which is longer than a width, in a horizontal direction based on the split shape information. According to an embodiment, the image decoding apparatus 200 may determine a plurality of second coding units 2922*a* and 2922*b*, and 2924*a*, 2924*b*, and 2924*c* by splitting a first coding unit 2920, a width of which is longer than a height, in a vertical direction based on the split shape information.

According to an embodiment, a depth of the second coding units 2912*a* and 2912*b*, 2914*a*, 2914*b*, 2914*c*, 2922*a*, 2922*b*, 2924*a*, 2924*b*, and 2924*c*, which are determined based on the split shape information of the non-square first coding unit 2910 or 2920, may be determined based on the length of a long side thereof. For example, because the length of a side of the square second coding units 2912*a* and 2912*b* is ½ times the length of a long side of the first coding unit 2910 having a non-square shape, a height of which is longer than a width, a depth of the square second coding units 2912*a* and 2912*b* is D+1 which is deeper than the depth D of the non-square first coding unit 2910 by 1.

Furthermore, the image decoding apparatus 200 may split the non-square first coding unit 2910 into an odd number of second coding units 2914*a*, 2914*b*, and 2914*c* based on the split shape information. The odd number of second coding units 2914*a*, 2914*b*, and 2914*c* may include the non-square second coding units 2914*a* and 2914*c* and the square second coding unit 2914*b*. In this case, because the length of a long side of the non-square second coding units 2914*a* and 2914*c* and the length of a side of the square second coding unit 2914*b* are ½ times the length of a long side of the first coding unit 2910, a depth of the second coding units 2914*a*, 2914*b*, and 2914*c* may be D+1 which is deeper than the depth D of the non-square first coding unit 2910 by 1. The image decoding apparatus 200 may determine depths of coding units split from the first coding unit 2920 having a non-square shape, a width of which is longer than a height, by using the above-described method of determining depths of coding units split from the first coding unit 2910.

According to an embodiment, the image decoding apparatus 200 may determine PIDs for identifying split coding units, based on a size ratio between the coding units when an odd number of split coding units do not have equal sizes. Referring to FIG. 29, a coding unit 2914b of a center location among an odd number of split coding units 2914a, 2914b, and 2914c may have a width equal to that of the other coding units 2914a and 2914c and a height which is two times that of the other coding units 2914a and 2914c. That is, in this case, the coding unit 2914b at the center location may include two of the other coding unit 2914a or 2914c. Therefore, when a PID of the coding unit 2914b at the center location is 1 based on a scan order, a PID of the coding unit 2914c located next to the coding unit 2914b may be increased by 2 and thus may be 3. That is, discontinuity in PID values may be present. According to an embodiment, the image decoding apparatus 200 may determine whether an odd number of split coding units do not have equal sizes, based on whether discontinuity is present in PIDs for identifying the split coding units.

According to an embodiment, the image decoding apparatus 200 may determine whether to use a specific splitting method, based on PID values for identifying a plurality of coding units determined by splitting a current coding unit. Referring to FIG. 29, the image decoding apparatus 200 may determine an even number of coding units 2912a and 2912b or an odd number of coding units 2914a, 2914b, and 2914c by splitting the first coding unit 2910 having a rectangular shape, a height of which is longer than a width. The image decoding apparatus 200 may use PIDs indicating each coding unit to identify respective coding units. According to an embodiment, the PID may be obtained from a sample of a predetermined location of each coding unit (e.g., a top left sample).

According to an embodiment, the image decoding apparatus 200 may determine a coding unit at a predetermined location from among the split coding units, by using the PIDs for distinguishing the coding units. According to an embodiment, when the split shape information of the first coding unit 2910 having a rectangular shape, a height of which is longer than a width, indicates to split a coding unit into three coding units, the image decoding apparatus 200 may split the first coding unit 2910 into three coding units 2914a, 2914b, and 2914c. The image decoding apparatus 200 may assign a PID to each of the three coding units 2914a, 2914b, and 2914c. The image decoding apparatus 200 may compare PIDs of an odd number of split coding units to determine a coding unit at a center location from among the coding units. The image decoding apparatus 200 may determine the coding unit 2914b having a PID corresponding to a middle value among the PIDs of the coding units, as the coding unit at the center location from among the coding units determined by splitting the first coding unit 2910. According to an embodiment, the image decoding apparatus 200 may determine PIDs for distinguishing split coding units, based on a size ratio between the coding units when the split coding units do not have equal sizes. Referring to FIG. 29, the coding unit 2914b generated by splitting the first coding unit 2910 may have a width equal to that of the other coding units 2914a and 2914c and a height which is two times that of the other coding units 2914a and 2914c. In this case, when the PID of the coding unit 2914b at the center location is 1, the PID of the coding unit 2114c located next to the coding unit 2914b may be increased by 2 and thus may be 3. When the PID is not uniformly increased as described above, the image decoding apparatus 200 may determine that a coding unit is split into a plurality of coding units including a coding unit having a size different from that of the other coding units. According to an embodiment, when the split shape information indicates to split a coding unit into an odd number of coding units, the image decoding apparatus 200 may split a current coding unit in such a manner that a coding unit of a predetermined location among an odd number of coding units (e.g., a coding unit of a centre location) has a size different from that of the other coding units. In this case, the image decoding apparatus 200 may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 200 may use a predetermined data unit where a coding unit starts to be recursively split.

Figure 30:
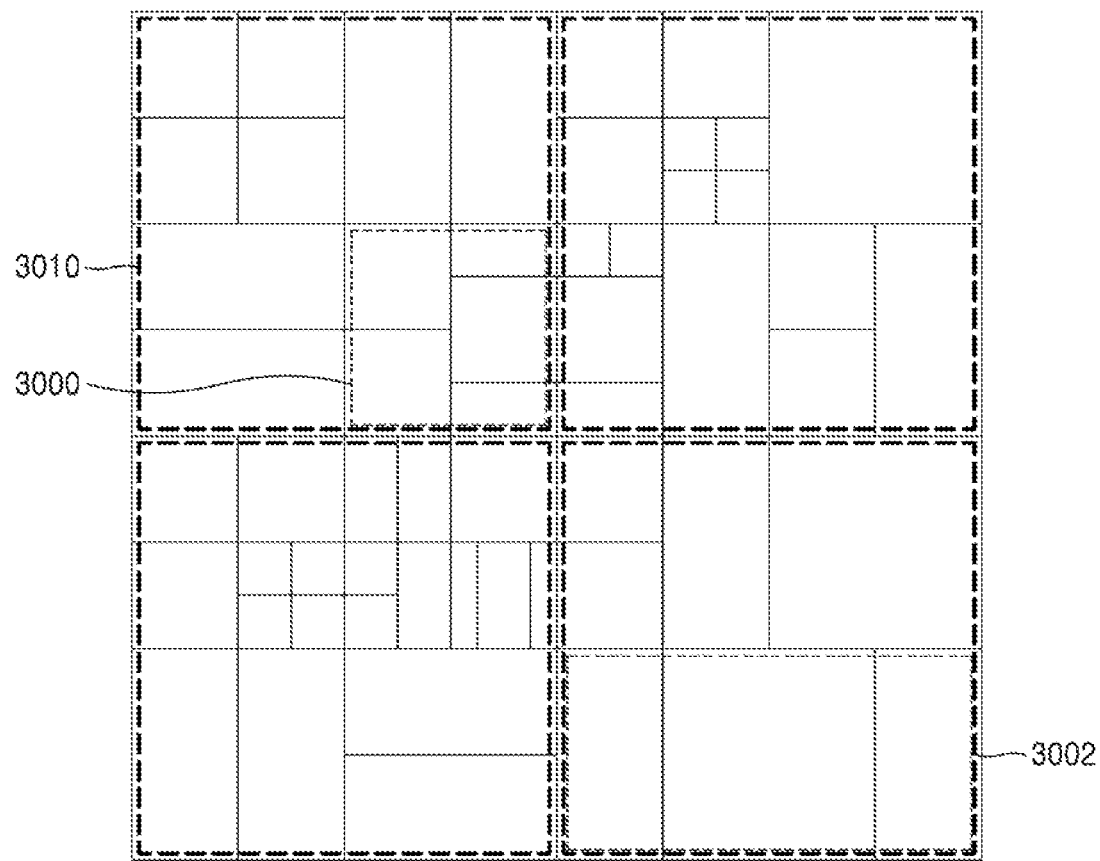
FIG. 30 illustrates that a plurality of coding units are determined based on a plurality of predetermined data units included in a picture, according to an embodiment.

FIG. 30 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 200 may split the current picture into a plurality of reference data units. According to an embodiment, the image decoding apparatus 200 may split the plurality of reference data units, which are split from the current picture, by using splitting information about each reference data unit. The operation of splitting the reference data unit may correspond to a splitting operation using a quadtree structure.

According to an embodiment, the image decoding apparatus 200 may previously determine the minimum size allowed for the reference data units included in the current picture. Accordingly, the image decoding apparatus 200 may determine various reference data units having sizes equal to or greater than the minimum size, and may determine one or more coding units by using the block shape information and the split shape information with reference to the determined reference data unit.

Referring to FIG. 30, the image decoding apparatus 200 may use a square reference coding unit 3000 or a non-square reference coding unit 3002. According to an embodiment, the shape and size of reference coding units may be determined based on various data units capable of including one or more reference coding units (e.g., sequences, pictures, slices, slice segments, largest coding units, or the like).

According to an embodiment, the receiver 210 of the image decoding apparatus 200 may obtain, from a bitstream, at least one of reference coding unit shape information and reference coding unit size information with respect to each of the various data units. An operation of splitting the square reference coding unit 3000 into one or more coding units has been described above in relation to the operation of splitting a current coding unit of FIG. 18, and an operation of splitting the non-square reference coding unit 3002 into one or more coding units has been described above in relation to the operation of splitting the current coding unit 1900 or 1950 of FIG. 19. Thus, detailed descriptions thereof will not be provided herein.

According to an embodiment, the image decoding apparatus 200 may use a PID for identifying the size and shape of reference coding units, to determine the size and shape of reference coding units according to some data units previously determined based on a predetermined condition. That is, the receiver 210 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 200 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 200 may determine at least one of the size and shape of reference coding units included in a data unit serving as a unit for obtaining the PID, by selecting the previously determined at least one of the size and shape of reference coding units based on the PID.

According to an embodiment, the image decoding apparatus 200 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 200 may determine the reference coding units by splitting the largest coding unit n times based on a quadtree structure, and may split the reference coding unit based on at least one of the block shape information and the split shape information according to various embodiments.

Figure 31:
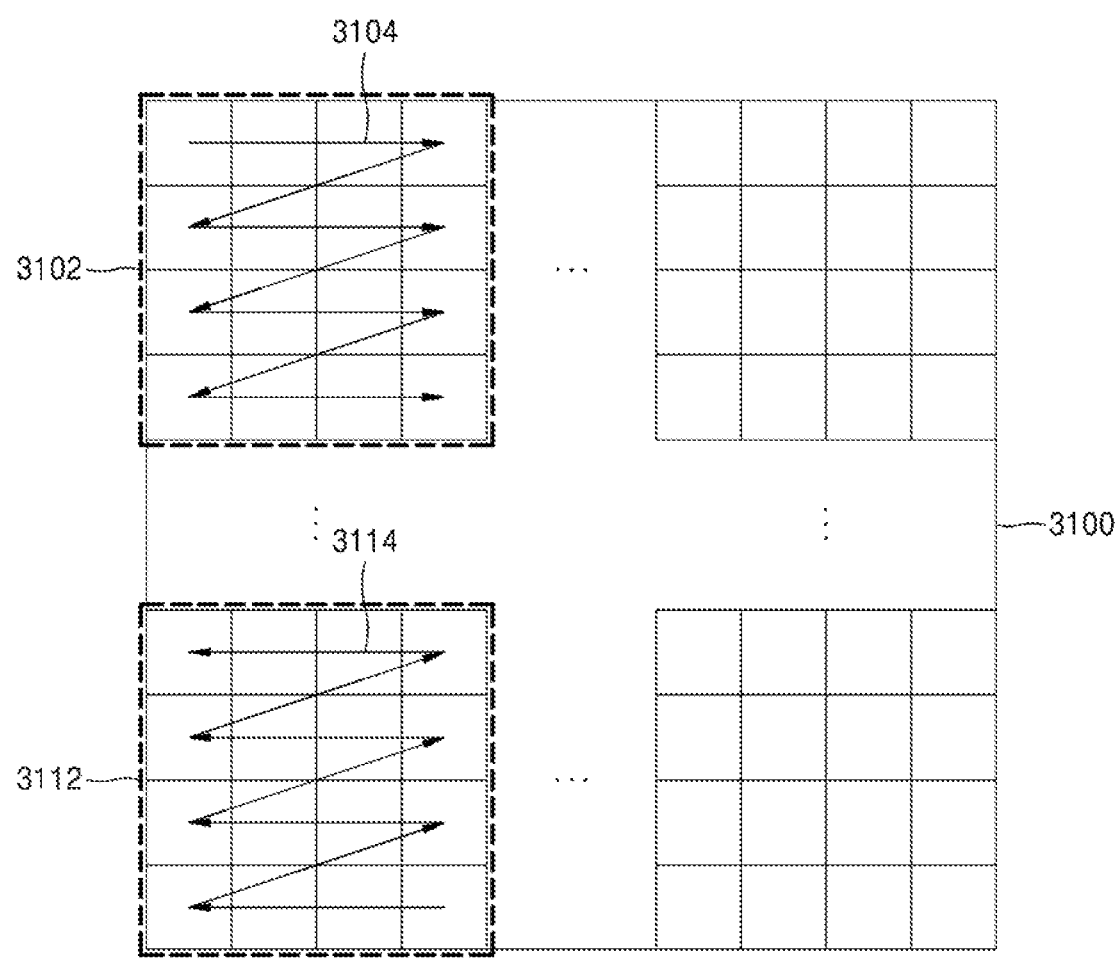
FIG. 31 illustrates a processing block serving as a criterion for determining a determination order of reference coding units included in a picture, according to an embodiment.

FIG. 31 illustrates a processing block serving as a criterion for determining a determination order of reference coding units included in a picture 3100, according to an embodiment.

According to an embodiment, the image decoding apparatus 200 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 200 may obtain processing block size information and may determine the size of one or more processing blocks included in the picture. The image decoding apparatus 200 may obtain the processing block size information from a bitstream and may determine the size of one or more processing blocks included in the picture. The size of processing blocks may be a predetermined size of data units, which is indicated by the processing block size information.

According to an embodiment, the receiver 210 of the image decoding apparatus 200 may obtain the processing block size information from the bitstream according to each specific data unit. For example, the processing block size information may be obtained from the bitstream in a data unit such as an image, sequence, picture, slice, or slice segment. That is, the receiver 210 may obtain the processing block size information from the bitstream according to each of the various data units, and the image decoding apparatus 200 may determine the size of one or more processing blocks, which are split from the picture, by using the obtained processing block size information. The size of the processing blocks may be integer times that of the reference coding units.

According to an embodiment, the image decoding apparatus 200 may determine the size of processing blocks 3102 and 3112 included in the picture 3100. For example, the image decoding apparatus 200 may determine the size of processing blocks based on the processing block size information obtained from the bitstream. Referring to FIG. 31, according to an embodiment, the image decoding apparatus 200 may determine a width of the processing blocks 3102 and 3112 to be four times the width of the reference coding units, and may determine a height of the processing blocks 3102 and 3112 to be four times the height of the reference coding units. The image decoding apparatus 200 may determine a determination order of one or more reference coding units in one or more processing blocks.

According to an embodiment, the image decoding apparatus 200 may determine the processing blocks 3102 and 3112, which are included in the picture 3100, based on the size of processing blocks, and may determine a determination order of one or more reference coding units in the processing blocks 3102 and 3112. According to an embodiment, determination of reference coding units may include determination of the size of the reference coding units.

According to an embodiment, the image decoding apparatus 200 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 200 may obtain, from the bitstream, the determination order information of reference coding units according to each specific data unit. For example, the receiver 210 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 200 may determine one or more reference coding units based on the determined determination order.

According to an embodiment, the receiver 210 may obtain the determination order information of reference coding units from the bitstream as information related to the processing blocks 3102 and 3112, and the image decoding apparatus 200 may determine a determination order of one or more reference coding units included in the processing blocks 3102 and 3112 and determine one or more reference coding units, which are included in the picture 3100, based on the determination order. Referring to FIG. 31, the image decoding apparatus 200 may determine determination orders 3104 and 3114 of one or more reference coding units in the processing blocks 3102 and 3112, respectively. For example, when the determination order information of reference coding units is obtained with respect to each processing block, different types of the determination order information of reference coding units may be obtained for the processing blocks 3102 and 3112. When the determination order 3104 of reference coding units in the processing block 3102 is a raster scan order, reference coding units included in the processing block 3102 may be determined according to a raster scan order. On the contrary, when the determination order 3114 of reference coding units in the other processing block 3112 is a backward raster scan order, reference coding units included in the processing block 3112 may be determined according to the backward raster scan order.

According to an embodiment, the image decoding apparatus 200 may decode the determined one or more reference coding units. The image decoding apparatus 200 may decode an image, based on the reference coding units determined as described above. A method of decoding the reference coding units may include various image decoding methods.

According to an embodiment, the image decoding apparatus 200 may obtain block shape information indicating the shape of a current coding unit or split shape information indicating a splitting method of the current coding unit, from the bitstream, and may use the obtained information. The block shape information or the split shape information may be included in the bitstream related to various data units. For example, the image decoding apparatus 200 may use the block shape information or the split shape information included in a sequence parameter set, a picture parameter set, a video parameter set, a slice header, or a slice segment header. Furthermore, the image decoding apparatus 200 may obtain, from the bitstream, syntax corresponding to the block shape information or the split shape information according to each largest coding unit, each reference coding unit, or each processing block, and may use the obtained syntax.

Hereinabove, various embodiments have been described. One of ordinary skill in the art will understand that the disclosure may be implemented in a modified form without departing from the essential features of the disclosure. Therefore, the embodiments should be considered in descriptive sense only and not for purposes of limitation. The scope of the disclosure is set forth in the claims rather than the foregoing description, and all differences within the scope equivalent thereto should be construed as being included in the disclosure.

Meanwhile, the above-described embodiments of the disclosure may be written as a program executable on a computer, and may be implemented in a general-purpose digital computer operating the program using a computer-readable recording medium. The computer-readable recording medium includes a storage medium such as a magnetic storage medium (eg, ROM, floppy disk, hard disk, or the like) or an optical reading medium (eg, CD-ROM, DVD, or the like).

The invention claimed is:

1. An image decoding method comprising:
receiving a bitstream of an encoded image;
determining neighboring blocks for predicting a current block among at least one block that is split from the encoded image;
generating final prediction data of the current block based on first intermediate prediction data of the current block that is obtained by processing the neighboring blocks through a first deep neural network (DNN) learning model and a second DNN learning model consecutively, and second intermediate prediction data of the current block that is obtained by processing the neighboring blocks through the first DNN learning model;
extracting residual data of the current block from the bitstream; and
reconstructing the current block by using the final prediction data and the residual data
wherein the first DNN learning model has a neural network structure that is different from a neural network structure of the second DNN learning model.

2. The image decoding method of claim 1, wherein the first DNN learning model is a recurrent neural network (RNN) learning model, and the second DNN learning model is a convolutional neural network (CNN) learning model.

3. The image decoding method of claim 1, wherein information about the neural network structure of the first DNN learning model is obtained from at least one of a video parameter set, a sequence parameter set, and a picture parameter set of the bitstream.

4. An image decoding method, comprising:
receiving a bitstream of an encoded image;
determining at least one block split from the encoded image;
determining neighboring blocks for predicting a current block among the at least one block;
generating first prediction data of the current block by applying the neighboring blocks to a first deep neural network (DNN) learning model to perform a first prediction;
generating second prediction data of the current block by applying the neighboring blocks and the first prediction data to a second DNN learning model to perform a second prediction;
generating final prediction data by using the first prediction data and the second prediction data;
extracting residual data of the current block from the bitstream; and
reconstructing the current block by using the final prediction data and the residual data.

5. The image decoding method of claim 4, wherein the first prediction data is for predicting original data of the current block, and
the second prediction data is for predicting a value obtained by subtracting the first prediction data from the original data of the current block.

6. The image decoding method of claim 4, wherein the first DNN learning model is a recurrent neural network (RNN) learning model and the second DNN learning model is a convolutional neural network (CNN) learning model.

7. The image decoding method of claim 4, wherein the generating of the first prediction data comprises inputting a sequence of the neighboring blocks to the RNN learning model according to a predetermined direction per time step.

8. The image decoding method of claim 6, wherein the determining of the neighboring blocks comprises:
determining adjacent blocks adjacent to the current block from among blocks reconstructed before the current block; and
determining blocks located in each direction facing the adjacent blocks from the current block as the neighboring blocks.

9. The image decoding method of claim 8, wherein the inputting comprises inputting the block located in each direction to the RNN learning model in a clockwise direction based on a block located in a left direction of the current block.

10. The image decoding method of claim 9, wherein, when there are a plurality of blocks located in each direction, an input order of blocks located in a same direction is an order from a block farthest from the current block to a block closest to the current block.

11. The image decoding method of claim 7, wherein the inputting comprises inputting the neighboring blocks to the RNN learning model in a Z-scan order.

12. The image decoding method of claim 6, wherein the generating of the second prediction data comprises performing a convolution operation using a plurality of filters by inputting the first prediction data and neighboring reconstruction data adjacent to the current block to a convolution layer of the CNN learning model.

13. An image decoding method, receiving a bitstream of an encoded image;
determining at least one block split from the encoded image;
determining neighboring blocks for predicting a current block among the at least one block;
determining at least one reference picture to which the current block refers and at least one reference block location;
generating prediction data by inputting the neighboring blocks, the at least one reference picture, and the at least one reference block location to a deep neural network (DNN) learning model configured to predict a block of an image by using at least one computer;
extracting residual data of the current block from the bitstream; and
reconstructing the current block by using the prediction data and the residual data.

14. An image decoding apparatus comprising:
at least one processor configured to:
obtain a bitstream of an encoded image;
determine neighboring blocks for predicting a current block among at least one block that is split from the encoded image;
generate final prediction data of the current block based on first intermediate prediction data of the current block that is obtained by processing the neighboring blocks to a first deep neural network (DNN) learning model and a second DNN learning model consecutively, and second intermediate prediction data of the current block that is obtained by processing the neighboring blocks through the first DNN learning model;
extract residual data of the current block from the bitstream; and
reconstruct the current block by using the final prediction data and the residual data,
wherein the first DNN learning model has a neural network structure that is different from a neural network structure of the second DNN learning model.

15. An image encoding method comprising:
determining at least one block for splitting an image;
determining neighboring blocks for predicting a current block among the at least one block;
generating final prediction data of the current block based on first intermediate prediction data of the current block that is obtained by processing the neighboring blocks through a first deep neural network (DNN) learning model and a second DNN learning model consecutively, and second intermediate prediction data of the current block that is obtained by processing the neighboring blocks through the first DNN learning model;
generating residual data of the current block by using original data corresponding to the current block and the final prediction data; and
generating a bitstream in which the residual data is encoded,
wherein the first DNN learning model has a neural network structure that is different from a neural network structure of the second DNN learning model.

* * * * *